United States Patent
Kim et al.

(10) Patent No.: US 12,504,907 B2
(45) Date of Patent: Dec. 23, 2025

(54) OPERATING METHOD OF NON-VOLATILE MEMORY DEVICE USING BIT FLIPPING

(71) Applicant: SAMSUNG ELECTRONICS CO., LTD., Suwon-si (KR)

(72) Inventors: Jihong Kim, Seoul (KR); Jaeyong Lee, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

(*) Notice: Subject to any disclaimer, the term of this patent is extended or adjusted under 35 U.S.C. 154(b) by 0 days.

(21) Appl. No.: 18/646,447

(22) Filed: Apr. 25, 2024

(65) Prior Publication Data
US 2024/0361946 A1    Oct. 31, 2024

(30) Foreign Application Priority Data

Apr. 25, 2023  (KR) .................. 10-2023-0054263
Aug. 22, 2023  (KR) .................. 10-2023-0110081

(51) Int. Cl.
*G06F 3/06* (2006.01)

(52) U.S. Cl.
CPC .......... *G06F 3/0652* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | |
|---|---|---|
| 8,230,158 B2 | 7/2012 | Ruby et al. |
| 11,056,205 B1 | 7/2021 | Lee et al. |
| 11,508,440 B1 | 11/2022 | Zhao et al. |

(Continued)

FOREIGN PATENT DOCUMENTS

| | | |
|---|---|---|
| KR | 10-2011-0053452 A | 5/2011 |
| KR | 10-2205397 B1 | 1/2021 |
| KR | 10-2023-0020706 A | 2/2023 |

OTHER PUBLICATIONS

Lee et al., "TailCut: improving performance and lifetime of SSDs using pattern-aware state encoding", DAC '22: Proceedings of the 59th ACM/IEEE Design Automation Conference, Aug. 23, 2022, 6 total pages, doi:10.1145/3489517.3530471.

(Continued)

*Primary Examiner* — Christopher D Birkhimer
(74) *Attorney, Agent, or Firm* — Sughrue Mion, PLLC

(57) ABSTRACT

An operating method of a non-volatile memory device, includes detecting first memory cells having the erase state among memory cells connected with a first word line; detecting second memory cells having sixth or seventh program states connected with a second word line adjacent to the first word line; detecting target bit lines including one of the first memory cells and one of the second memory cells; detecting target bits, corresponding to a target bit line and the erase state, in write data which is to be programmed in third memory cells connected with a third word line adjacent to the second word line; generating flip bit position data based on the target bits; flipping the target bits of the write data to generate flipped data; and programming the flipped data and the flip bit position data in the third word line.

20 Claims, 34 Drawing Sheets

(56) References Cited

U.S. PATENT DOCUMENTS

| | | | | |
|---|---|---|---|---|
| 2016/0328287 | A1* | 11/2016 | Kim | G11C 11/5642 |
| 2016/0378596 | A1* | 12/2016 | Kim | H03M 13/45 |
| | | | | 714/755 |
| 2021/0081273 | A1* | 3/2021 | Helmick | G06F 9/30189 |
| 2021/0225451 | A1* | 7/2021 | Seo | G11C 11/5628 |
| 2022/0013145 | A1* | 1/2022 | Ren | G06F 3/0608 |
| 2022/0043596 | A1* | 2/2022 | Madraswala | G11C 29/021 |
| 2022/0066674 | A1* | 3/2022 | Li | G06F 3/067 |
| 2022/0107746 | A1* | 4/2022 | Marais | G06F 3/0647 |
| 2022/0293194 | A1* | 9/2022 | Ramanan | G11C 16/3427 |
| 2022/0415426 | A1* | 12/2022 | Sforzin | G11C 29/42 |
| 2023/0039489 | A1 | 2/2023 | Ko et al. | |
| 2023/0187011 | A1* | 6/2023 | Lee | G11C 29/022 |
| | | | | 365/185.09 |

OTHER PUBLICATIONS

Lee et al., "Electric Field Impact on Lateral Charge Diffusivity in Charge Trapping 3D NAND Flash Memory", 2022 IEEE International Reliability Physics Symposium (IRPS), May 2, 2022, 5 total pages, doi:10.1109/IRPS48227.2022.9764447.

Xie et al., "Large Suppression to Lateral Charge Migration (LCM) Related Error Bits in Charge-Trap TLC 3D NAND Flash", 2022 IEEE International Conference on Integrated Circuits, Technologies and Applications (ICTA), Dec. 2, 2022, 3 total pages, doi:10.1109/ICTA56932.2022.9962997.

* cited by examiner

| | E | P1 | P2 | P3 | P4 | P5 | P6 | P7 |
|---|---|---|---|---|---|---|---|---|
| PD1 | 1 | 0 | 0 | 0 | 0 | 1 | 1 | 1 |
| PD2 | 1 | 1 | 0 | 0 | 1 | 1 | 0 | 0 |
| PD3 | 1 | 1 | 1 | 0 | 0 | 0 | 0 | 1 |

FIG. 8B

|   | B1 | B2 | B3 | B4 | B5 | B6 | ... | Bk | Bk+1 | ... | Bn |
|---|---|---|---|---|---|---|---|---|---|---|---|
| PD1 | 1 | 0 | 1 | 1 | 1 | 1 | ... | 1 | – | ... | – |
| PD2 | 1 | 1 | 0 | 1 | 1 | 1 | ... | 0 | – | ... | – |
| PD3 | 1 | 1 | 0 | 1 | 1 | 1 | ... | 1 | – | ... | – |

WD1 = {PD1, PD2, PD3}

| BD1 | BD2 | BD3 | BD4 | BD5 | BD6 | ... | BDk | BDk+1 | ... | DBn |
|---|---|---|---|---|---|---|---|---|---|---|
| [E] | [P1] | [P6] | [E] | [E] | [E] | ... | [P7] | – | ... | – |

OPERATING METHOD OF NON-VOLATILE MEMORY DEVICE USING BIT FLIPPING

CROSS-REFERENCE TO RELATED APPLICATIONS

This application claims priority to Korean Patent Application Nos. 10-2023-0054263, filed on Apr. 25, 2023, and 10-2023-0110081, filed on Aug. 22, 2023, in the Korean Intellectual Property Office, the disclosures of which are incorporated by reference herein in their entireties.

BACKGROUND

The present disclosure relates to a semiconductor memory, and more particularly, to an operating method of a non-volatile memory device.

Semiconductor memories are categorized into volatile memory devices, where stored data is deleted when the supply of power is cut off like static random access memory (RAM) (SRAM) and dynamic RAM (DRAM), and non-volatile memory devices which maintain data even when the supply of power is cut off like phase change RAM (PRAM), magnetic RAM (MRAM), resistive RAM (RRAM), and ferroelectric RAM (FRAM).

To increase the capacity of non-volatile memory devices, a three-dimensional (3 D) structure has been introduced in non-volatile memory devices. Due to the characteristics of a process of manufacturing a 3 D structure, the spread charges of memory cells of 3 D non-volatile memory devices may be accelerated in due to certain patterns. In this regard, there is a need for an apparatus or method for preventing the occurrence of an error caused by a certain pattern corresponding to a state of memory cells vertically adjacent to one another.

SUMMARY

One or more example embodiments provide an operating method of a non-volatile memory device having enhanced reliability.

According to an aspect of an example embodiment, an operating method of a non-volatile memory device including a plurality of memory blocks, each of the plurality of memory blocks including a plurality of strings formed in a direction perpendicular to a substrate and connected between bit lines and a common source line, each of the plurality of strings including a plurality of memory cells, and each of the plurality of memory cells being programmed to have one of an erase state and first to seventh program states, the operating method includes: detecting first memory cells having the erase state among the plurality of memory cells connected with a first word line; detecting second memory cells having the sixth program state or the seventh program state among the plurality of memory cells connected with a second word line adjacent to the first word line; detecting target bit lines including at least one of the first memory cells and at least one of the second memory cells; detecting target bits, corresponding to a target bit line and the erase state, in write data which is to be programmed in third memory cells among the plurality of memory cells connected with a third word line adjacent to the second word line; generating flip bit position data based on the target bits; flipping the target bits of the write data to generate flipped data; and programming the flipped data and the flip bit position data in the third word line. The plurality of memory cells are divided into a first area and a second area, the first area is divided into first to third portions, and the write data includes first to third page data. First sub target bits of the target bits correspond to the first portion, second sub target bits of the target bits correspond to the second portion, and third sub target bits of the target bits correspond to the third portion, data corresponding to the first sub target bits of the first page data is flipped, data corresponding to the second sub target bits of the second page data is flipped, and data corresponding to the third sub target bits of the third page data is flipped.

According to another aspect of an example embodiment, an operating method of a non-volatile memory device including a plurality of memory blocks, each of the plurality of memory blocks including a plurality of strings which are formed in a direction perpendicular to a substrate, and each of the plurality of strings including a plurality of memory cells, the plurality of strings being connected between bit lines and a common source line, and the plurality of memory cells being programmed to have one of an erase state and first to seventh program states, the operating method includes: performing a first sensing operation on a first word line by using a first read voltage to generate a first bitmap indicating a first memory cell corresponding to the erase state among the plurality of memory cells connected with the first word line; performing a second sensing operation on a second word line adjacent to the first word line by using a sixth read voltage to generate a second bitmap indicating second memory cells corresponding to the sixth program state or the seventh program state among the plurality of memory cells connected with the second word line; performing an AND operation on the first bitmap and the second bitmap to generate a third bitmap indicating target bit lines; receiving write data, which is to be programmed in memory cells connected with a third word line adjacent to the second word line, from an external device outside; performing an AND operation on the third bitmap and the write data to generate a fourth bitmap indicating target bits corresponding to a weak pattern; generating flip bit position data based on the fourth bitmap; performing a flip operation to generate encoded data, based on the write data and the flip bit position data; and programming the encoded data in the memory cells connected with the third word line.

According to another aspect of an example embodiment, an operating method of a non-volatile memory device including a plurality of memory blocks, each of the plurality of memory blocks including a plurality of strings formed in a direction perpendicular to a substrate, the plurality of strings being connected between bit lines and a common source line, and the plurality of memory blocks being programmed to have one of an erase state and first to seventh program states, the operating method includes: detecting first memory cells having the erase state among the plurality of memory blocks connected with a first word line; detecting second memory cells having a sixth program state or a seventh program state among the plurality of memory blocks connected with a second word line adjacent to the first word line; detecting target bit lines including at least one of the first memory cells and at least one of the second memory cells; detecting target bits, corresponding to a target bit line and the erase state, in write data which is to be programmed in memory cells connected with a third word line adjacent to the second word line; generating flip bit position data based on the target bits; flipping the target bits of the write data and flipping target neighboring bits included in a same chunk as the target bits to generate flipped data; and programming the flipped data and the flip bit position data in the third word line. The write data includes a plurality of chunks.

BRIEF DESCRIPTION OF DRAWINGS

The above and other aspects and features will be more apparent from the following description of example embodiments, taken in conjunction with the accompanying drawings, in which:

FIGS. 8A, 8B and 8C are diagrams for describing an operation of a non-volatile memory device according to an example embodiment;

DETAILED DESCRIPTION

Hereinafter, example embodiments will be described in detail with reference to the accompanying drawings. Advantages and features and implementation methods thereof will be clarified through following example embodiments described with reference to the accompanying drawings. Each example embodiment described herein is not excluded from being associated with one or more features of another example or another example embodiment also provided herein or not provided herein but consistent with the present disclosure.

Figure 1:
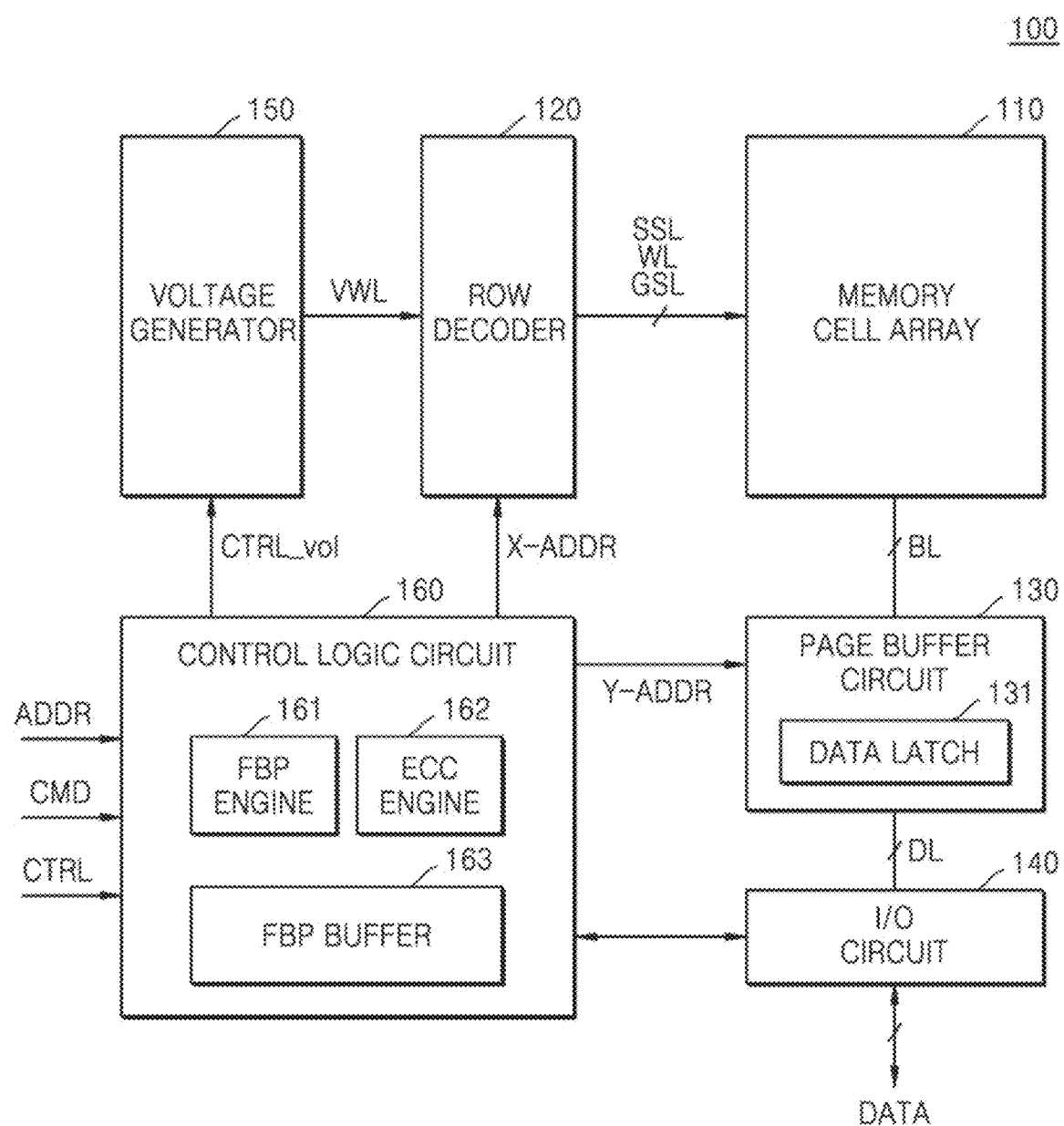
FIG. 1 illustrates a non-volatile memory device according to an example embodiment.

FIG. 1 illustrates a non-volatile memory device 100 according to an example embodiment.

Referring to FIG. 1, the non-volatile memory device 100 may include a memory cell array 110, a row decoder 120, a page buffer circuit 130, an input/output (I/O) circuit 140, a voltage generator 150, and a control logic circuit 160. The non-volatile memory device 100 may further include a column logic, a pre-decoder, a temperature sensor, a command decoder, and an address decoder. In an example embodiment, the non-volatile memory device 100 may be a non-volatile memory device such as NAND flash memory device, but example embodiments are not limited thereto.

For example, the memory cell array 110 may be a core of the non-volatile memory device 100. The row decoder 120, the page buffer circuit 130, the I/O circuit 140, and the control logic circuit 160 may be peripheral circuits of the non-volatile memory device 100. The peripheral circuits may be configured to access the core.

The memory cell array 110 may include a plurality of memory blocks. Each of the plurality of memory blocks may include a plurality of memory cells. The memory cell array 110 may be connected with the page buffer circuit 130 through bit lines BL and may be connected with the row decoder 120 through word lines WL, string selection lines SSL, and ground selection lines GSL. A configuration of each of the plurality of memory blocks will be described below in more detail with reference to FIG. 2.

In an example embodiment, the memory cell array 110 may include a three-dimensional (3 D) memory cell array, and the 3 D memory cell array may include a plurality of strings. Each of the plurality of strings may include memory cells which are respectively connected with word lines vertically stacked on a substrate. U.S. Pat. Nos. 7,679,133, 8,553,466, 8,654,587 and 8,559,235 and U.S. Patent Application No. 2011/0233648 are hereby incorporated by reference herein in their entireties.

The row decoder 120 may receive a row address X-ADDR from the control logic circuit 160. The row decoder 120 may decode the row address X-ADDR and may control or drive voltages of the string selection lines SSL, the word lines WL, and the ground selection lines GSL based on the decoding result. For example, the row decoder 120 may provide a corresponding operation voltage to each of the string selection lines SSL, the word lines WL, and the ground selection lines GSL based on the decoding result.

The row decoder 120 may select one word line WL from among a plurality of word lines WL and may select one string selection line SSL from among a plurality of string selection lines SSL, in response to the row address X-ADDR. For example, when performing a program operation, the row decoder 120 may apply a program voltage and a program verification voltage to the selected word line WL, and when performing a read operation, the row decoder 360 may apply a read voltage to the selected word line WL.

The page buffer circuit 130 may be connected with the memory cell array 110 through the bit lines BL. The page buffer circuit 130 may select at least one bit line BL from among the bit lines BL in response to a column address Y-ADDR. The page buffer circuit 130 may operate as a write driver or a sensing amplifier based on an operation mode. For example, the page buffer circuit 130 may receive data DATA from the I/O circuit 140 and may temporarily store the received data DATA. The page buffer circuit 130 may control voltages of the bit lines BL so that the temporarily stored data DATA is stored in the memory cell array 110. Alternatively, the page buffer circuit 130 may sense voltage variations of the bit lines BL and may thus read the data DATA stored in the memory cell array 110. The page buffer circuit 130 may transfer the read data DATA to the I/O circuit 140.

The page buffer circuit 130 may include a data latch 131 and a bit unit logic operation circuit. The page buffer circuit 130 may store data in the data latch 131. The data latch 131 may include first to fifth data latches. The page buffer circuit 130 may store a bitmap or data, which is generated by performing a weak (or vulnerable) pattern detection operation or flip operation, in the data latch 131. The bit unit logic operation circuit may perform a logic operation on data stored in the data latch 131.

The I/O circuit 140 may transfer or receive the data DATA to or from an external device (for example, a storage controller). In an example embodiment, the I/O circuit 140 may output the data DATA to the external device or may receive the data DATA from the external device, in synchronization with a data strobe signal.

The voltage generator 150 may generate various voltages for performing program, read, and erase operations based on a voltage control signal CTRL_vol. For example, the voltage generator 150 may generate the program voltage, the read voltage, the program verification voltage, and an erase voltage as a word line voltage VWL.

The control logic circuit 160 may overall control various operations of the non-volatile memory device 100. The control logic circuit 160 may output various control signals in response to a command CMD and/or an address ADDR from the storage controller. For example, the control logic circuit 160 may output the voltage control signal CTRL_vol, the row address X-ADDR, and a column address Y-ADDR.

The control logic circuit 160 may include a flip bit position (FBP) engine 161, an error correction code (ECC) engine 162, and an FBP buffer 163. The FBP engine 161 may generate FBP data. The FBP engine 161 may generate a flip bit flag, which indicates a bit which is to be flipped, used in a flip operation or a re-flip operation.

The ECC engine 162 may perform an error detection and correction function on the FBP data (or sub FBP data) received from the FBP buffer 163. For example, the ECC engine 126 may generate parity bits corresponding to the FBP data (or the sub FBP data) which is to be stored in the memory cell array 110. The generated parity bits may be stored in the memory cell array 110 along with the FBP data (or the sub FBP data). Subsequently, when performing a decoding operation, the ECC engine 162 may correct an error of encoded FBP data (or encoded sub FBP data) by using the parity bits and may output error-corrected encoded FBP data (or encoded sub FBP data).

The FBP buffer 163 may store the FBP data. The FBP buffer 163 may receive the FBP data from the FBP engine 161. The FBP buffer 163 may store the received FBP data. The FBP buffer 163 may output the stored FBP data to the FBP engine 161 or the ECC engine 162.

In the non-volatile memory device 100 including a 3D memory cell array, lateral charge spreading may occur between memory cells sharing a charge trap layer. Particularly, as charge spreading is accelerated in a certain data pattern (or a weak pattern), a bit error may increase. For example, the bit error in one memory cell may cause a bit error in another memory cell. For example, the memory cells may share a charge trap layer. The non-volatile memory device 100 according to an example embodiment may perform a weak pattern detection operation and an encoding operation to remove (or avoid) a weak pattern. The weak pattern may include a first pattern (for example, E-P7-E) or a second pattern (for example, E-P6-E).

The weak pattern detection operation may indicate an operation of detecting a weak pattern, so as to remove (or avoid) a weak pattern between vertically adjacent cells. Before a last erase state E is programmed, the non-volatile memory device 100 may detect a weak pattern, based on data programmed in memory cells connected with first and second word lines and programmed in the memory cell array 110 and write data which is to be programmed in memory cells connected with a third word line and is received by the non-volatile memory device 100. Before a weak pattern occurs, the non-volatile memory device 100 may convert data to prevent the occurrence of the weak pattern.

The encoding operation may indicate an operation of converting data which is to be programmed in the memory cell array 110. The encoding operation may include an FBP data generating operation and a flip operation. The FBP data generating operation may generate FBP data indicating bits which are to be flipped, based on data programmed in memory cells connected with the first and second word lines and write data which is to be programmed in memory cells connected with the third word line and is received by the non-volatile memory device 100. The FBP data may be information about positions of flipped bits in flipped data generated by performing the flip operation. For example, the FBP data indicate the positions of the flipped bits in the flipped data.

The flip operation may indicate an operation of flipping the write data based on the FBP data. The flip operation may include a first flip operation and a second flip operation. The first flip operation may be performed by bit units, and the second flip operation may be performed by chunk units. The non-volatile memory device 100 may perform the flip operation to generate flipped data. The non-volatile memory device 100 may add the FBP data to the flipped data to generate encoded data. The non-volatile memory device 100 may program the encoded data in the memory cell array 110. The non-volatile memory device 100 may perform the weak pattern detection operation, the encoding operation, and the program operation in response to a write command.

The non-volatile memory device 100 may perform a sensing operation and a decoding operation in response to a read command. The non-volatile memory device 100 may perform the sensing operation to read the encoded data. The non-volatile memory device 100 may perform the decoding operation to convert the encoded data into decoded data. The non-volatile memory device 100 may perform a re-flip operation to flip flipped bits again. The non-volatile memory device 100 may generate the decoded data from which the FBP data is removed.

As described above, the non-volatile memory device 100 according to an example embodiment may prevent the occurrence of an error caused by a certain pattern corresponding to a state of vertically adjacent memory cells. Also, a reliability-enhanced non-volatile memory device and an operating method thereof may be provided. The weak pattern detection operation, the encoding operation, and the decoding operation will be described below in more detail with reference to the following drawings.

Figure 2:
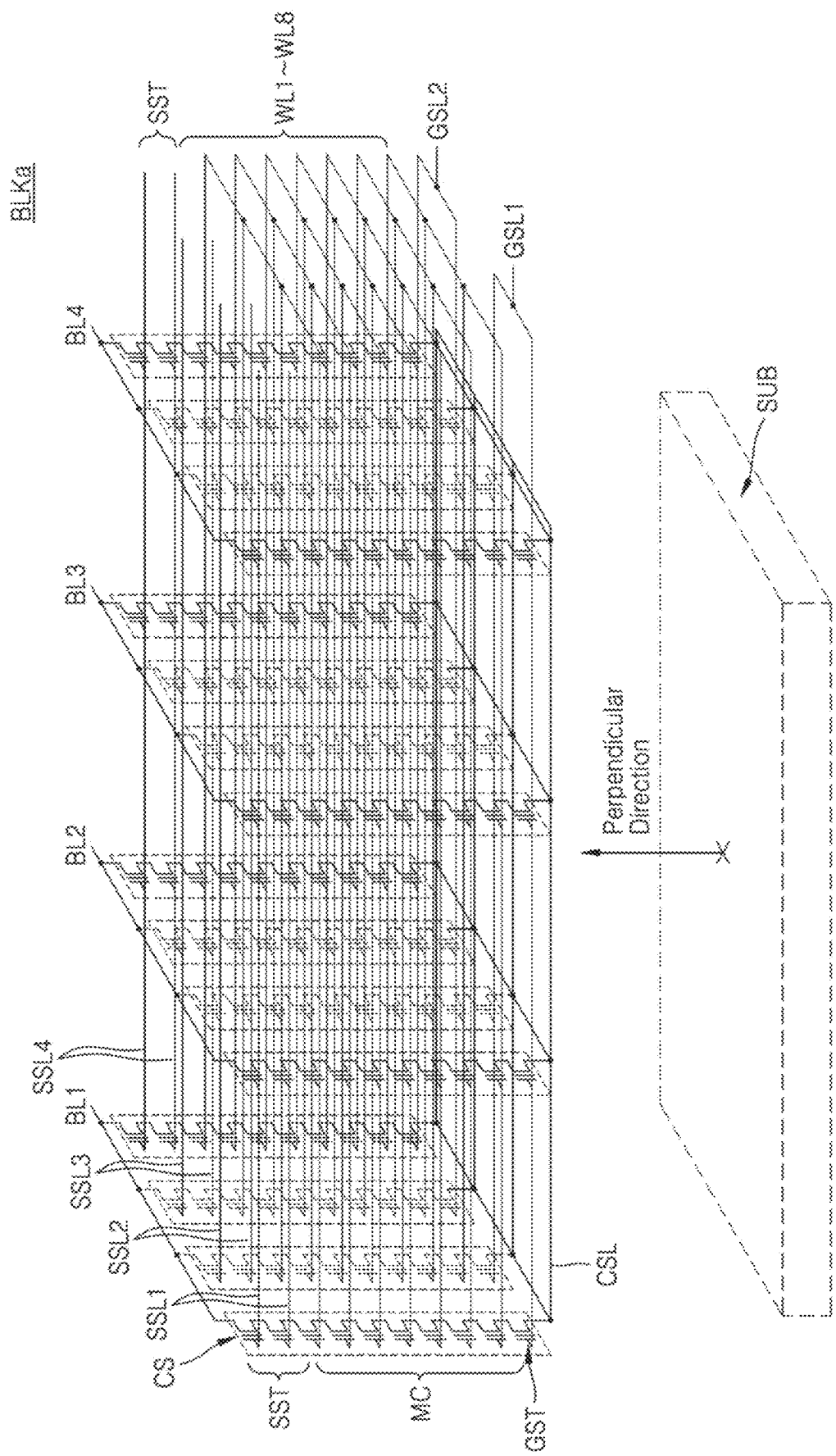
FIG. 2 is a circuit diagram illustrating a memory block according to an example embodiment.

FIG. 2 is a circuit diagram illustrating a memory block BLKa according to an example embodiment.

The memory block BLKa of FIG. 2 may be applied to the non-volatile memory device 100 of FIG. 1. The memory block BLKa of FIG. 2 may be an example of one memory block among the memory blocks of FIG. 1. When the non-volatile memory device of FIG. 1 is implemented as flash memory of a 3D V-NAND type, each of a plurality of memory blocks configuring a storage module may be represented as an equivalent circuit as illustrated in FIG. 1.

Referring to FIGS. 1 and 2, a plurality of cell strings CS may be arranged in rows and columns on a substrate SUB. The memory block BLKa may represent a 3D memory block formed in a 3D structure on the substrate SUB. For example, the plurality of cell strings CS included in the memory block BLKa may be formed in a direction perpendicular to the substrate SUB. The plurality of cell strings CS may be connected between bit lines and a common source line CSL. The plurality of cell strings CS may be connected with, in common, the common source line CSL formed on (or in) the substrate SUB. In FIG. 2, in order to help understand a structure of the memory block BLKa, a position of the substrate SUB is illustrated for example.

In FIG. 2, it is illustrated that the common source line CSL is connected with low ends of the cell strings CS. However, the common source line CSL may be sufficient to be electrically connected with the low ends of the cell strings CS and is not limited to be disposed at the low ends of the cell strings CS physically. For example, in FIG. 2, it is illustrated that the cell strings CS are arranged 4×4, but the memory block BLKa may include more or less cell strings.

Cell strings of each row may be connected with a ground selection line GSL1 or GSL2 in common. For example, cell strings of first and second rows may be connected with a first ground selection line GSL1 in common, and cell strings of third and fourth rows may be connected with a second ground selection line GSL2 in common.

The cell strings of each row may be connected with corresponding string selection lines of first to fourth string selection lines SSL1 to SSL4. The cell strings of each row may be connected with corresponding bit lines of first to fourth bit lines BL1 to BL4. To prevent the drawings from being complicated, cell strings connected with the second and third string selection lines SSL2 and SSL3 are illustrated to be thin.

Each cell string may include at least one ground selection transistor GST connected with the ground selection line GSL1 or GSL2, a plurality of memory cells respectively connected with a plurality of word lines WL1 to WL8, and string selection transistors SST respectively connected with string selection lines SSL1, SSL2, SSL3, or SSL4.

In each cell string, the ground selection transistor GST, memory cells MC1 to MC8, and the string selection transistors SST may be serially connected with one another in a direction perpendicular to the substrate SUB and may be sequentially stacked in a direction perpendicular to the substrate SUB. In each cell string, at least one of the memory cells MC1 to MC8 may be used as a dummy memory cell. The dummy memory cell may not be programmed (for example, a program may be prohibited), or may be programmed unlike the memory cells MC1 to MC8.

For example, memory cells of cell strings disposed at the same height may configure one physical page. Memory cells of one physical page may be connected with one sub word line. Sub word lines of physical pages disposed at the same height may be connected with one word line (for example, one of WL1 to WL8) in common.

For example, sub word lines of physical pages disposed at the same height may be connected with one another at a height at which sub word lines are formed. As another example, sub word lines of physical pages disposed at the same height may be indirectly connected with one another in a different layer having a height which differs from a height at which sub word lines such as a metal layer are formed.

For example, in a case where the memory block BLKa is implemented in a 3D structure, characteristics of memory cells MC may be differently implemented based on heights of the memory cells MC. For example, sizes of the memory cells MC may differ based on the heights of the memory cells MC.

Figure 3:
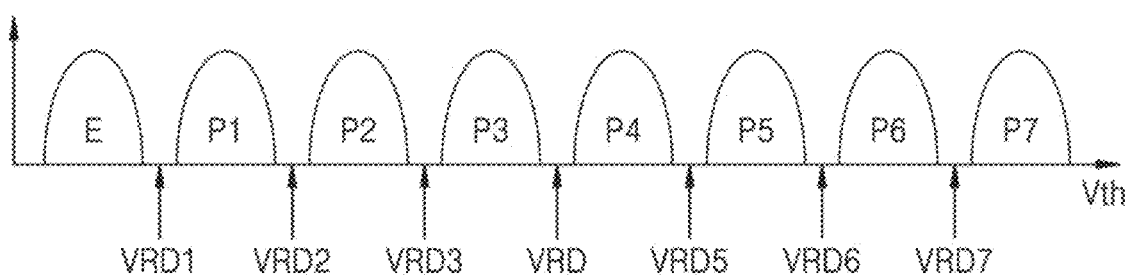
FIG. 3 is a diagram for describing an operation of a non-volatile memory device according to an example embodiment.

FIG. 3 is a diagram for describing an operation of a non-volatile memory device according to an example embodiment.

Referring to FIG. 3, the threshold voltage distribution of a memory cell and the table of a page-based bit corresponding to the threshold voltage distribution are illustrated. The abscissa axis of the distribution of FIG. 3 may represent threshold voltages of memory cells, and the ordinate axis may represent the number of memory cells. For example, variations of threshold voltages when 3 bits are written in each memory cell are illustrated in FIG. 3. A word line WL may store first to third page data PD1 to PD3. The first page data PD1 may indicate a least significant bit (LSB) page, the second page data PD2 may indicate a center significant bit (CSB) page, and the third page data PD3 may indicate a most significant bit (MSB) page.

The non-volatile memory device 100 may change threshold voltages of the plurality of memory cells MC included in the memory cell array 110 and may thus store or program data in memory cells. Memory cells connected with the word line WL may be programmed to have one state of an erase state E and first to seventh program states P1 to P7.

A first read voltage VRD1 may be a voltage for identifying the erase state E and the first program state P1. A second read voltage VRD2 may be a voltage for identifying the first program state P1 and the second program state P2. A third read voltage VRD3 may be a voltage for identifying the second program state P2 and the third program state P3. A fourth read voltage VRD4 may be a voltage for identifying the third program state P3 and the fourth program state P4. A fifth read voltage VRD5 may be a voltage for identifying the fourth program state P4 and the fifth program state P5. A sixth read voltage VRD6 may be a voltage for identifying the fifth program state P5 and the sixth program state P6. A seventh read voltage VRD7 may be a voltage for identifying the sixth program state P6 and the seventh program state P7.

For example, when values of pieces of page data PD1 to PD3 corresponding to a memory cell are [1, 1, 1], the memory cell may be programmed to have the erase state E. When the values of the pieces of page data PD1 to PD3 corresponding to the memory cell are [0, 1, 1], the memory cell may be programmed to have the first program state P1. When the values of the pieces of page data PD1 to PD3 corresponding to the memory cell are [0, 0, 1], the memory cell may be programmed to have the second program state P2. When the values of the pieces of page data PD1 to PD3 corresponding to the memory cell are [0, 0, 0], the memory cell may be programmed to have the third program state P3. When the values of the pieces of page data PD1 to PD3 corresponding to the memory cell are [0, 1, 0], the memory cell may be programmed to have the fourth program state P4. When the values of the pieces of page data PD1 to PD3 corresponding to the memory cell are [1, 1, 0], the memory cell may be programmed to have the fifth program state P5. When the values of the pieces of page data PD1 to PD3 corresponding to the memory cell are [1, 0, 0], the memory cell may be programmed to have the sixth program state P6. When the values of the pieces of page data PD1 to PD3 corresponding to the memory cell are [1, 0, 1], the memory cell may be programmed to have the seventh program state P7.

Figure 4A:
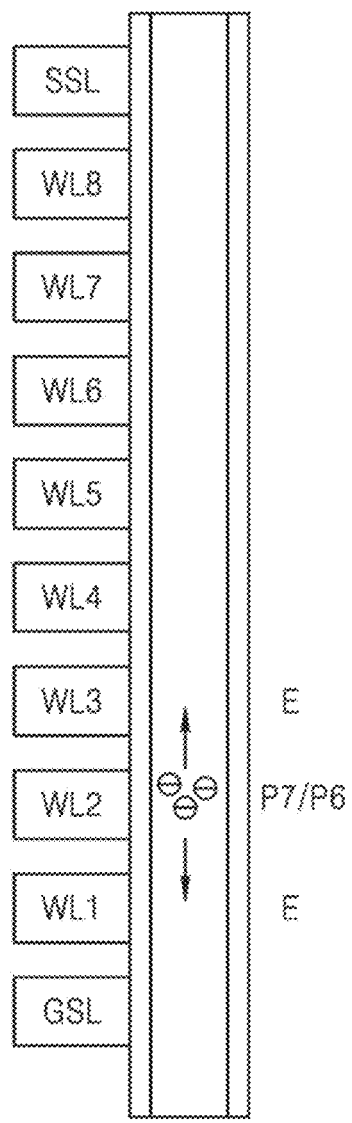
FIGS. 4A and 4B are diagrams for describing the lateral spreading of a non-volatile memory device according to an example embodiment.
Figure 4B:
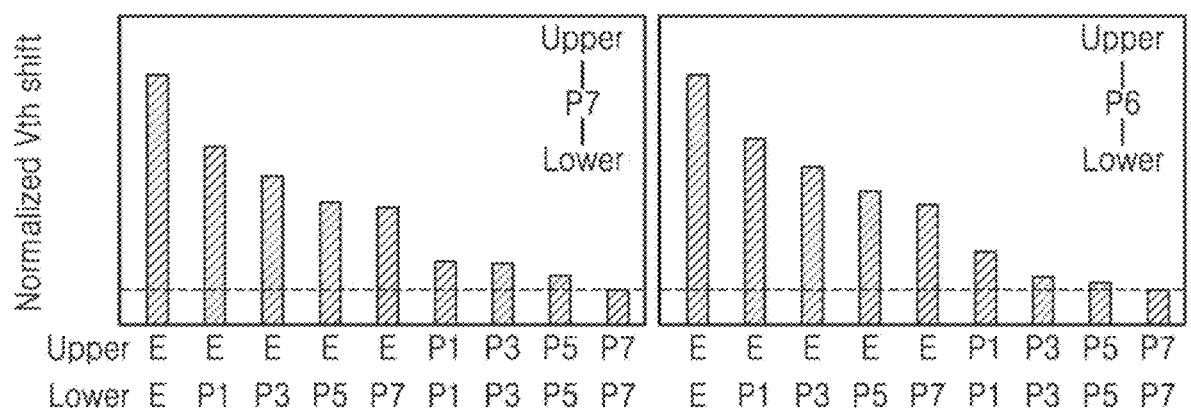

FIGS. 4A and 4B are diagrams for describing the lateral spreading of a non-volatile memory device according to an example embodiment.

Referring to FIG. 4A, lateral spreading may occur in the non-volatile memory device 100. Lateral spreading may denote a phenomenon where electric charges trapped in insulation layers are spread in a third direction or an opposite direction of the third direction. When lateral spreading occurs, threshold voltages of memory cells may vary and the reliability of data may be reduced.

In a non-volatile memory device including a 3D memory cell array, memory cells connected with the same bit line may share a charge trap layer. Therefore, an electric charge trapped in a memory cell may easily move (or spread) to vertically adjacent neighboring memory cells directly connected with the charge trap layer, and the charge loss speed may considerably increase. For example, the bit line that is shared by the memory cells may extend in the third direction.

Particularly, when a memory cell corresponding to a first word line WL1 among memory cells connected with the same bit line has the erase state E, a memory cell corresponding to a second word line WL2 has the seventh program state P7 or the sixth program state P6, and a memory cell corresponding to a third word line WL3 has the erase state E, lateral spreading may be accelerated. That is, when adjacent memory cells sharing the charge trap layer sequentially have the erase state E, the seventh program state P7, and the erase state E or sequentially have the erase state E, the sixth program state P6, and the erase state E, the reliability of data may be considerably reduced.

Referring to FIG. 4B, an influence on the amount of shift of a threshold voltage is illustrated based on a state of an adjacent memory cell. In memory cells having the seventh program state P7 and the sixth program state P6, when an adjacent upper memory cell has the erase state E and an adjacent lower memory cell has the erase state E, the amount of shift of a threshold voltage may be largest. That is, a data error may occur in a weak pattern, and the reliability of a non-volatile memory device may be reduced. The non-volatile memory device according to an example embodiment may perform a weak pattern detection operation and an encoding operation to remove (or avoid) a weak pattern, thereby enhancing reliability.

Figure 5A:
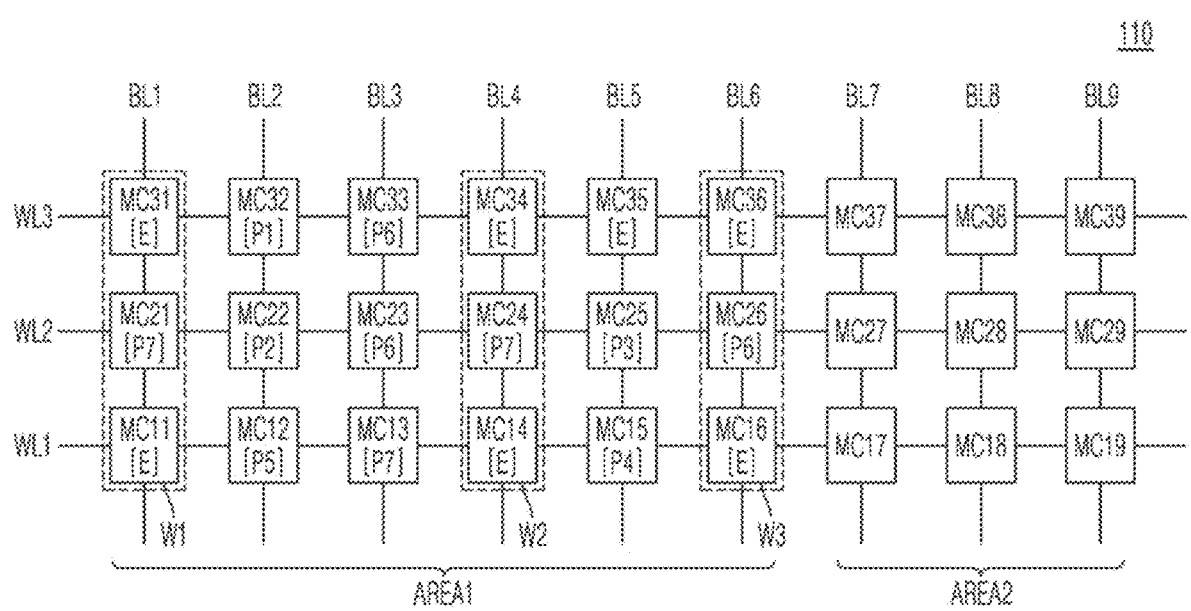
FIGS. 5A and 5B are diagrams for describing an encoding operation according to an example embodiment.
Figure 5B:
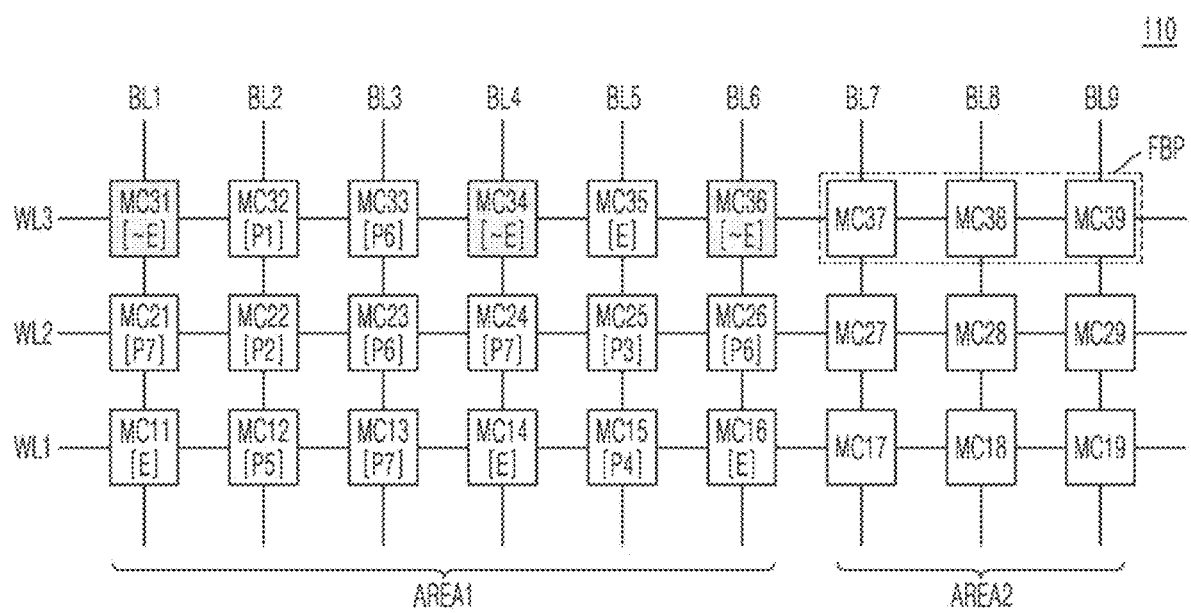

FIGS. 5A and 5B are diagrams for describing an encoding operation according to an example embodiment.

FIG. 5A illustrates a state where programming has been performed without an encoding operation, and FIG. 5B illustrates a state where programming has been performed after the encoding operation according to an example embodiment is performed.

For conciseness of the drawings and convenience of description, a memory cell array 110 may be assumed as including a plurality of memory cells MC11 to MC39 connected with first to third word lines WL1 to WL3 and first to ninth bit lines BL1 to BL9. However, example embodiments are not limited thereto.

Referring to FIGS. 1 and 5A, the memory cell array 110 may include a plurality of memory cells MC11 to MC39. Each of the plurality of memory cells MC11 to MC39 may be connected with first to third word lines WL1 to WL3 and first to ninth bit lines BL1 to BL9. Each of the plurality of memory cells MC11 to MC39 may be connected with the row decoder 120 through the first to third word lines WL1 to WL3. Each of the plurality of memory cells MC11 to MC39 may be connected with the page buffer circuit 130 through the first to ninth bit lines BL1 to BL9.

For example, the first word line WL1 may be connected with the memory cells MC11 to MC19, the second word line WL2 may be connected with the memory cells MC21 to MC29, and the third word line WL3 may be connected with the memory cells MC31 to MC39. The first bit line BL1 may be connected with the memory cells MC11, MC21, and MC31, the second bit line BL2 may be connected with the memory cells MC12, MC22, and MC32, the third bit line BL3 may be connected with the memory cells MC13, MC23, and MC34, the fourth bit line BL4 may be connected with the memory cells MC14, MC24, and MC35, the fifth bit line BL5 may be connected with the memory cells MC15, MC25, and MC35, the sixth bit line BL6 may be connected with the memory cells MC16, MC26, and MC36, the seventh bit line BL7 may be connected with the memory cells MC17, MC27, and MC37, the eighth bit line BL8 may be connected with the memory cells MC18, MC28, and MC38, and the ninth bit line BL9 may be connected with the memory cells MC19, MC29, and MC39.

In an example embodiment, the plurality of memory cells may be divided into a first area AREA1 (for example, a user area) and a second area AREA2 (for example, a spare area). For example, memory cells connected with the first to sixth bit lines BL1 to BL6 may be the first area AREA1 and memory cells connected with the seventh to ninth bit lines BL7 to BL9 may be the second area AREA2. The first area AREA1 may store user data provided from an external host. The second area AREA2 may store metadata. The first area AREA1 may be used by the external host, and the second area AREA2 may not be used by the external host.

For example, the memory cell MC11 may have an erase state E, the memory cell MC12 may have a fifth program state P5, the memory cell MC13 may have a seventh program state P7, the memory cell MC14 may have the erase state E, the memory cell MC15 may have a fourth program state P4, and the memory cell MC16 may have the erase state E. The memory cell MC21 may have the seventh program state P7, the memory cell MC22 may have a second program state P2, the memory cell MC23 may have a sixth program state P6, the memory cell MC24 may have the seventh program state P7, the memory cell MC25 may have a third program state P3, and the memory cell MC26 may have the sixth program state P6. The memory cell MC31 may have the erase state E, the memory cell MC32 may have a first program state P1, the memory cell MC33 may have the sixth program state P6, the memory cell MC34 may have the erase state E, the memory cell MC35 may have the erase state E, and the memory cell MC36 may have the erase state E.

The memory cell MC11 connected with the first bit line BL1 may have the erase state E, the memory cell MC21 connected with the first bit line BL1 may have the seventh program state P7, and the memory cell MC31 connected with the first bit line BL1 may have the erase state E, and thus, the memory cell array 110 may include a first weak pattern W1 in the first bit line BL1. The memory cell MC14 connected with the fourth bit line BL4 may have the erase state E, the memory cell MC24 connected with the fourth bit line BL4 may have the seventh program state P7, and the memory cell MC34 connected with the fourth bit line BL4 may have the erase state E, and thus, the memory cell array 110 may include a second weak pattern W2 in the fourth bit line BL4. The memory cell MC16 connected with the sixth bit line BL6 may have the erase state E, the memory cell MC26 connected with the sixth bit line BL6 may have the sixth program state P6, and the memory cell MC36 connected with the sixth bit line BL6 may have the erase state E, and thus, the memory cell array 110 may include a third weak pattern W3 in the sixth bit line BL6.

In this regard, the non-volatile memory device 100 may include the first to third weak patterns W1 to W3. Accordingly, an error may occur, and the reliability of a non-volatile memory device may be reduced.

Referring to FIGS. 1 and 5B, a memory cell MC11 may have an erase state E, a memory cell MC12 may have a fifth program state P5, a memory cell MC13 may have a seventh program state P7, a memory cell MC14 may have the erase state E, a memory cell MC15 may have a fourth program state P4, and a memory cell MC16 may have the erase state E. A memory cell MC21 may have the seventh program state P7, a memory cell MC22 may have a second program state P2, a memory cell MC23 may have a sixth program state P6, a memory cell MC24 may have the seventh program state P7, a memory cell MC25 may have a third program state P3, and a memory cell MC26 may have the sixth program state P6. A memory cell MC31 may have a non-erase state ~E, a memory cell MC32 may have a first program state P1, a memory cell MC33 may have the sixth program state P6, a memory cell MC34 may have the non-erase state ~E, a memory cell MC35 may have the erase state E, and a memory cell MC36 may have the non-erase state ~E. The non-erase state ~E may indicate a state which is not the erase state E and may indicate one of a plurality of program states P1 to P7.

The non-volatile memory device 100 according to an example embodiment may perform a weak pattern detection operation and an encoding operation before performing a program operation on a third word line WL3, and thus, may detect a weak pattern and may convert and store write data. That is, the non-volatile memory device 100 may store flipped data. The memory cells MC31, MC34, and MC36 may have the erase state ~E. Accordingly, the memory cell array 110 may not include weak patterns. The reliability of a non-volatile memory device may be improved.

In an example embodiment, the memory cells MC37, MC38, and MC39 connected with the third word line may store FBP data FBP. The FBP data FBP may be stored as metadata in the second area AREA2 and may indicate positions of flipped bits in the flipped data. The FBP data FBP may be used in re-flipping the flipped data in performing a read operation.

That is, the memory cells MC31, MC34, and MC36 of FIG. 5A may have the erase state E, and the memory cell array 110 may include weak patterns W1 to W3. On the other hand, the memory cells MC31, MC34, and MC36 of FIG. 5B may have the non-erase state ~E, and the memory cell array 110 may not include a weak pattern. The non-volatile memory device 100 may perform an encoding operation to remove (or avoid) a weak pattern. The non-volatile memory device 100 may perform a weak pattern detection operation of detecting a weak pattern, before programming data in the third word line WL3. The non-volatile memory device 100 may perform a weak pattern detection operation, based on data stored in the first word line WL1, data stored in the second word line WL2, and write data which is to be programmed in the third word line WL3 stored in the page buffer. When a weak pattern is detected through the weak pattern detection operation, the non-volatile memory device 100 may perform an encoding operation on the write data. The non-volatile memory device 100 may perform the encoding operation to change (or convert or correct) the write data which is to be programmed in the third word line WL3. For example, the non-volatile memory device 100 may change one of erase states, included in the weak pattern, to a non-erase state.

Figure 6:
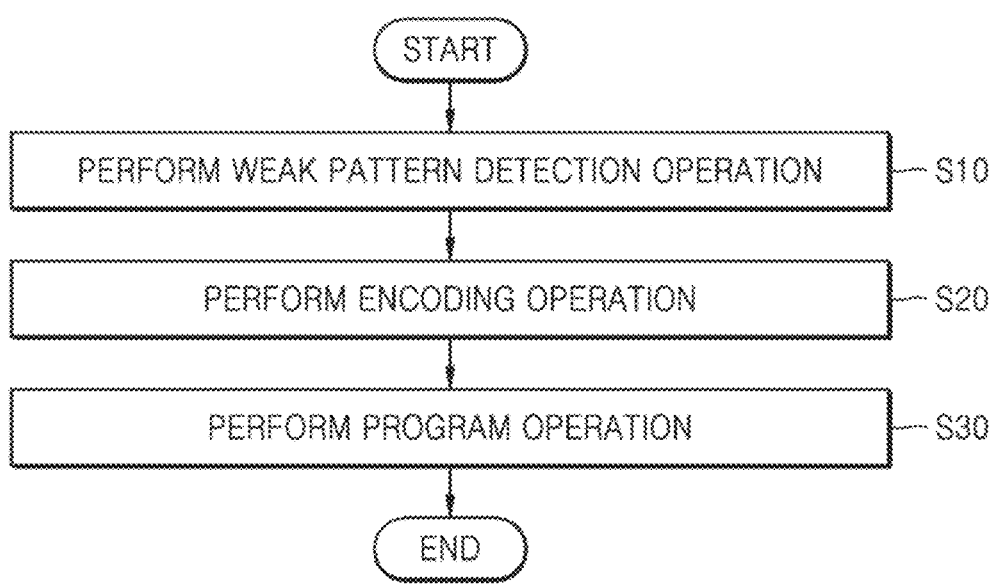
FIG. 6 is a flowchart illustrating an operation of a non-volatile memory device according to an example embodiment.

FIG. 6 is a flowchart illustrating an operation of a non-volatile memory device 100 according to an example embodiment.

Referring to FIGS. 1 and 6, in operation S10, the non-volatile memory device 100 may perform a weak pattern detection operation. The non-volatile memory device 100 may detect a weak pattern, based on data stored in the first word line WL1, data stored in the second word line WL2, and data which is to be stored in the third word line WL3.

The second word line WL2 may be adjacent to the first word line WL1, and the third word line WL3 may be adjacent to the second word line WL2. Memory cells connected with the first word line WL1 may have a state where data is stored, namely, the memory cells connected with the first word line WL1 may have the erase state E or one of the plurality of program states P1 to P7. Memory cells connected with the second word line WL2 may have a state where data is stored, namely, the memory cells connected with the second word line WL2 may have the erase state E or one of the plurality of program states P1 to P7. Memory cells connected with the third word line WL3 may have a state where data is not stored, namely, the memory cells connected with the third word line WL3 may have the erase state E. The non-volatile memory device 100 may include a first pattern (for example, E-P7-E) or a second pattern (for example, E-P6-E).

In operation S20, the non-volatile memory device 100 may perform an encoding operation. In an example embodiment, the non-volatile memory device 100 may generate the FBP data FBP and may convert write data, based on the FBP data FBP. That is, the encoding operation may include an FBP data generating operation and a flip operation. The non-volatile memory device 100 may perform the encoding operation, and thus, may convert the write data (or user data) and may add the FBP data FBP to the user data. The non-volatile memory device 100 may perform the encoding operation on first write data WD1 to generate second write data WD2. The second write data WD2 may include flipped first write data WD1 and the FBP data FBP.

For example, the non-volatile memory device 100 may convert data which is to be programmed in the third word line WL3. The non-volatile memory device 100 may convert data so that a memory cell corresponding to target bits has a non-erase state, so as to remove (or avoid) the weak pattern. The non-volatile memory device 100 may flip or invert the target bits to generate flipped data, based on the FBP data FBP. The non-volatile memory device 100 may add the FBP data FBP to the flipped data to generate encoded data (i.e., the second write data WD2).

In operation S30, the non-volatile memory device 100 may perform a program operation. The non-volatile memory device 100 may program the flipped data and the FBP data FBP. The non-volatile memory device 100 may store the flipped data and the FBP data FBP in the third word line WL3. That is, the non-volatile memory device 100 may program the encoded data (i.e., the second write data WD2). The non-volatile memory device 100 may store the flipped data in a first area and may store the FBP data FBP in a second area. For example, the FBP data FBP may be stored in the second area as metadata. The non-volatile memory device 100 may program the flipped data in memory cells corresponding to a first area AREA1 of the third word line WL3 and may program the FBP data FBP in memory cells corresponding to a second area AREA2 of the third word line WL3.

Figure 7:
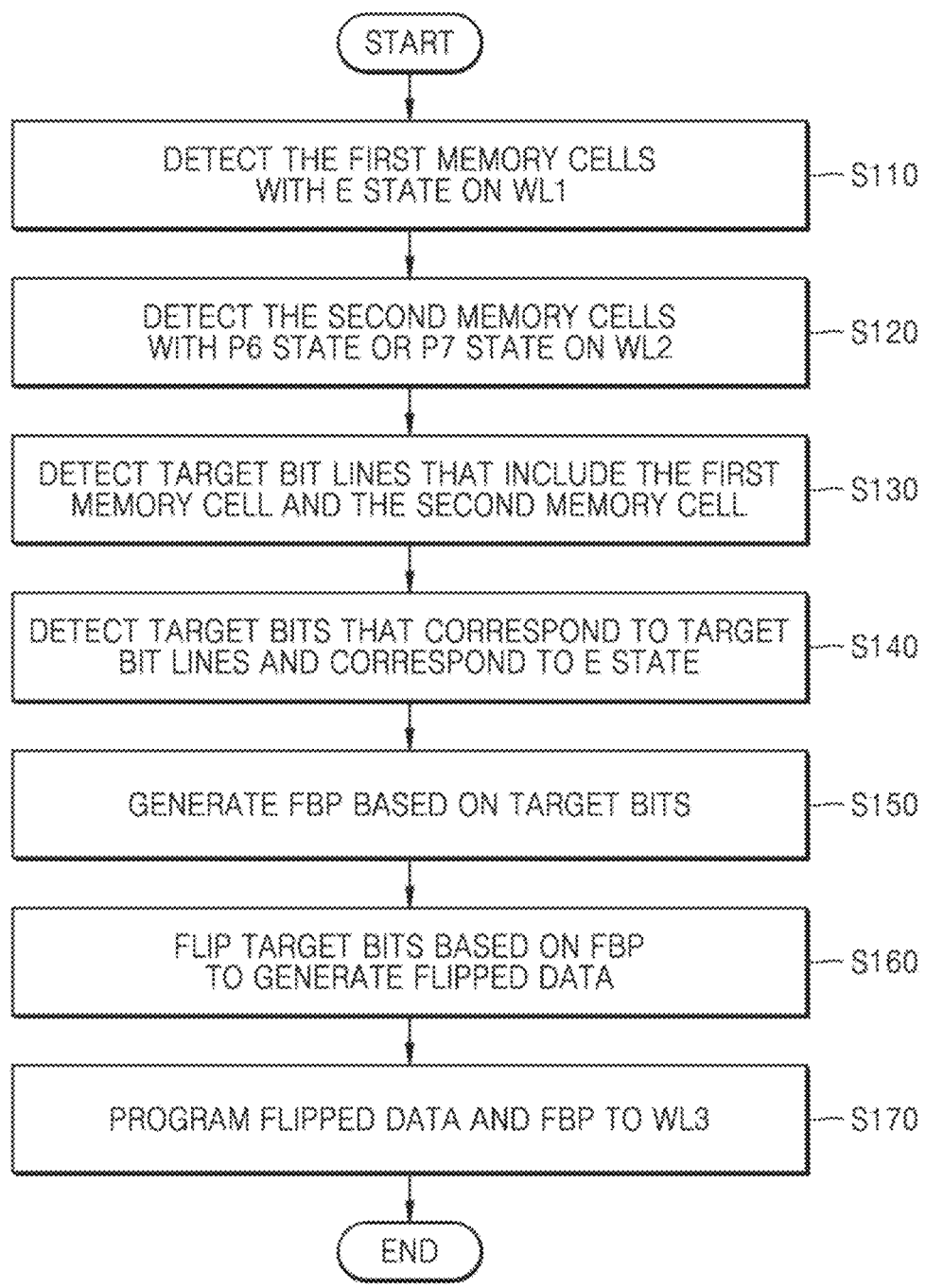
FIG. 7 is a flowchart illustrating an operation of a non-volatile memory device according to an example embodiment.
Figure 8A:
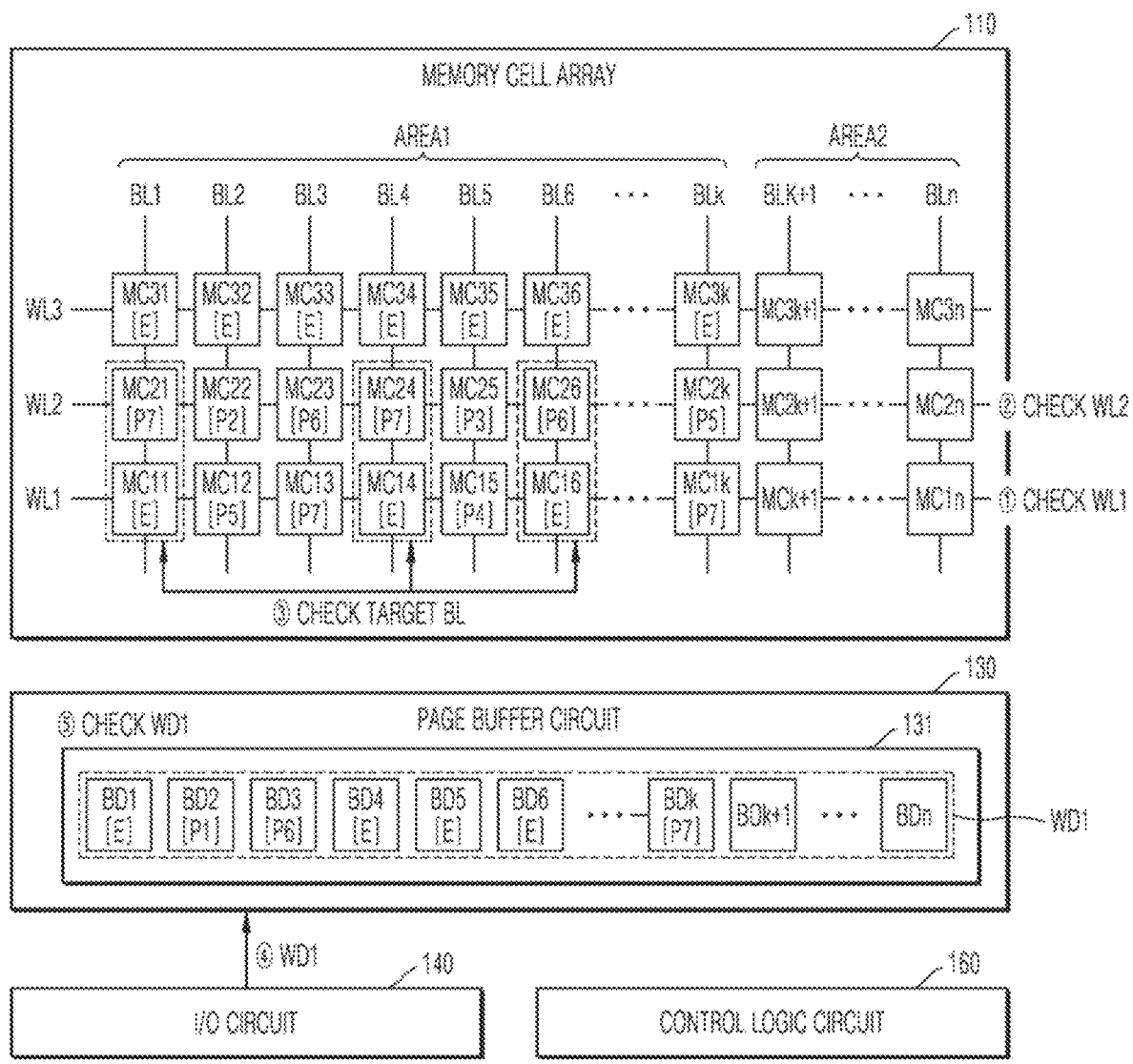
Figure 8C:
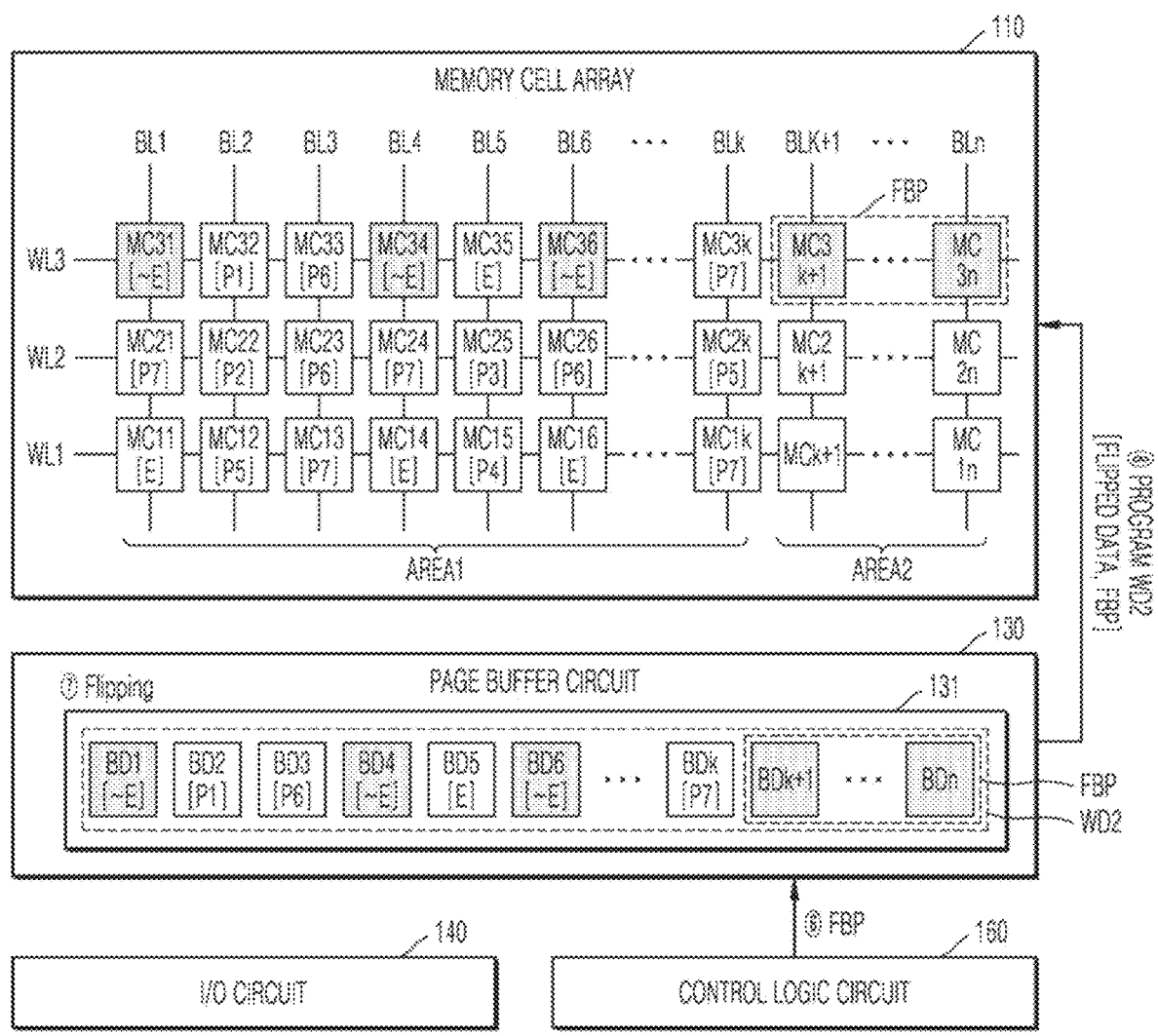

FIG. 7 is a flowchart illustrating an operation of a non-volatile memory device according to an example embodiment. FIGS. 8A to 8C are diagrams for describing an operation of a non-volatile memory device according to an example embodiment.

Referring to FIG. 8A, a memory cell array 110 may include a plurality of memory cells MC11 to MC3n connected with first to third word lines WL1 to WL3 and first to nth bit lines BL1 to BLn. Memory cells connected with the first to kth bit lines BL1 to BLk may be the first area AREA1, and memory cells connected with the kth+1 to nth bit lines BLk+1 to BLn may be the second area AREA2. Memory cells connected with the first word line WL1 may have a state where programming is completed, memory cells connected with the second word line WL2 may have a state where programming is completed, and memory cells connected with the third word line WL3 may have a state before programming is performed after being erased.

For example, the memory cell MC11 may have an erase state E, the memory cell MC12 may have a fifth program state P5, the memory cell MC13 may have a seventh program state P7, the memory cell MC14 may have the erase state E, the memory cell MC15 may have a fourth program state P4, the memory cell MC16 may have the erase state E, and the memory cell MC1k may have the seventh program state P7. The memory cell MC21 may have the seventh program state P7, the memory cell MC22 may have a second program state P2, the memory cell MC23 may have a sixth program state P6, the memory cell MC24 may have the seventh program state P7, the memory cell MC25 may have a third program state P3, the memory cell MC26 may have the sixth program state P6, and the memory cell MC2k may have the fifth program state P5. The memory cells MC31 to MC3k connected with the third word line WL3 may have the erase state E.

Referring to FIGS. 1, 7, and 8A to 8C, in operation S110, the non-volatile memory device 100 may detect first memory cells having erase state E in the first word line WL1. For example, the non-volatile memory device 100 may check the first word line WL1 (①). The non-volatile memory device 100 may detect memory cells having the erase state E in the first area AREA1 of the first word line WL1, so as to detect a weak pattern. The non-volatile memory device 100 may sense the first word line WL1 to detect the first memory cells MC11, MC14, and MC16 having the erase state E. That is, the first memory cells may include the memory cells MC11, MC14, and MC16 of the memory cells MC11 to MC1k connected with the first word line WL1.

In operation S120, the non-volatile memory device 100 may detect second memory cells having the sixth program state P6 or the seventh program state P7 in the second word line WL2. For example, the non-volatile memory device 100 may check the second word line WL2 (②). The non-volatile memory device 100 may detect memory cells having the sixth program state P6 or the seventh program state P7 in the first area AREA1 of the second word line WL2, so as to detect the weak pattern. The non-volatile memory device 100 may sense the second word line WL2 to detect the second memory cells MC21, MC23, MC24, and MC26 having the sixth program state P6 or the seventh program state P7. That is, the second memory cells may include the memory cells MC21, MC23, MC24, and MC26 of the memory cells MC21 to MC2k connected with the second word line WL2.

In operation S130, the non-volatile memory device 100 may detect target bit lines including all of the first memory cell and the second memory cell. For example, the non-volatile memory device 100 may check the target bit lines (③). The memory cell MC11 may be the first memory cell and the memory cell MC21 may be the second memory cell, and thus, the non-volatile memory device 100 may detect the first bit line BL1 as a target bit line. The memory cell MC14 may be the first memory cell and the memory cell MC24 may be the second memory cell, and thus, the non-volatile memory device 100 may detect the fourth bit line BL4 as a target bit line. The memory cell MC16 may be the first memory cell and the memory cell MC26 may be the second memory cell, and thus, the non-volatile memory device 100 may detect the sixth bit line BL6 as a target bit line. That is, the non-volatile memory device 100 may detect the first bit line BL1, the fourth bit line BL4, and the sixth bit line BL6 as the target bit lines.

In operation S140, the non-volatile memory device 100 may correspond to a target bit line and may detect target bit lines corresponding to an erase state. For example, the page buffer circuit 130 may receive the first write data WD1 from the I/O circuit 140 (④). The page buffer circuit 130 may store the first write data WD1 in the data latch 131. The page buffer circuit 130 may check the first write data WD1 (⑤).

Referring to FIG. 8B, the first write data WD1 may include first to third page data PD1 to PD3. A first bit B1 of the first page data PD1 may be '1', a second bit B2 of the first page data PD1 may be '0', a third bit B3 of the first page data PD1 may be '1', a fourth bit B4 of the first page data PD1 may be '1', a fifth bit B5 of the first page data PD1 may be '1', a sixth bit B6 of the first page data PD1 may be '1', and a kth bit Bk of the first page data PD1 may be '1'. A first bit B1 of the second page data PD2 may be '1', a second bit B2 of the second page data PD2 may be '1', a third bit B3 of the second page data PD2 may be '0', a fourth bit B4 of the second page data PD2 may be '1', a fifth bit B5 of the second page data PD2 may be '1', a sixth bit B6 of the second page data PD2 may be '1', and a kth bit Bk of the second page data PD2 may be '0'. A first bit B1 of the third page data PD3 may be '1', a second bit B2 of the third page data PD3 may be '1', a third bit B3 of the third page data PD3 may be '0', a fourth bit B4 of the third page data PD3 may be '1', a fifth bit B5 of the third page data PD3 may be '1', a sixth bit B6 of the third page data PD3 may be '1', and a kth bit Bk of the third page data PD3 may be '1'. That is, a value of a portion, corresponding to the first area AREA1, of the first page data PD1 (or user data of the first page data PD1) may be a k-bit stream [101111 . . . 1], a value of a portion, corresponding to the first area AREA1, of the second page data PD2 (or user data of the second page data PD2) may be a k-bit stream [110111 . . . 0], and a value of a portion, corresponding to the first area AREA1, of the third page data PD3 (or user data of the third page data PD3) may be a k-bit stream [110111 . . . 1].

Values of pieces of page data PD1 to PD3 corresponding to a memory cell may be referred to as bit data. First bit data BD1 may indicate values of pieces of page data PD1 to PD3 corresponding to a memory cell connected with the first bit line BL1, and second bit data BD2 may indicate values of pieces of page data PD1 to PD3 corresponding to a memory cell connected with the second bit line BL2. The other pieces of bit data BD3 to BDn may be as described above, and thus, detailed descriptions thereof are omitted. First to kth bit data BD1 to BDk may each be data which is to be stored in the first area AREA1, and kth+1 to nth bit data BDk+1 to BDn may each be data which is to be stored in the second area AREA2. The first to kth bit data BD1 to BDk may each correspond to user data, and the kth+1 to nth bit data BDK+1 to BDn may each correspond to metadata.

For example, the first bit data BD1 may be [1, 1, 1], the second bit data BD2 may be [0, 1, 1], the third bit data BD3 may be [1, 0, 0], the fourth bit data BD4 may be [1, 1, 1], the fifth bit data BD5 may be [1, 1, 1], the sixth bit data BD1 may be [1, 1, 1], and the kth bit data BDk may be [1, 0, 1]. The first bit data BD1 may correspond to the erase state E, the second bit data BD2 may correspond to the first program state P1, the third bit data BD3 may correspond to the sixth program state P6, the fourth bit data BD4 may correspond to the erase state E, the fifth bit data BD5 may correspond to the erase state E, the sixth bit data BD6 may correspond to the erase state E, and the kth bit data BDk may correspond to the seventh program state P7.

The non-volatile memory device 100 may detect pieces of target bit data corresponding to target bit lines BL1, BL4, and BL6 and corresponding to the erase state E among pieces of bit data BD1 to BDk of the first area AREA1. The non-volatile memory device 100 may detect target bits corresponding to the pieces of target bit data.

For example, the first bit data BD1 may correspond to the target bit line BL1 and may correspond to the erase state E, and thus, the first bit data BD1 may be target bit data and the first bit B1 corresponding to the first bit data BD1 may be a target bit. The second bit data BD2 may not correspond to one of the target bit lines and may have the first program state P1, and thus, the second bit B2 may not be a target bit. The third bit data BD3 may not correspond to one of the target bit lines and may have the sixth program state P6, and thus, the third bit B3 may not be a target bit. The fourth bit data BD4 may correspond to the target bit line BL4 and may correspond to the erase state E, and thus, the fourth bit data BD4 may be target bit data and the fourth bit B4 corresponding to the fourth bit data BD4 may be a target bit. The fifth bit data BD5 may have the erase state E and may not correspond to one of the target bit lines, and thus, the fifth bit B5 may not be a target bit. The sixth bit data BD6 may correspond to the target bit line BL6 and may correspond to the erase state E, and thus, the sixth bit data BD4 may be target bit data and the sixth bit B6 corresponding to the sixth bit data BD6 may be a target bit. The kth bit data BDk may not correspond to one of the target bit lines and may have the seventh program state P7, and thus, the kth bit Bk may not be a target bit. That is, the non-volatile memory device 100 may detect the target bits B1, B4, and B6.

In operation S150, the non-volatile memory device 100 may generate FBP data based on the target bits. The control logic circuit 160 may generate the FBP data based on the target bits. The FBP data may include information about positions of the target bits. For example, the FBP data may include information representing the target bits B1, B4, and B6. The control logic circuit 160 may transfer the FBP data to the page buffer circuit 130 (⑥).

In operation S160, the non-volatile memory device 100 may flip or invert the target bits on the basis of the FBP data to generate flipped data (⑦). For example, in response to the FBP data, the page buffer circuit 130 may flip the first bit data BD1, the fourth bit data BD4, and the sixth bit data BD6 and may thus convert the first bit data BD1, the fourth bit data BD4, and the sixth bit data BD6 to correspond to the non-erase state ~E. The page buffer circuit 130 may flip the target bits to generate flipped data. The page buffer circuit 130 may set the FBP data to a value of each of the kth+1 to nth bit data BDk+1 to BDn corresponding to the second area AREA2. In an example embodiment, the kth+1 to nth bit data BDk+1 to BDn may include the FBP data, but example embodiments are not limited thereto. The kth+1 to nth bit data BDk+1 to BDn may further include metadata.

In operation S170, the non-volatile memory device 100 may program the flipped data and the FBP data in the third word line WL3 (⑧). That is, the non-volatile memory device 100 may store the second write data WD2, including the flipped data and the FBP data, in memory cells connected with the third word line WL3. For example, the row decoder 120 may apply a program voltage and a program verification voltage to the third word line WL3. The page buffer circuit 130 may control voltages of the bit lines BL so that the write data WD is stored in the third word line WL3.

A program result, the flipped data, and the FBP data may be stored in the third word line WL3. The flipped data may be stored in the first area AREA1 of the third word line WL3, and the FBP data may be stored in the second area AREA2 of the third word line WL3. For example, the memory cell MC31 may have the non-erase state ~E, the memory cell MC32 may have the first program state P1, the memory cell MC33 may have the sixth program state P6, the memory cell MC34 may have the non-erase state ~E, the memory cell MC35 may have the erase state E, the memory cell MC36 may have the non-erase state ~E, and the memory cell MC3k may have the seventh program state P7. That is, the memory cells MC31 to MC3k may store the flipped data (or flipped user data). The memory cells MC3k+1 to MC3n may store the FBP data. For example, the FBP data may be stored as metadata.

Figure 9:
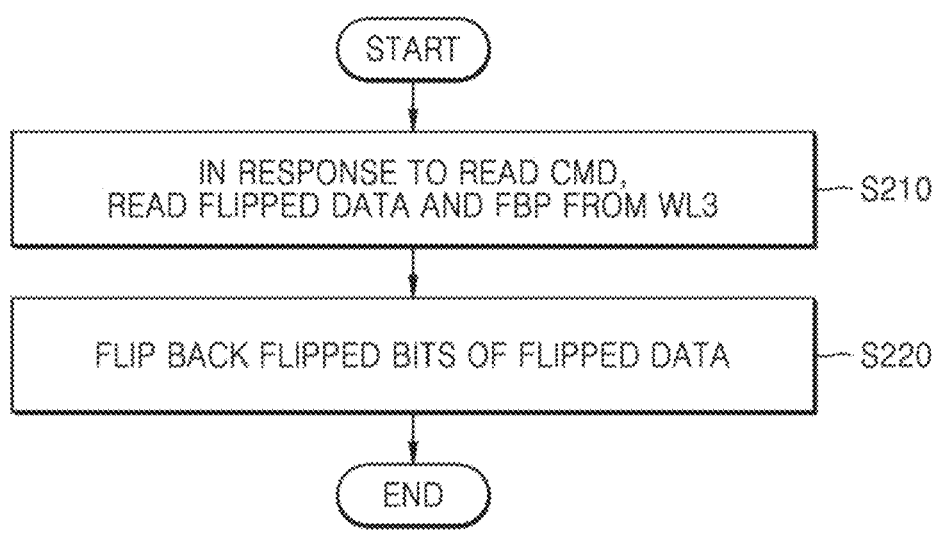
FIG. 9 is a flowchart illustrating an operation of a non-volatile memory device according to an example embodiment.
Figure 10A:
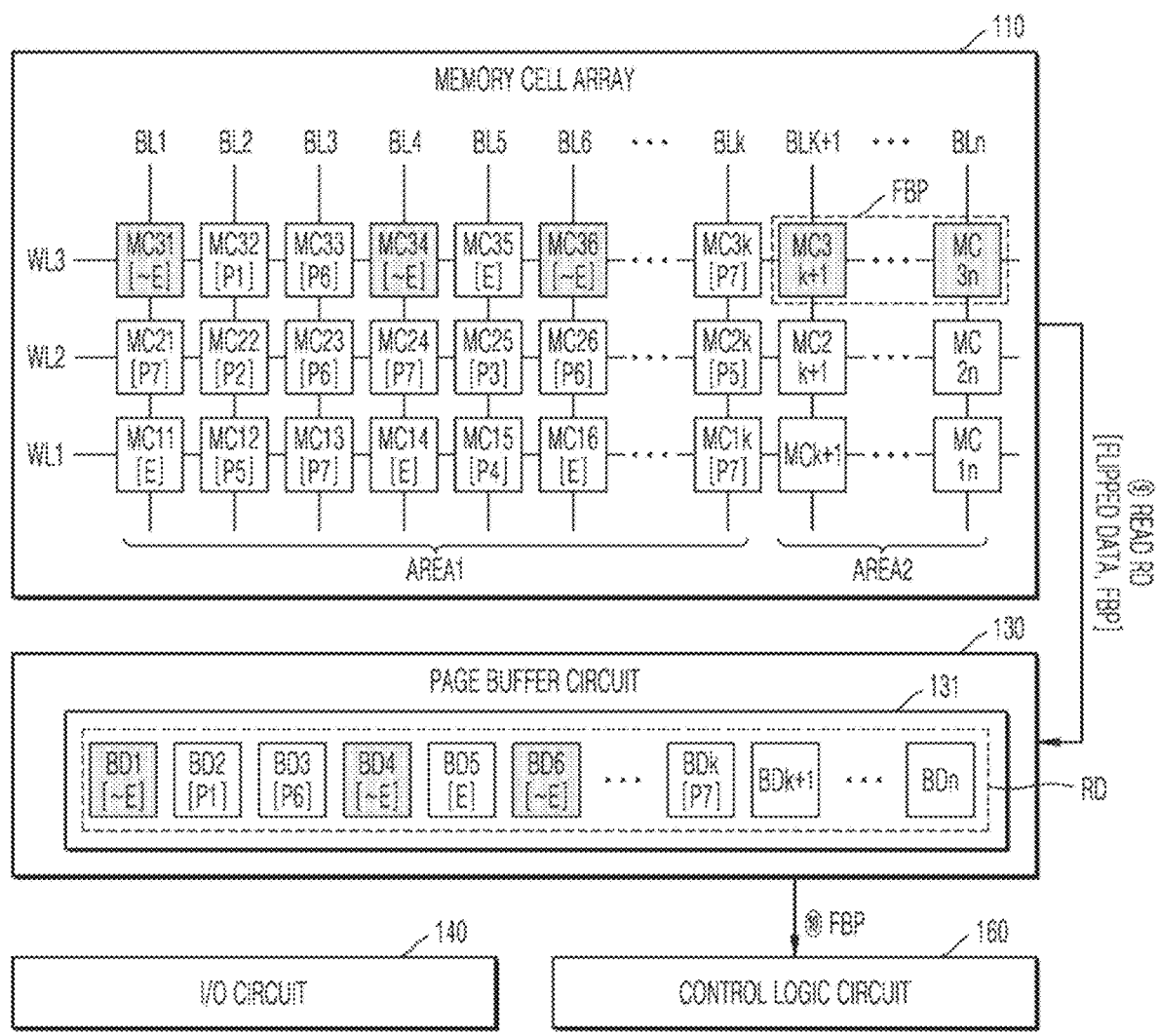
FIGS. 10A and 10B are diagrams for describing an operation of a non-volatile memory device according to an example embodiment.
Figure 10B:
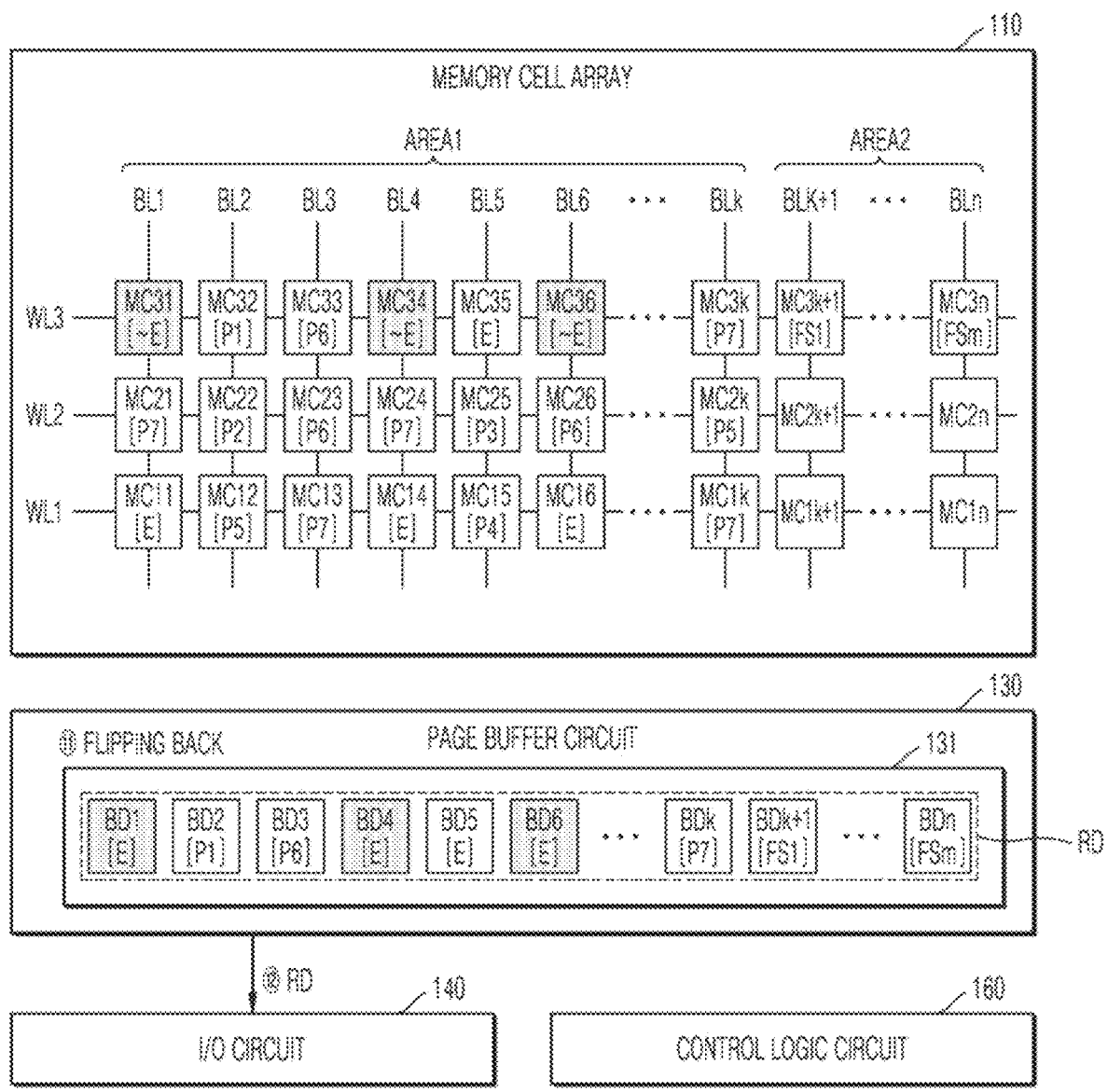

FIG. 9 is a flowchart illustrating an operation of a non-volatile memory device according to an example embodiment. FIGS. 10A and 10B are diagrams for describing an operation of a non-volatile memory device according to an example embodiment.

For convenience of description, detailed descriptions of the elements of FIGS. 8A to 8C are omitted. Referring to FIGS. 9, 10A, and 10B, memory cells connected with a first word line WL1 may have a state where programming is completed, memory cells connected with a second word line WL2 may have a state where programming is completed, and memory cells connected with a third word line WL3 may have a state where programming is completed.

For example, a memory cell MC11 may have an erase state E, a memory cell MC12 may have a fifth program state P5, a memory cell MC13 may have a seventh program state P7, a memory cell MC14 may have the erase state E, a memory cell MC15 may have a fourth program state P4, a memory cell MC16 may have the erase state E, and a memory cell MC1k may have the seventh program state P7. A memory cell MC21 may have the seventh program state P7, a memory cell MC22 may have a second program state P2, a memory cell MC23 may have a sixth program state P6, a memory cell MC24 may have the seventh program state P7, a memory cell MC25 may have a third program state P3, a memory cell MC26 may have the sixth program state P6, and a memory cell MC2k may have the fifth program state P5. A memory cell MC31 may have a non-erase state ~E, a memory cell MC32 may have a first program state P1, a memory cell MC33 may have the sixth program state P6, a memory cell MC34 may have the non-erase state ~E, a memory cell MC35 may have the erase state E, a memory cell MC36 may have the non-erase state ~E, and a memory cell MC3k may have the seventh program state P7.

In operation S210, in response to a read command, the non-volatile memory device 100 may read flipped data and FBP data in the third word line WL3 (⑨). The non-volatile memory device 100 may perform a read operation. For example, the row decoder 120 may apply the read voltage to the third word line WL3. The page buffer circuit 130 may sense a voltage variation of each of bit lines BL to store read data RD in the data latch 131.

For example, the non-volatile memory device 100 may store the read data RD, stored in the third word line WL3, in the data latch 131. As a result of performance of a read operation, the read data RD may be stored in the page buffer circuit 130. The read data RD may include first to nth bit data BD1 to BDn. The first bit data BD1 may correspond to the non-erase state ~E, the second bit data BD2 may correspond to the first program state P1, the third bit data BD3 may correspond to the sixth program state P6, the fourth bit data BD4 may correspond to the non-erase state ~E, the fifth bit data BD5 may correspond to the erase state E, the sixth bit data BD6 may correspond to the non-erase state ~E, and the kth bit data BDK may correspond to the seventh program state P7.

The page buffer circuit 130 may output the FBP data to the control logic circuit 160 (⑩). The control logic circuit 160 may determine positions of flipped bits based on the FBP data. The control logic circuit 160 may transfer a flip bit flag indicating the positions of the flipped bits to the page buffer circuit 130. The flip bit flag may indicate the positions of the flipped bits.

In operation S220, the non-volatile memory device 100 may again flip flipped bits of the flipped data. The non-volatile memory device 100 may perform a decoding operation on the basis of the FBP data to generate decoded data. The non-volatile memory device 100 may perform a re-flip operation based on the FBP data. The non-volatile memory device 100 may again flip the flipped bits so as to remove (or avoid) a weak pattern. The non-volatile memory device 100 may flip the flipped bits of the flipped data to generate decoded data, based on the FBP data. The non-volatile memory device 100 may transfer the decoded data to an external storage controller.

For example, the page buffer circuit 130 may perform a re-flip operation based on the flip bit flag (⑪). The page buffer circuit 130 may convert data, corresponding to the non-erase state ~E, into data corresponding to the erase state E. Therefore, the first bit data BD1 may correspond to the erase state E, the second bit data BD2 may correspond to the first program state P1, the third bit data BD3 may correspond to the sixth program state P6, the fourth bit data BD4 may correspond to the erase state E, the fifth bit data BD5 may correspond to the erase state E, the sixth bit data BD6 may correspond to the erase state E, and the kth bit data BDk may correspond to the seventh program state P7. The page buffer circuit 130 may transfer the read data RD to the I/O circuit 140 (⑫).

FIGS. 11A to 11D are diagrams for describing a first flip operation of a non-volatile memory device according to an example embodiment.

For conciseness of the drawings and convenience of description, a memory cell array 110 may be assumed as including a plurality of memory cells MC11 to MC39 connected with first to third word lines WL1 to WL3 and first to ninth bit lines BL1 to BL9. However, example embodiments are not limited thereto. Also, detailed descriptions of the elements described above are omitted.

For example, memory cells connected with first to sixth bit lines BL1 to BL6 may be a first area AREA1 and memory cells connected with seventh to ninth bit lines BL7 to BL9 may be a second area AREA2. The memory cell MC11 may have an erase state E, the memory cell MC12 may have a fifth program state P5, the memory cell MC13 may have a seventh program state P7, the memory cell MC14 may have the erase state E, the memory cell MC15 may have a fourth program state P4, and the memory cell MC16 may have the erase state E. The memory cell MC21 may have the seventh program state P7, the memory cell MC22 may have a second program state P2, the memory cell MC23 may have a sixth program state P6, the memory cell MC24 may have the seventh program state P7, the memory cell MC25 may have a third program state P3, and the memory cell MC26 may have the sixth program state P6. The memory cells MC31 to MC36 of the first area AREA1 connected with the third word line WL3 may have the erase state E.

In an example embodiment, the first area AREA1 may be divided into a plurality of portions S1 to S3. The first area AREA1 may include first to third portions S1 to S3. For example, the number of portions may be equal to the number of bits stored in a memory cell. When the plurality of memory cells MC11 to MC39 are a triple level cell (TLC) storing information corresponding to three bits, the first area AREA1 may be divided into three portions. The first portion S1 may include memory cells connected with the first and second bit lines BL1 and BL2, the second portion S2 may include memory cells connected with the third and fourth bit lines BL3 and BL4, and the third portion S3 may include memory cells connected with the fifth and sixth bit lines BL5 and BL6. Alternatively, the first portion S1 may correspond to the first and second bit lines BL1 and BL2, the second portion S2 may correspond to the third and fourth bit lines BL3 and BL4, and the third portion S3 may correspond to the fifth and sixth bit lines BL5 and BL6.

A page buffer circuit 130 may receive first write data WD1. The page buffer circuit 130 may store the first write data WD1 in a data latch 131. The first write data WD1 may include first to third page data PD1 to PD3. Similarly to FIG. 8B, a value of a portion, corresponding to the first area AREA1, of the first page data PD1 (or user data of the first page data PD1) may be [101111], a value of a portion, corresponding to the first area AREA1, of the second page data PD2 (or user data of the second page data PD2) may be [110111], and a value of a portion, corresponding to the first area AREA1, of the third page data PD3 (or user data of the third page data PD3) may be [110111].

The first bit data BD1 may correspond to the erase state E, the second bit data BD2 may correspond to the first program state P1, the third bit data BD3 may correspond to the sixth program state P6, the fourth bit data BD4 may correspond to the erase state E, the fifth bit data BD5 may correspond to the erase state E, and the sixth bit data BD6 may correspond to the erase state E.

Figure 11A:
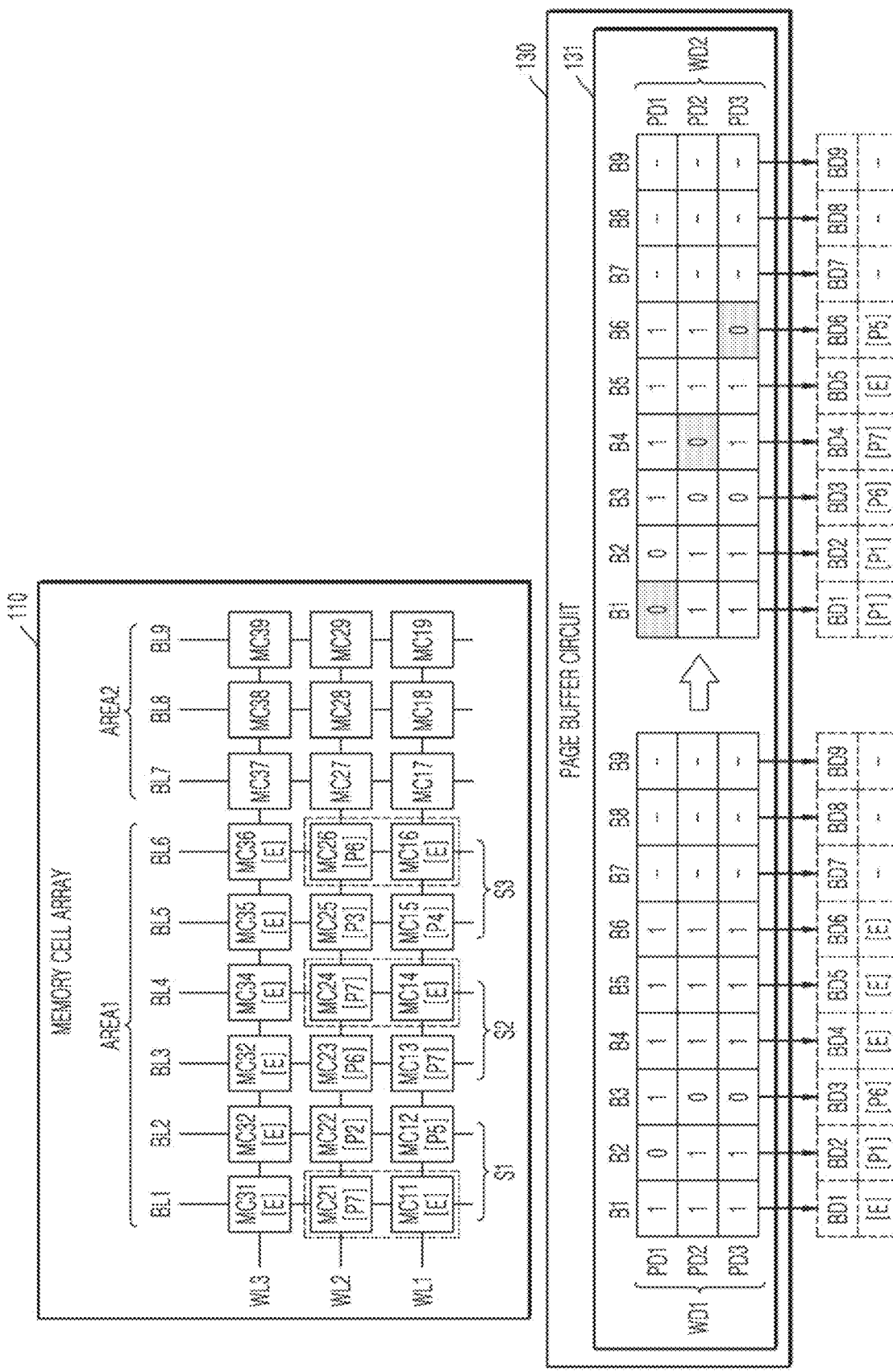
FIGS. 11A, 11B, 11C and 11D are diagrams for describing a first flip operation of a non-volatile memory device according to an example embodiment.
Figure 11B:
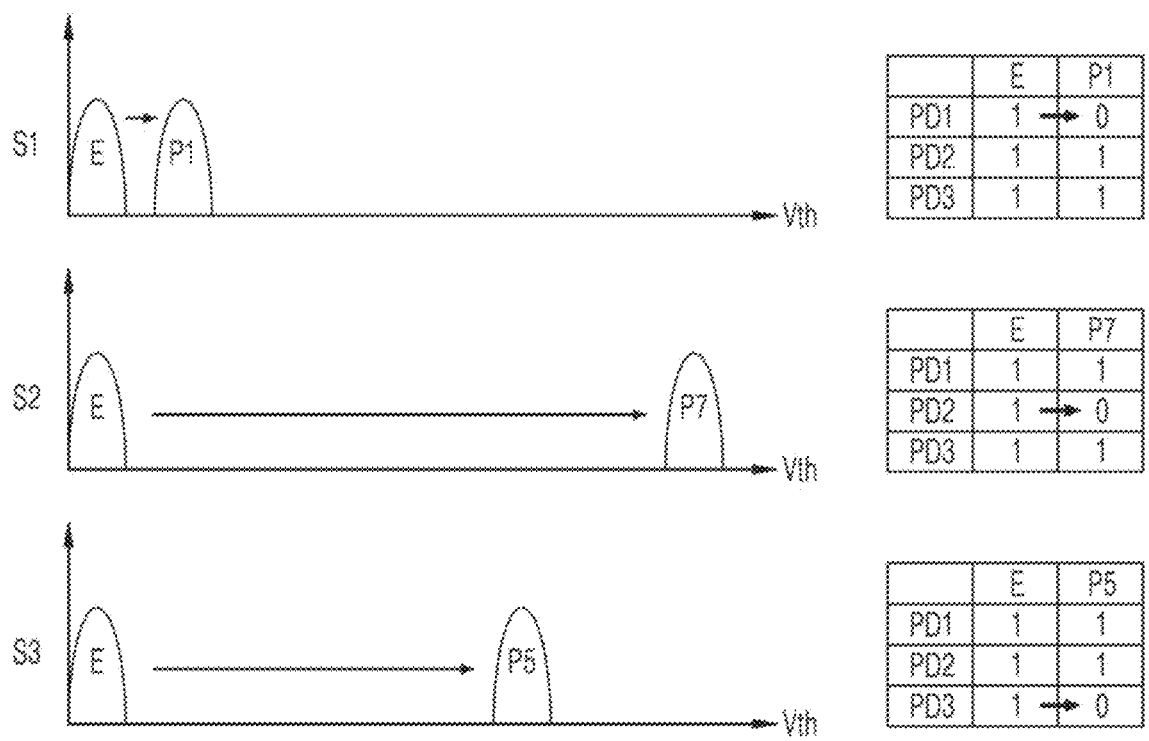

Referring to FIG. 11B, when a weak pattern is detected in the first portion S1, the non-volatile memory device 100 may convert (or flip) bit data BD, corresponding to the erase state E, into bit data BD corresponding to the first program state P1. That is, when target bits are detected in bits B1 and B2 corresponding to the first portion S1, the non-volatile memory device 100 may convert [1, 1, 1] into [0, 1, 1]. That is, the non-volatile memory device 100 may flip a target bit, corresponding to the first portion S1, into data corresponding to the first page data PD1 (for example, an LSB page).

When a weak pattern is detected in the second portion S2, the non-volatile memory device 100 may convert (or flip) bit data BD, corresponding to the erase state E, into bit data BD corresponding to the seventh program state P7. That is, when target bits are detected in bits B1 and B2 corresponding to the second portion S2, the non-volatile memory device 100 may convert [1, 1, 1] into [1, 0, 1]. That is, the non-volatile memory device 100 may flip a target bit, corresponding to the second portion S2, into data corresponding to the second page data PD2 (for example, a CSB page).

When a weak pattern is detected in the third portion S3, the non-volatile memory device 100 may convert (or flip) bit data BD, corresponding to the erase state E, into bit data BD corresponding to the fifth program state P5. That is, when target bits are detected in bits B1 and B2 corresponding to the third portion S3, the non-volatile memory device 100 may convert [1, 1, 1] into [1, 1, 0]. That is, the non-volatile memory device 100 may flip a target bit, corresponding to the third portion S3, into data corresponding to the third page data PD3 (for example, an MSB page).

Referring again to FIG. 11A, the non-volatile memory device 100 may perform an encoding operation on the first write data WD1 to generate second write data WD2. The non-volatile memory device 100 may perform a flip operation on data corresponding to the first area AREA1 of the first write data WD1 to generate flipped first write data WD1. The non-volatile memory device 100 may add FBP data to the flipped first write data WD1 to generate the second write data WD2.

The non-volatile memory device 100 may sense the first word line WL1 to detect the first memory cells MC11, MC14, and MC16. The non-volatile memory device 100 may sense the second word line WL2 to detect the second memory cells MC21, MC23, MC24, and MC26. The non-volatile memory device 100 may detect target bit lines, based on the first memory cells MC11, MC14, and MC16 and the second memory cells MC21, MC23, MC24, and MC26. The first bit line BL1 may include the first memory cell MC11 and the second memory cell MC21, and thus, the non-volatile memory device 100 may detect a target bit line, based on the first bit line BL1. The fourth bit line BL4 may include the first memory cell MC14 and the second memory cell MC24, and thus, the non-volatile memory device 100 may detect a target bit line, based on the fourth bit line BL4. The sixth bit line BL6 may include the first memory cell MC16 and the second memory cell MC26, and thus, the non-volatile memory device 100 may detect a target bit line, based on the sixth bit line BL6.

When it is determined that bit data BD corresponding to a target bit line corresponds to an erase state, the non-volatile memory device 100 may determine a bit, corresponding to the bit data BD, as a target bit. The non-volatile memory device 100 may check bit data BD of target bit lines BL1, BL4, and BL6. First bit data BD1 corresponding to the first bit line BL1 may correspond to the erase state E, and thus, the non-volatile memory device 100 may determine a first bit B1 as a target bit. Fourth bit data BD4 corresponding to the fourth bit line BL4 may correspond to the erase state E, and thus, the non-volatile memory device 100 may determine a fourth bit B4 as a target bit. Sixth bit data BD6 corresponding to the sixth bit line BL6 may correspond to the erase state E, and thus, the non-volatile memory device 100 may determine a sixth bit B6 as a target bit. That is, the non-volatile memory device 100 may detect target bits B1, B4, and B6.

The target bits may include first to third sub target bits STB1 to STB3. Alternatively, the target bits may be divided into the first to third sub target bits STB1 to STB3. The first sub target bits STB1 may represent bits corresponding to the first portion S1 among the target bits, the second sub target bits STB2 may represent bits corresponding to the second portion S2 among the target bits, and the third sub target bits STB3 may represent bits corresponding to the third portion S3 among the target bits. The target bits and the sub target bits may be listed in the following Table 1.

TABLE 1

| TB | STB1 | B1 |
|---|---|---|
|    | STB3 | B4 |
|    | STB3 | B6 |

Referring to Table 1, the target bits TB may include the first, fourth, and sixth bits B1, B4, and B6. The first sub target bits STB1 may include the first bit B1, the second sub target bits STB2 may include the fourth bit B4, and the third sub target bits STB3 may include the sixth bit B6.

The non-volatile memory device 100 may perform an encoding operation, based on the target bits. The non-volatile memory device 100 may flip the target bits to generate flipped first write data. The non-volatile memory device 100 may add the FBP data to the flipped first write data to generate the second write data WD2.

The first bit B1 may correspond to the first portion S1 (i.e., the first bit line BL1 corresponding to the first bit B1 may correspond to the first portion S1), and thus, the non-volatile memory device 100 may change the erase state E to the first program state P1. That is, the non-volatile memory device 100 may flip the first bit B1 of the first page data PD1. For example, the non-volatile memory device 100 may flip the first bit B1 of the first page data PD1 from '1' to '0'.

The fourth bit B4 may correspond to the second portion S2 (i.e., the fourth bit line BL4 corresponding to the fourth bit B4 may correspond to the second portion S2), and thus, the non-volatile memory device 100 may change the erase state E to the seventh program state P7. That is, the non-volatile memory device 100 may flip the fourth bit B4 of the second page data PD2. For example, the non-volatile memory device 100 may flip the fourth bit B4 of the second page data PD2 from '1' to '0'.

The sixth bit B6 may correspond to the third portion S3 (i.e., the sixth bit line BL6 corresponding to the sixth bit B6 may correspond to the third portion S3), and thus, the non-volatile memory device 100 may change the erase state E to the fifth program state P5. That is, the non-volatile memory device 100 may flip the sixth bit B6 of the third page data PD3. For example, the non-volatile memory device 100 may flip the sixth bit B6 of the third page data PD3 from '1' to '0'.

In an example embodiment, the non-volatile memory device 100 may flip the first sub target bits STB1 in the first page data PD1. Alternatively, the non-volatile memory device 100 may flip data corresponding to the first sub target bits STB1 in the first page data PD1. The non-volatile memory device 100 may flip the second sub target bits STB2 in the second page data PD2. Alternatively, the non-volatile memory device 100 may flip data corresponding to the second sub target bits STB2 in the second page data PD2. The non-volatile memory device 100 may flip the third sub target bits STB3 in the third page data PD3. Alternatively, the non-volatile memory device 100 may flip data corresponding to the third sub target bits STB3 in the third page data PD3.

For example, the first sub target bits STB1 may be the first bit B1, and thus, the non-volatile memory device 100 may flip the first bit B1 of the first page data PD1 from '1' to '0'. The second sub target bits STB2 may be the fourth bit B4, and thus, the non-volatile memory device 100 may flip the fourth bit B4 of the second page data PD2 from '1' to '0'. The third sub target bits STB3 may be the sixth bit B6, and thus, the non-volatile memory device 100 may flip the sixth bit B6 of the third page data PD3 from '1' to '0'.

Figure 11C:
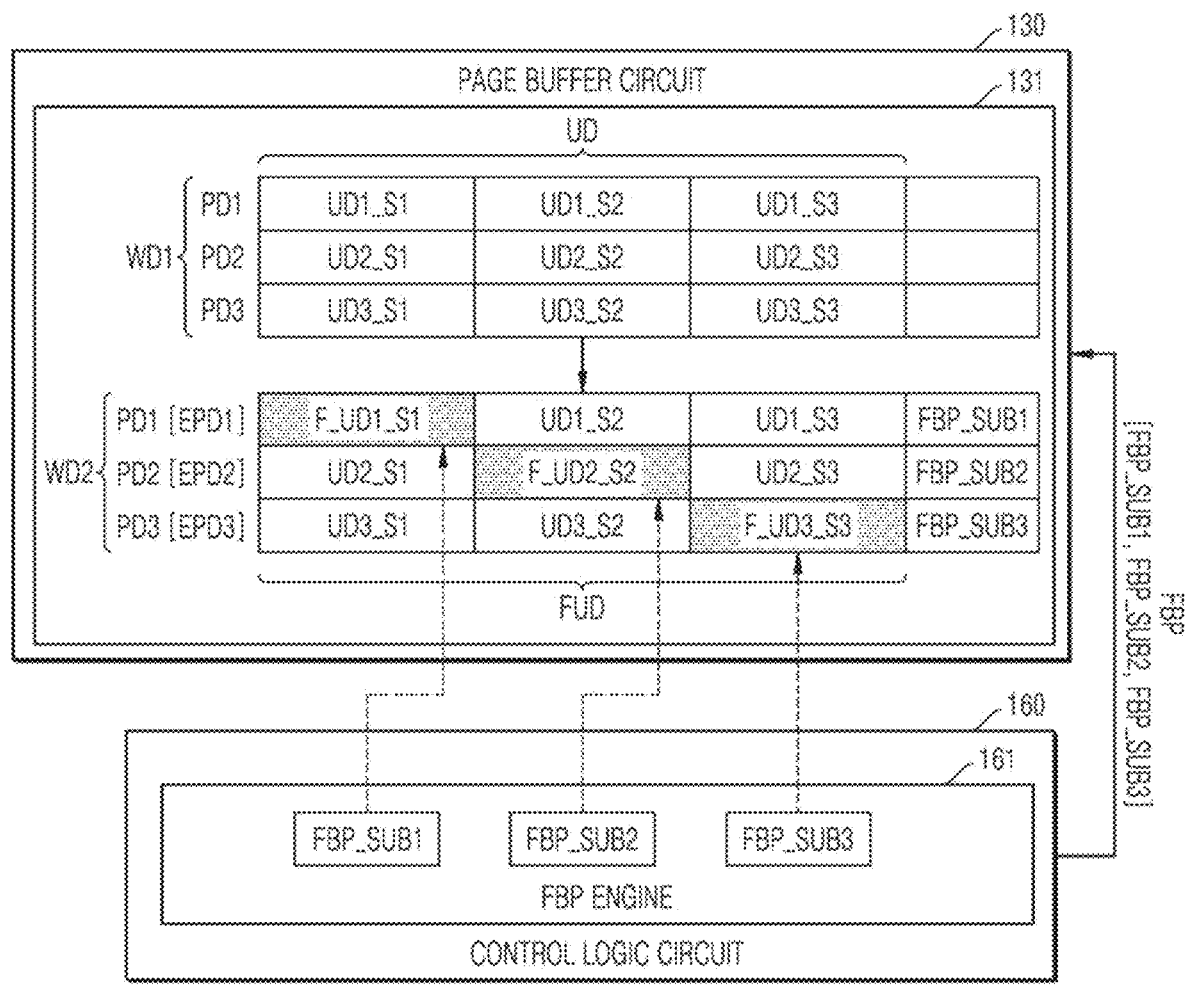

Referring to FIG. 11C, the non-volatile memory device 100 may generate FBP data. The page buffer circuit 130 may output target bits (or a position of a weak pattern) to the control logic circuit 160. The control logic circuit 160 may generate the FBP data based on the target bits (or the position of the weak pattern). The FBP data may include first to third sub FBP data FBP_SUB1 to FBP_SUB3. The control logic circuit 160 may output data (i.e., the first to third sub FBP data FBP_SUB1 to FBP_SUB3) to the page buffer circuit 130.

For example, the non-volatile memory device 100 may generate the first sub FBP data FBP_SUB1 corresponding to the first page data PD1. The non-volatile memory device 100 may generate the second sub FBP data FBP_SUB2 corresponding to the second page data PD2. The non-volatile memory device 100 may generate the third sub FBP data FBP_SUB3 corresponding to the third page data PD3.

In an example embodiment, the non-volatile memory device 100 may flip the first page data PD1 of the first write data WD1 to generate first flipped page data and may add the first sub FBP data FBP_SUB1 to the first flipped page data to generate first encoded page data EPD1. The non-volatile memory device 100 may flip the second page data PD2 of the first write data WD1 to generate second flipped page data and may add the second sub FBP data FBP_SUB2 to the second flipped page data to generate second encoded page data EPD2. The non-volatile memory device 100 may flip the third page data PD3 of the first write data WD1 to generate third flipped page data and may add the third sub FBP data FBP_SUB3 to the third flipped page data to generate third encoded page data EPD3.

The page data PD may include user data UD corresponding to a first area AREA1 and data corresponding to a second area AREA2. The user data may include first sub user data corresponding to the first portion S1, second sub user data corresponding to the second portion S3, and third sub user data corresponding to the third portion S3.

The first write data WD1 may include first to third page data PD1 to PD3. The first page data PD1 may include user data UD1 corresponding to the first area AREA1 and data corresponding to the second area AREA2. The user data UD1 of the first page data PD1 may include first sub user data UD1_S1, second sub user data UD1_S2, and third sub user data UD1_S3. The second page data PD2 may include user data UD2 corresponding to the first area AREA1 and data corresponding to the second area AREA2. The user data UD2 of the second page data PD2 may include first sub user data UD2_S1, second sub user data UD2_S2, and third sub user data UD2_S3. The third page data PD3 may include user data UD3 corresponding to the first area AREA1 and data corresponding to the second area AREA2. The user data UD2 of the third page data PD3 may include first sub user data UD3_S1, second sub user data UD3_S2, and third sub user data UD3_S3.

The non-volatile memory device 100 may perform a flip operation on the first sub user data UD1_S1 of the first page data PD1 to generate flipped first sub user data F_UD1_S1. That is, the non-volatile memory device 100 may convert the first sub user data UD1_S1 into the flipped first sub user data F_UD1_S1. The non-volatile memory device 100 may perform a flip operation on the second sub user data UD2_S2 of the second page data PD2 to generate flipped second sub user data F_UD2_S2. That is, the non-volatile memory device 100 may convert the second sub user data UD2_S2 into the flipped second sub user data F_UD2_S2. The non-volatile memory device 100 may perform a flip operation on the third sub user data UD3_S3 of the third page data PD3 to generate flipped third sub user data F_UD3_S3. That is, the non-volatile memory device 100 may convert the third sub user data UD3_S3 into the flipped third sub user data F_UD3_S3.

The first sub FBP data FBP_SUB1 may correspond to the flipped first sub user data F_UD1_S1, the second sub FBP data FBP_SUB2 may correspond to the flipped second sub user data F_UD2_S2, and the third sub FBP data FBP_SUB3 may correspond to the flipped third sub user data F_UD3_S3.

The first sub FBP data FBP_SUB1 may indicate flip bit position information about the first page buffer PD1, the second sub FBP data FBP_SUB2 may indicate flip bit position information about the second page buffer PD2, and the third sub FBP data FBP_SUB3 may indicate flip bit position information about the third page buffer PD3.

Alternatively, the first sub FBP data FBP_SUB1 may indicate position information about flipped bits in the flipped first sub user data F_UD1_S1, the second sub FBP data FBP_SUB2 may indicate position information about flipped bits in the flipped second sub user data F_UD2_S2, and the third sub FBP data FBP_SUB3 may indicate position information about flipped bits in the flipped third sub user data F_UD3_S3.

The non-volatile memory device 100 may add the FBP data to the flipped first write data to generate the second write data WD2. That is, the non-volatile memory device 100 may generate second write data WD2, based on the first write data WD1, the flipped first sub user data F_UD1_S1, the flipped second sub user data F_UD2_S2, the flipped third sub user data F_UD3_S3, the first sub FBP data FBP_SUB1, the second sub FBP data FBP_SUB2, and the third sub FBP data FBP_SUB3.

The second write data WD2 may include first to third page data PD1 to PD3. The first page data PD1 may include flipped first user data FUD1 and first sub FBP data FBP_SUB1. The flipped first user data FUD1 may include flipped first sub user data F_UD1_S1, second sub user data UD1_S2, and third sub user data UD1_S3. The second page data PD2 may include flipped second user data FUD2 and second sub FBP data FBP_SUB2. The flipped second user data FUD2 may include first sub user data UD2_S1, flipped second sub user data F_UD2_S2, and third sub user data UD2_S3. The third page data PD3 may include flipped third user data FUD3 and third sub FBP data FBP_SUB3. The flipped third user data FUD3 may include first sub user data UD3_S1, second sub user data UD3_S2, and flipped third sub user data F_UD3_S3.

Figure 11D:
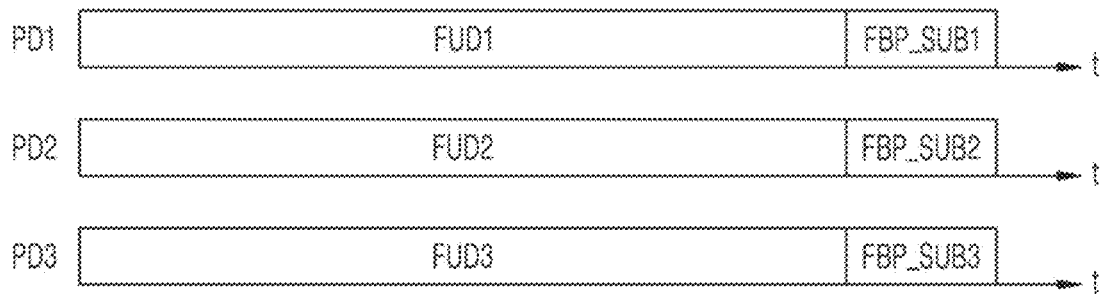

Referring to FIG. 11D, the non-volatile memory device 100 may receive a read command corresponding to the first page data PD1. In response to the read command, the non-volatile memory device 100 may read only first encoded page data EPD1 to provide decoded data to the storage controller. The first sub FBP data may indicate information about positions of flipped bits in the flipped first user data FUD1, and thus, even when the other pieces of sub FBP data are not read, the non-volatile memory device 100 may perform a re-flip operation.

That is, the non-volatile memory device 100 may read the first encoded page data EPD1, and thus, may perform a re-flip operation to provide decoded data. Like the second page data PD2 and the third page data PD3, the non-volatile memory device 100 may read second encoded page data EPD2, and thus, may perform a decoding operation to provide decoded data. The non-volatile memory device 100 may read third encoded page data EPD3, and thus, may perform a decoding operation to provide decoded data.

In an example embodiment, the non-volatile memory device 100 may store FBP data, corresponding to page data, in encoded page data corresponding to the page data. For example, the non-volatile memory device 100 may store FBP data, indicating flipped bits of the second page data PD2, in the second encoded page data EPD2 but may not store the FBP data in the first encoded page data EPD1 or the third encoded page data EPD3, and thus, may not read the other page data, for the FBP data. The non-volatile memory device 100 according to an example embodiment may perform a weak pattern detection operation and an encoding operation to remove (or avoid) a weak pattern. Accordingly, the lifetime and read delay time of a storage device including the non-volatile memory device 100 may be largely improved.

Figure 12A:
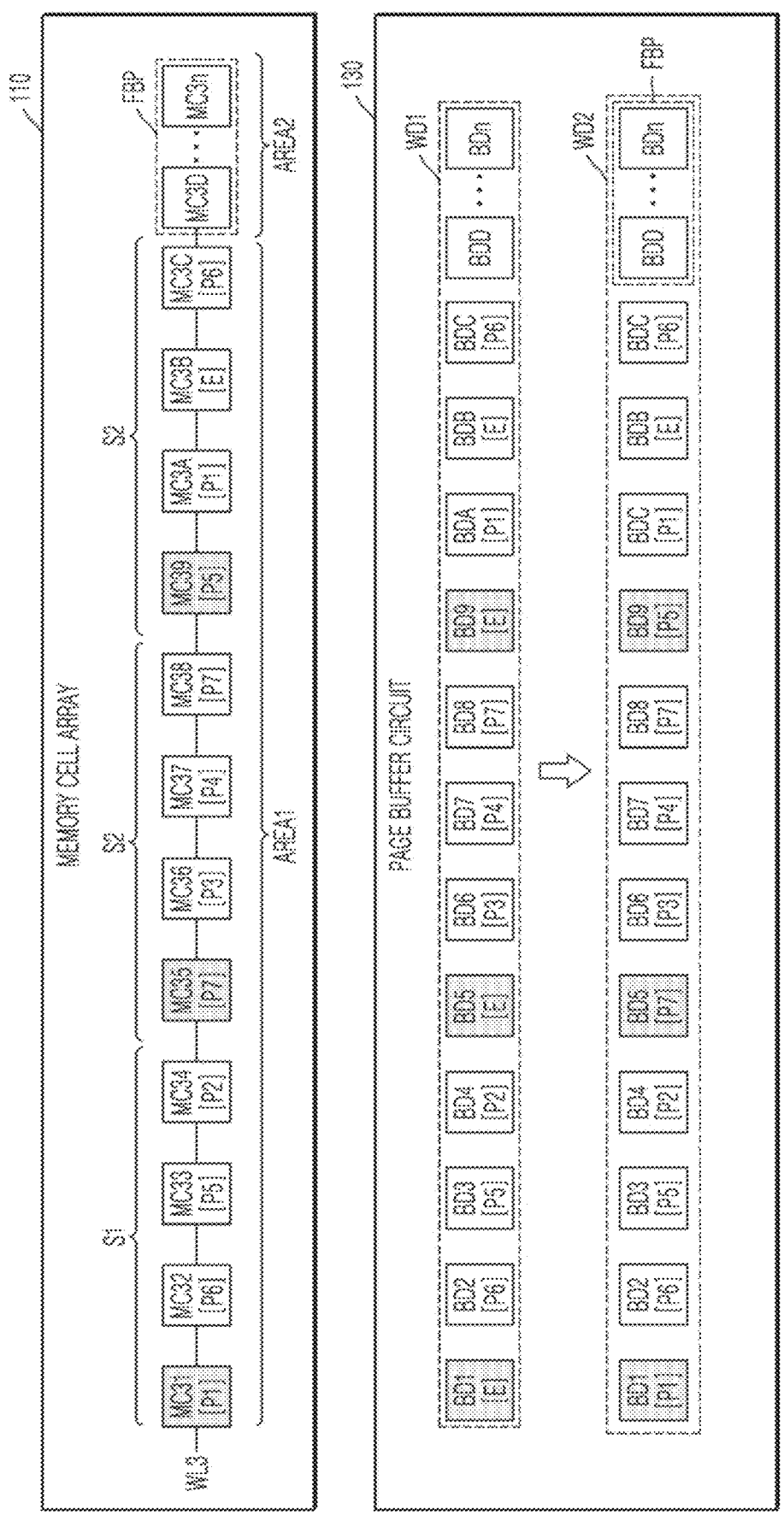
FIGS. 12A and 12B are diagrams for describing a second flip operation of a non-volatile memory device according to an example embodiment.
Figure 12B:
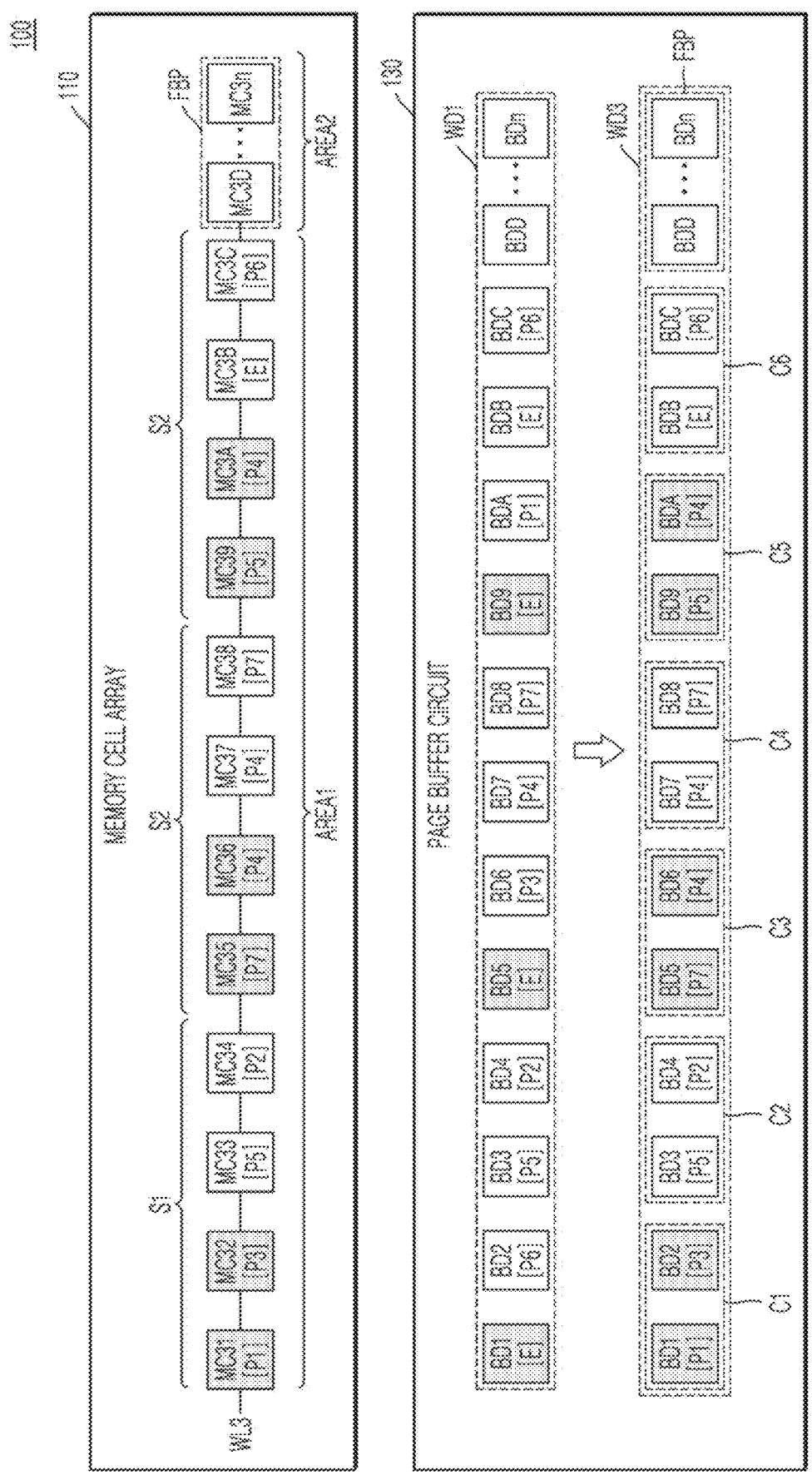
Figure 13A:
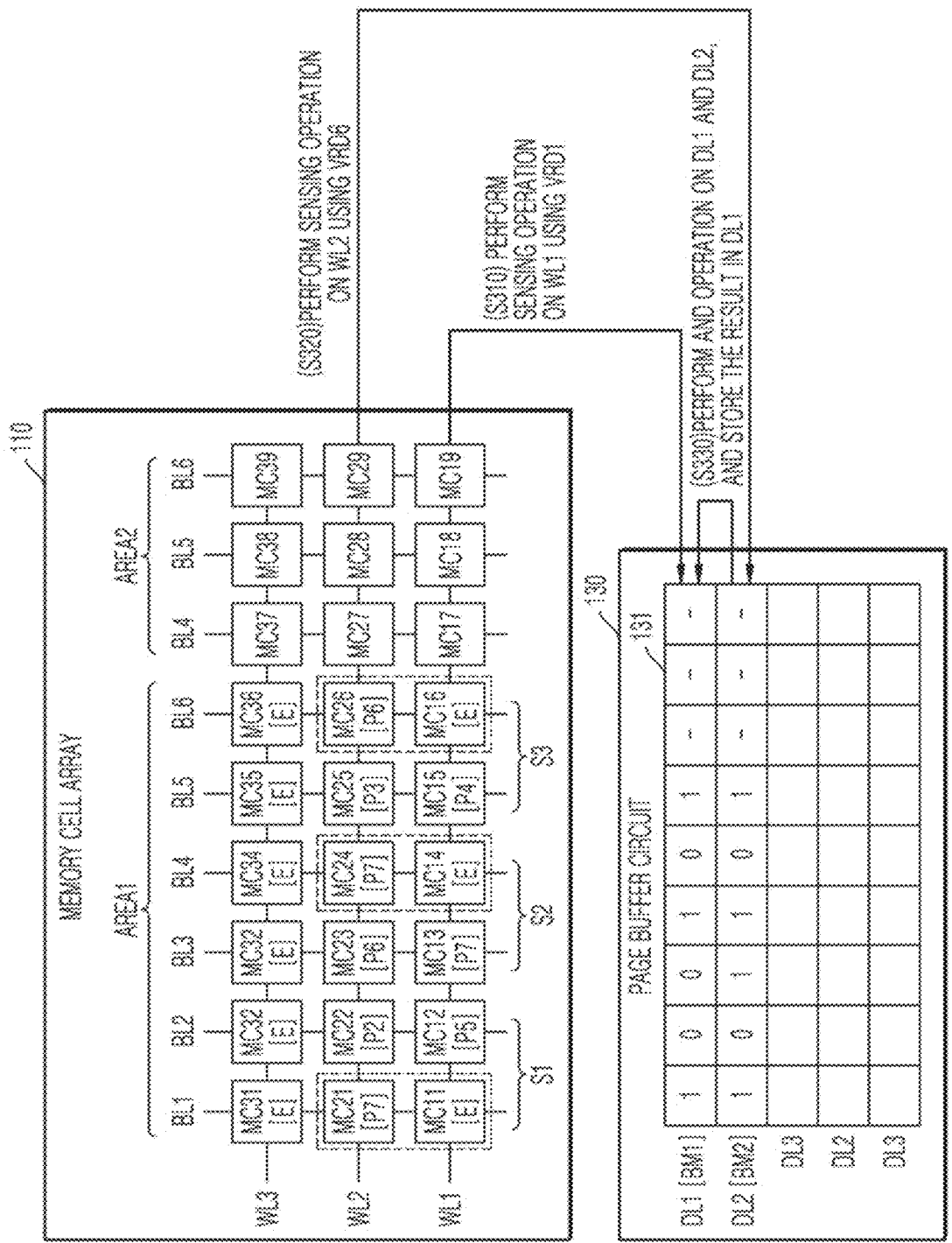
FIGS. 13A, 13B, 13C, 13D, 13E, 13F and 13G are diagrams for describing a write operation of a non-volatile memory device according to an example embodiment.
Figure 13B:
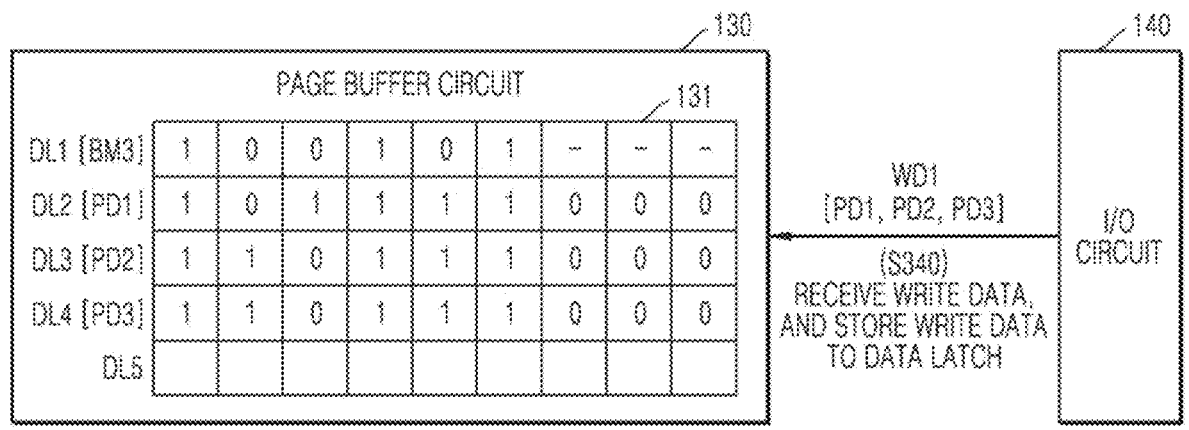
Figure 13C:
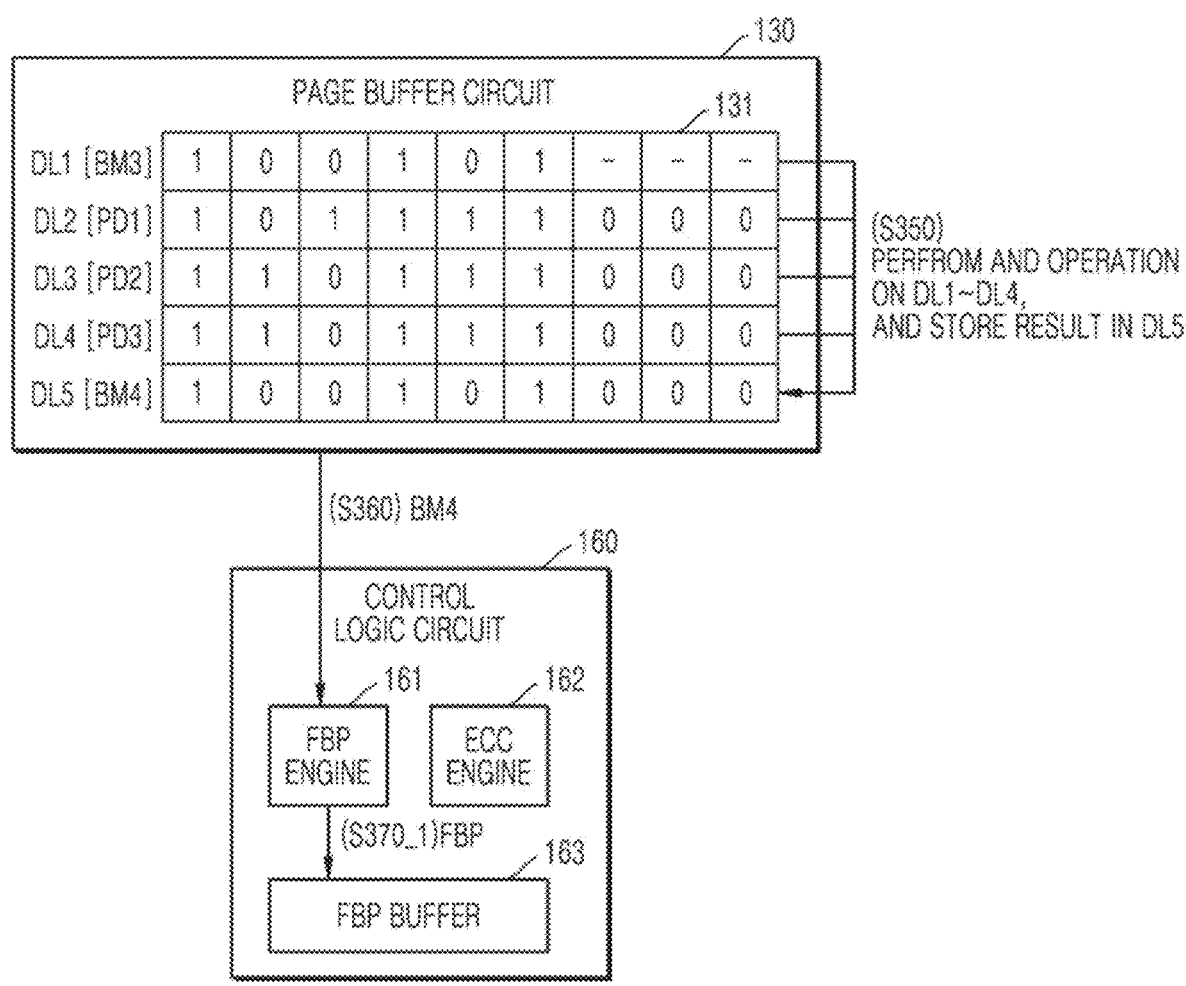
Figure 13D:
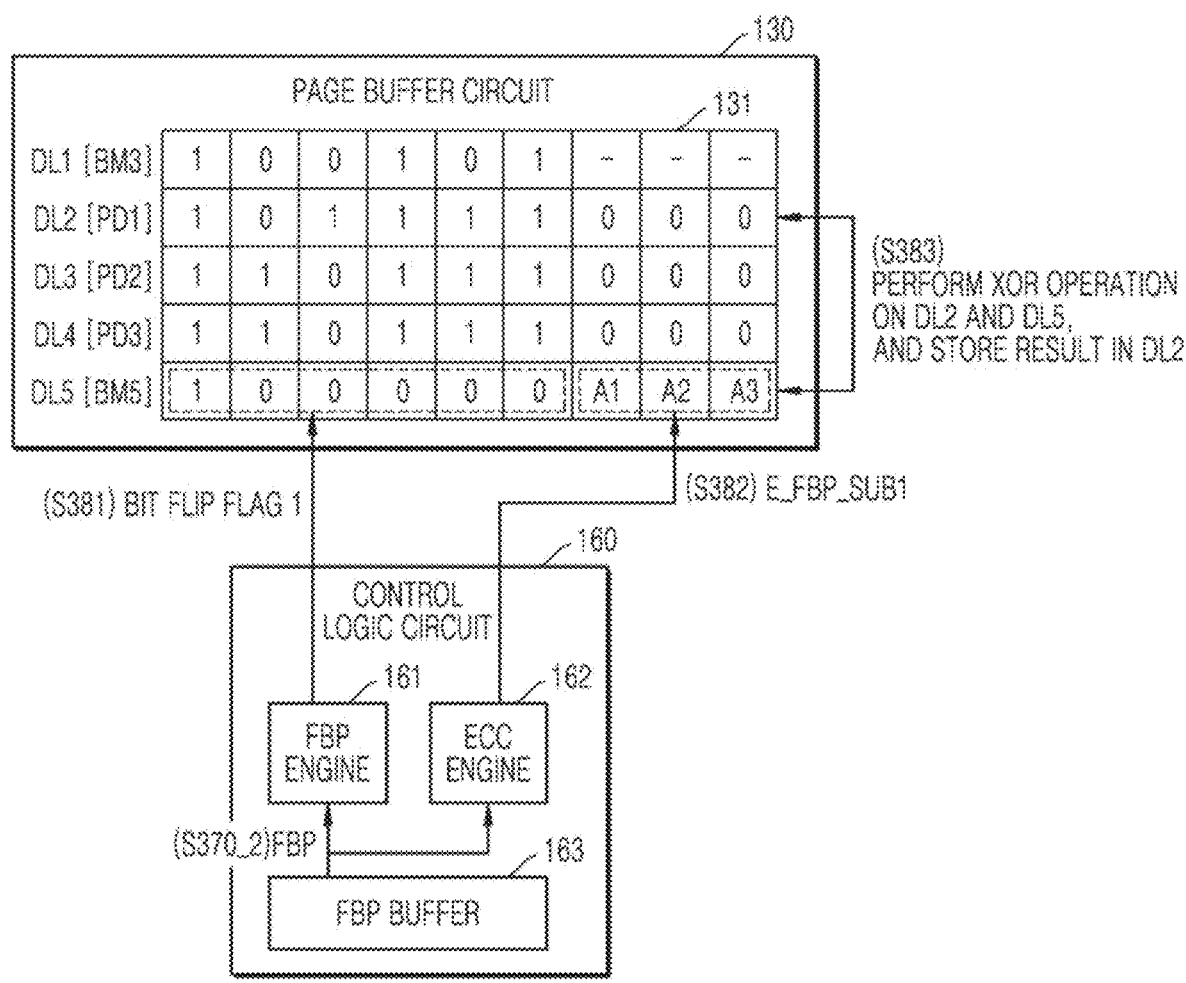
Figure 13E:
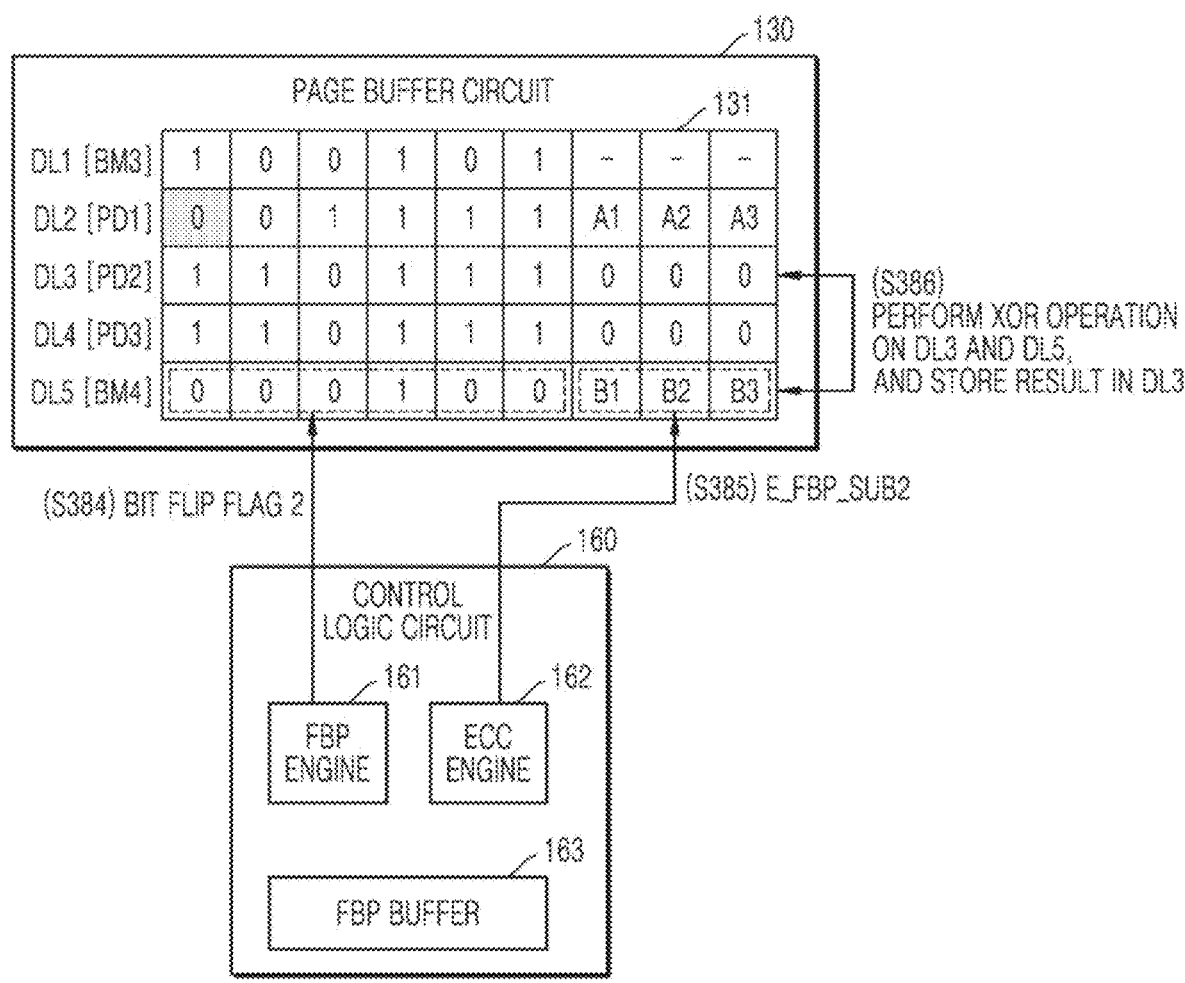
Figure 13F:
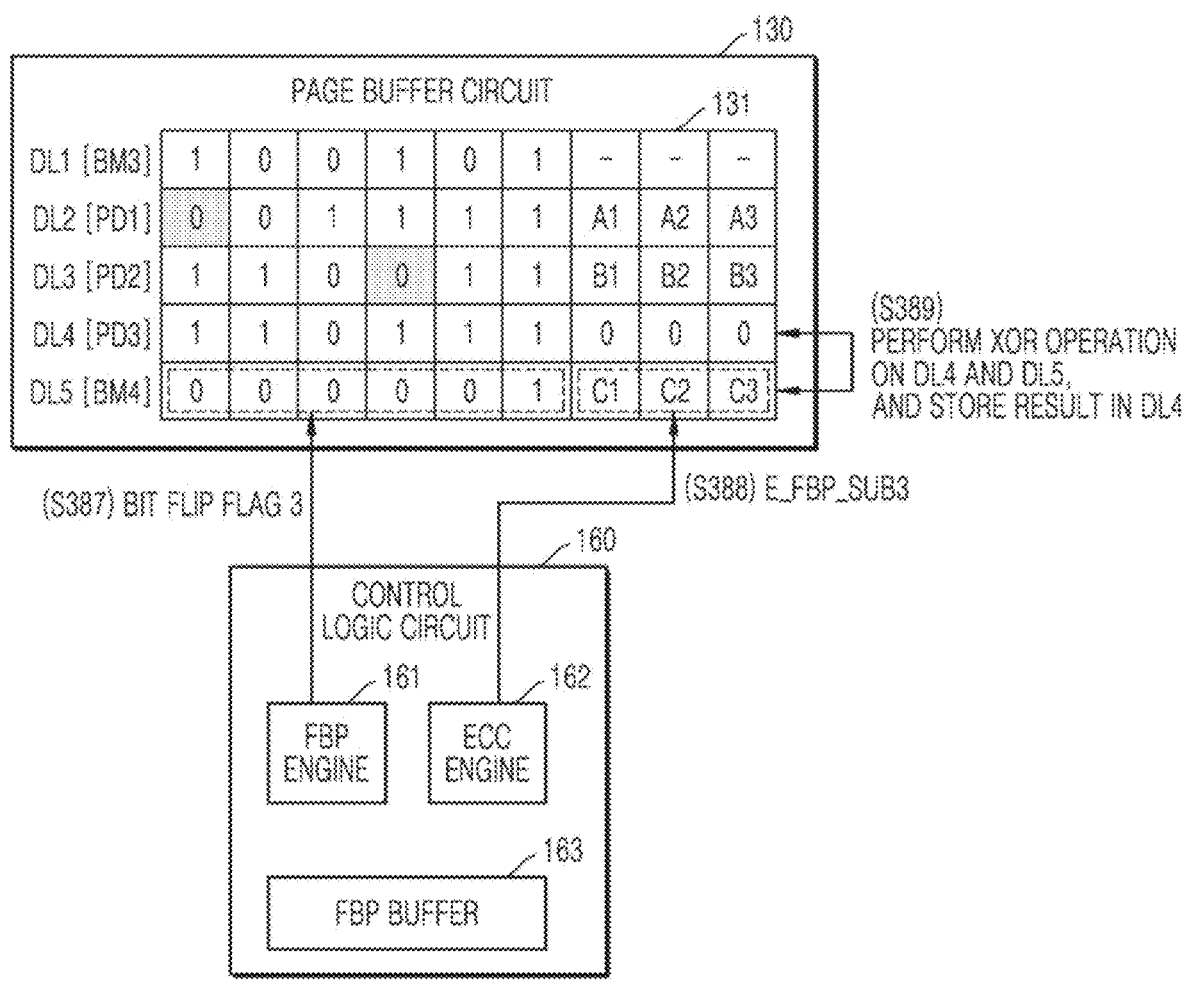
Figure 13G:
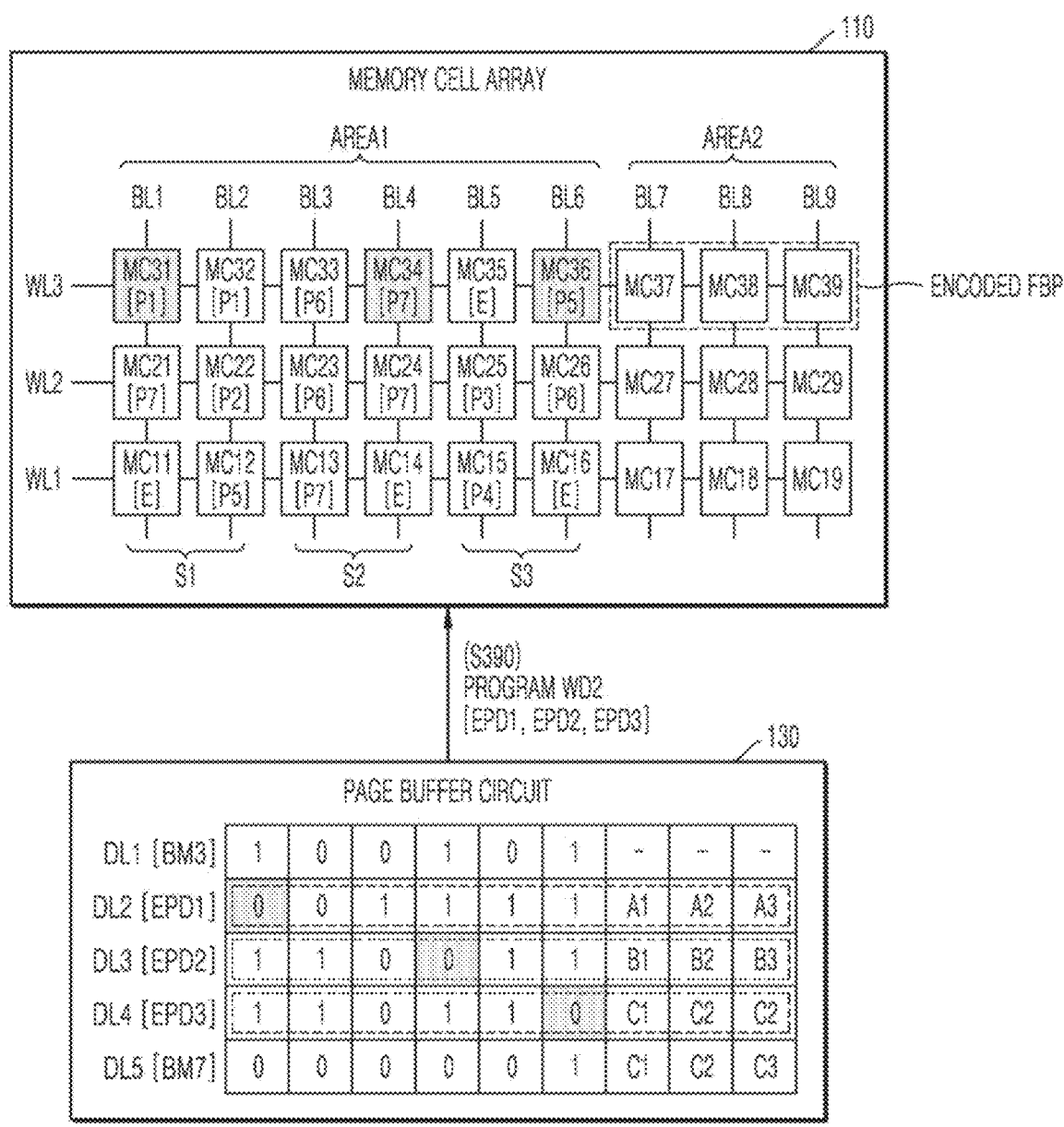

FIGS. 12A and 12B are diagrams for describing a second flip operation of a non-volatile memory device according to an example embodiment.

Referring to FIGS. 12A and 12B, the non-volatile memory device 100 may perform a second flip operation instead of a first flip operation. FIG. 12A illustrates a programmed state after a first flip operation (or a bit flip operation) described above with reference to FIGS. 11A and 11B is performed. FIG. 12B illustrates a programmed state after a second flip operation (or a chunk flip operation) is performed.

For convenience of description, FIGS. 12A and 12B illustrate only memory cells connected with a third word line WL3, and reference numerals or detailed descriptions of elements which are the same as or similar to the elements described above are omitted. Hereinafter, omitted elements may be implemented based on each or a combination of example embodiments described herein. Target bits may be assumed to be first, fifth, and ninth bits B1, B5, and B9.

A memory cell array 110 may include memory cells MC31 to MC3n connected with a third word line WL3. The memory cells MC31 to MC3C may be included in a first area AREA1, and the memory cells MC3D to MC3n may be included in a second area AREA2. The memory cells MC31 to MC34 may be included in a first portion S1, the memory cells MC35 to MC38 may be included in a second portion S2, and the memory cells MC39 to MC3C may be included in a third portion S3.

The non-volatile memory device 100 may store second write data WD2 in the third word line WL3. The non-volatile memory device 100 may store flipped user data FUD in the first area AREA1 and may store FBP data in the second area AREA2.

Referring to FIG. 12A, the memory cell MC31 may have a first program state P1, the memory cell MC32 may have a sixth program state P6, the memory cell MC33 may have a fifth program state P5, the memory cell MC34 may have a second program state P2, the memory cell MC35 may have a seventh program state P7, the memory cell MC36 may have a third program state P3, the memory cell MC37 may have a fourth program state P4, the memory cell MC38 may have the seventh program state P7, the memory cell MC39 may have the fifth program state P5, the memory cell MC3A may have the first program state P1, the memory cell MC3B may have an erase state E, and the memory cell MC3C may have a sixth program state P6.

A first bit B1 may be a target bit and may correspond to the first portion S1, and thus, the non-volatile memory device 100 may perform a flip operation to change first bit data BD1 from data, corresponding to the erase state E, to data corresponding to the first program state P1. Therefore, the memory cell MC31 may have the first program state P1. A fifth bit B5 may be a target bit and may correspond to the second portion S2, and thus, the non-volatile memory device 100 may perform a flip operation to change fifth bit data BD5 from data, corresponding to the erase state E, to data corresponding to the seventh program state P7. Therefore, the memory cell MC35 may have the seventh program state P7. A ninth bit B9 may be a target bit and may correspond to the third portion S3, and thus, the non-volatile memory device 100 may perform a flip operation to change ninth bit data BD9 from data, corresponding to the erase state E, to data corresponding to the fifth program state P5. Therefore, the memory cell MC39 may have the fifth program state P5.

Referring to FIG. 12B, the non-volatile memory device 100 may perform a second flip operation. The non-volatile memory device 100 may perform a second flip operation on the first write data WD1 to generate third write data WD3. The second flip operation may indicate an operation of flipping all chunks including a target bit.

In an example embodiment, write data may include a plurality of chunks. Data corresponding to a first area of the write data may be divided into a plurality of chunks. For example, the first write data WD1 may include first to sixth chunks C1 to C6. The first chunk C1 may include first and second bit data BD1 and BD2, the second chunk C2 may include third and fourth bit data BD3 and BD4, the third chunk C3 may include fifth and sixth bit data BD5 and BD6, the fourth chunk C4 may include seventh and eighth bit data BD7 and BD8, the fifth chunk C5 may include ninth and tenth bit data BD9 and BDA, and the sixth chunk C6 may include eleventh and twelfth bit data BDB and BDC. That is, the first chunk C1 may correspond to first and second bits B1 and B2, the second chunk C2 may correspond to third and fourth bits B3 and B4, the third chunk C3 may correspond to fifth and sixth bits B5 and B6, the fourth chunk C4 may correspond to seventh and eighth bits B7 and B8, the fifth chunk C5 may correspond to ninth and tenth bits B9 and B10, and the sixth chunk C6 may correspond to eleventh and twelfth bits BD11 and BD12.

The non-volatile memory device 100 may perform a second flip operation. The second flip operation may indicate an operation of flipping data corresponding to all bits included in a chunk including a target bit. The second flip operation may be a chunk flip operation. Target neighboring bits may not be a target bit (i.e., may not correspond to the target bit) but may indicate bits included in the same chunk along with the target bit. For example, the non-volatile memory device 100 may flip data corresponding to target bits. The non-volatile memory device 100 may flip data corresponding to the target neighboring bits.

For example, the target bits may include first, fifth, and ninth bits B1, B5, and B9. The target neighboring bits may include second, sixth, and tenth bits B2, B6, and B10. The non-volatile memory device 100 may flip data corresponding to the target bits and may also flip data corresponding to the target neighboring bits.

The target bits may include first to third sub target bits STB1 to STB3. The first sub target bits STB1 may include the first bit B1, the second sub target bits STB2 may include the fifth bit B5, and the third sub target bits STB3 may include the ninth bit B9. The non-volatile memory device 100 may flip data corresponding to a first sub target bit (i.e., the first bit B1) of the first page data PD1, flip data corresponding to a second sub target bit (i.e., the fifth bit B5)

of the second page data PD2, and flip data corresponding to a third sub target bit (i.e., the ninth bit B9) of the third page data PD3.

In an example embodiment, target neighboring bits TNB may include first to third sub neighboring bits SNB1 to SNB3. Alternatively, the target neighboring bits TNB may be divided into the first to third sub neighboring bits SNB1 to SNB3. The first sub neighboring bits SNB1 may indicate bits corresponding to the first portion S1 among the target neighboring bits TNB, the second sub neighboring bits SNB2 may indicate bits corresponding to the second portion S2 among the target neighboring bits TNB, and the third sub neighboring bits SNB3 may indicate bits corresponding to the third portion S3 among the target neighboring bits TNB. The target neighboring bits and the sub neighboring bits may be listed in the following Table 2.

TABLE 2

| TNB | SNB1 | B2 |
|-----|------|-----|
|     | SNB3 | B6 |
|     | SNB3 | B10 |

Referring to Table 2, the target neighboring bits TNB may include the second, sixth, and tenth bits B2, B6, and B10. The first sub neighboring bits SNB1 may include the second bit B2, the second sub neighboring bits SNB2 may include the sixth bit B6, and the third sub neighboring bits SNB3 may include the tenth bit B10. The non-volatile memory device 100 may flip data corresponding to a first sub neighboring bit (i.e., the second bit B2) of the first page data PD1, flip data corresponding to a second sub neighboring bit (i.e., the sixth bit B6) of the second page data PD2, and flip data corresponding to a third sub neighboring bit (i.e., the tenth bit B10) of the third page data PD3.

Because the first bit B1 is the target bit, the non-volatile memory device 100 may flip all of the first chunk C1 corresponding to the first bit B1. That is, the non-volatile memory device 100 may convert the first and second bit data BD1 and BD2. The first and second bit data BD1 and BD2 may correspond to the first portion S1, and thus, the non-volatile memory device 100 may flip a bit corresponding to the first page data PD1. Therefore, the non-volatile memory device 100 may change the first bit data BD1 from a value (for example, [1, 1, 1]), corresponding to the erase state E, to a value (for example, [0, 1, 1]) corresponding to the first program state P1. The non-volatile memory device 100 may change the second bit data BD2 from a value (for example, [1, 0, 0]), corresponding to the sixth program state P6, to a value (for example, [0, 0, 0]) corresponding to the third program state P3.

Because the fifth bit B5 is the target bit, the non-volatile memory device 100 may flip all of the third chunk C3 corresponding to the fifth bit B5. That is, the non-volatile memory device 100 may convert the fifth and sixth bit data BD5 and BD6. The fifth and sixth bit data BD5 and BD6 may correspond to the second portion S2, and thus, the non-volatile memory device 100 may flip a bit corresponding to the second page data PD2. Therefore, the non-volatile memory device 100 may change the fifth bit data BD5 from a value (for example, [1, 1, 1]), corresponding to the erase state E, to a value (for example, [1, 0, 1]) corresponding to the seventh program state P7. The non-volatile memory device 100 may change the sixth bit data BD6 from a value (for example, [0, 0, 0]), corresponding to the third program state P3, to a value (for example, [0, 1, 0]) corresponding to the fourth program state P4.

Because the ninth bit B9 is the target bit, the non-volatile memory device 100 may flip all of the sixth chunk C6 corresponding to the ninth bit B9. That is, the non-volatile memory device 100 may convert the ninth and tenth bit data BD9 and BDA. The ninth and tenth bit data BD9 and BD10 may correspond to the third portion S3, and thus, the non-volatile memory device 100 may flip a bit corresponding to the third page data PD3. Therefore, the non-volatile memory device 100 may change the ninth bit data BD9 from a value (for example, [1, 1, 1]), corresponding to the erase state E, to a value (for example, [1, 1, 0]) corresponding to the fifth program state P5. The non-volatile memory device 100 may change the tenth bit data BD10 from a value (for example, [0, 1, 1]), corresponding to the first program state P1, to a value (for example, [0, 1, 0]) corresponding to the fourth program state P4.

The non-volatile memory device 100 may perform a chunk flip operation to flip the first, third, and fifth chunks C1, C3, and C5, and thus, may generate chunk-flipped first write data. The non-volatile memory device 100 may add the FBP data to the chunk-flipped first write data to generate the third write data WD3. The non-volatile memory device 100 may store the third write data WD3 in the third word line WL3. Therefore, the memory cell MC31 connected with the third word line WL3 may have the first program state P1, the memory cell MC32 may have the third program state P3, the memory cell MC33 may have the fifth program state P5, the memory cell MC34 may have the second program state P2, the memory cell MC35 may have the seventh program state P7, the memory cell MC36 may have the fourth program state P4, the memory cell MC37 may have the fourth program state P4, the memory cell MC38 may have the seventh program state P7, the memory cell MC39 may have the fifth program state P5, the memory cell MC3A may have the fourth program state P4, the memory cell MC3B may have the erase state E, and the memory cell MC3C may have the sixth program state P6.

As described above, the non-volatile memory device 100 may perform the second flip operation. As flipping is performed by chunk units, a size of the FBP data may be reduced. The non-volatile memory device 100 may perform the second flip operation to efficiently manage a storage space.

FIGS. 13A to 13G are diagrams for describing a write operation of a non-volatile memory device according to an example embodiment.

For conciseness of the drawings and convenience of description, a memory cell array 110 may be assumed as including a plurality of memory cells MC11 to MC39 connected with first to third word lines WL1 to WL3 and first to ninth bit lines BL1 to BL9. However, example embodiments are not limited thereto. Reference numerals or detailed descriptions of elements which are the same as or similar to the elements described above are omitted. Hereinafter, omitted elements may be implemented based on each or a combination of example embodiments described herein. A page buffer circuit 130 may include a data latch 131, and the data latch 131 may include first to fifth data latches DL1 to DL5.

The non-volatile memory device 100 may use a plurality of read voltages so as to read data stored in the memory cell array 110. For example, the non-volatile memory device 100 may perform a read operation by using first and fifth read voltages VRD1 and VRD5, so as to read first page data PD1. The non-volatile memory device 100 may perform a read operation by using second, fourth, and sixth read voltages VRD2, VRD4, and VRD6, so as to read second page data PD2. The non-volatile memory device 100 may perform a read operation by using third and seventh read voltages VRD3 and VRD7, so as to read third page data PD3.

Unlike a read operation, in performing a weak pattern detection operation, it may not be needed to accurately check a data value stored in the first word line WL1. That is, because the non-volatile memory device 100 needs to detect only first memory cells corresponding to an erase state E in the first word line WL1, the non-volatile memory device 100 may perform sensing by using only the first read voltage VRD1. Unlike the read operation, in performing the weak pattern detection operation, it may not be needed to accurately check a data value stored in the second word line WL2. That is, because the non-volatile memory device 100 needs to detect only first memory cells corresponding to a sixth program state P6 or a seventh program state P7 in the second word line WL2, the non-volatile memory device 100 may perform sensing by using only the sixth read voltage VRD6.

Referring to FIGS. 13A to 13G, the non-volatile memory device 100 may perform the weak pattern detection operation. In operation S310, the non-volatile memory device 100 may perform a first sensing operation on the first word line WL1 by using the first read voltage VRD1. The non-volatile memory device 100 may sense the first word line WL1 to detect first memory cells having an erase state E1 in the first word line WL1. The non-volatile memory device 100 may perform the first sensing operation on the first word line WL1 by using only the first read voltage VRD1. The non-volatile memory device 100 may generate a first bitmap BM1 through the first sensing operation. The non-volatile memory device 100 may perform the first sensing operation to store the first bitmap BM1, indicating the first memory cells, in the first data latch DL1. The non-volatile memory device 100 may sense a voltage variation of a bit line BL by using the first read voltage VRD1 to determine whether a memory cell has an erase state E. The memory cells MC11, MC14, and MC16 are first memory cells in the first word line WL1, and thus, the non-volatile memory device 100 may store the first bitmap BM1 (for example, [1, 0, 0, 1, 0, 1]) in the first data latch DL1.

In operation S320, the non-volatile memory device 100 may perform a second sensing operation on the second word line WL2 by using the sixth read voltage VRD6. The non-volatile memory device 100 may sense the second word line WL2 to detect second memory cells having the sixth program state P6 or the seventh program state P7 in the second word line WL2. The non-volatile memory device 100 may perform the second sensing operation on the second word line WL2 by using only the sixth read voltage VRD6. The non-volatile memory device 100 may generate a second bitmap BM2 through the second sensing operation. The non-volatile memory device 100 may perform the second sensing operation to store the second bitmap BM2, indicating the second memory cells, in the second data latch DL2. The non-volatile memory device 100 may sense a voltage variation of the bit line BL by using the sixth read voltage VRD6 to determine whether a memory cell has the sixth or seventh program states P6 or P7. The memory cells MC21, MC23, MC24, and MC26 are second memory cells in the second word line WL2, and thus, the non-volatile memory device 100 may store the first bitmap BM1 (for example, [1, 0, 1, 1, 0, 1]) in the second data latch DL2.

In operation S330, the non-volatile memory device 100 may perform an AND operation on the first data latch DL1 and the second data latch DL2 and may store a result of the AND operation in the first data latch DL1. The non-volatile memory device 100 may perform an AND operation on the first bitmap BM1 and the second bitmap BM2 to detect target bit lines. That is, the non-volatile memory device 100 may perform a logic operation on data stored in the first data latch DL1 and data stored in the second data latch DL2 to detect target bit lines including all of the first memory cell and the second memory cell.

For example, the non-volatile memory device 100 may perform an AND operation on the first bitmap BM1 (for example, [1, 0, 0, 1, 0, 1]) stored in the first data latch DL1 and the second bitmap BM2 (for example, [1, 0, 1, 1, 0, 1]) stored in the second data latch DL2 to generate a third bitmap BM3 (for example, [1, 0, 0, 1, 0, 1]). The non-volatile memory device 100 may store the third bitmap BM3 (for example, [1, 0, 0, 1, 0, 1]) in the first data latch DL1. The third bitmap BM3 may indicate target bit lines.

In operation S340, an I/O circuit 140 may output first write data WD1 to the page buffer circuit 130. The non-volatile memory device 100 may receive the first write data WD1 from the external storage controller. The non-volatile memory device 100 may transfer the received first write data WD1 to the page buffer circuit 130. The page buffer circuit 130 may store the first write data WD1 in the data latch 131. The first write data WD1 may include first to third page data PD1 to PD3. The page buffer circuit 130 may store the first page data PD1 (for example, [1,0,1,1,1,1,0,0,0]) in the second data latch DL2, store the second page data PD2 (for example, [1,1,0,1,1,1,0,0,0]) in the third data latch DL3, and store the third page data PD3 (for example, [1,1,0,1,1,1,0, 0,0]) in the fourth data latch DL4.

In operation S350, the non-volatile memory device 100 may perform an AND operation on the first to fourth data latches DL1 to DL4 and may store a result of the AND operation in the fifth data latch DL5. The non-volatile memory device 100 may perform an AND operation on the first bitmap BM1 and the first write data WD1 to detect target bits. The non-volatile memory device 100 may perform an AND operation on the first bitmap BM1, the first page data PD1, the second page data PD2, and the third page data PD3 to detect target bits. That is, the non-volatile memory device 100 may perform a logic operation on the data stored in the first data latch DL1, the data stored in the second data latch DL2, data stored in the third data latch DL3, and data which is to be stored in the fourth data latch DL4, and thus, may detect target bits corresponding to a weak pattern.

For example, the non-volatile memory device 100 may perform an AND operation on the third bitmap BM3 (for example, [1,0,0,1,0,1]) stored in the first data latch DL1, the first page data PD1 (for example, [1,0,1,1,1,1,0,0,0]) stored in the second data latch DL2, the second page data PD2 (for example, [1,1,0,1,1,1,0,0,0]) stored in the third data latch DL3, and the third page data PD3 (for example, [1,1,0,1,1, 1,0,0,0]) stored in the fourth data latch DL4 to generate a fourth bitmap BM4 (for example, [1,0,0,1,0,1,0,0,0]). The non-volatile memory device 100 may store the fourth bitmap BM4 (for example, [1,0,0,1,0,1,0,0,0]) in the fifth data latch DL5. The fourth bitmap BM4 may indicate target bits (or information about positions of target bits). That is, the fourth bitmap BM4 may include information about a position of a weak pattern. As described above, the non-volatile memory device 100 may perform operations S310 to S350 to perform a weak pattern detection operation.

The non-volatile memory device 100 may perform operations S360 to S389 to perform an encoding operation. The non-volatile memory device 100 may perform operations S360 to S389 to perform an FBP data generating operation and a flip operation, and thus, may convert the first write data WD1 into the second write data WD2. The non-volatile memory device 100 may perform an encoding operation to generate encoded data, based on the first write data WD1 and the FBP data.

In operation S360, the page buffer circuit 130 may output the fourth bitmap BM4 to the control logic circuit 160. An FBP engine 161 may receive the fourth bitmap BM4. The FBP engine 161 may generate the FBP data, based on the fourth bitmap BM4. In operation S370_1, the FBP engine 161 may output the generated FBP data to an FBP buffer 163. The FBP engine 161 may store the FBP data in the FBP buffer 163. In operation S370_2, the FBP buffer 163 may output the FBP data to the FBP engine 161 and an ECC engine 162.

The non-volatile memory device 100 may perform operations S381 to S389 to perform a flip operation. The non-volatile memory device 100 may perform the flip operation to generate the second write data WD2. The non-volatile memory device 100 may perform operations S381 to S383 to convert the first page data PD1 into first encoded page data EPD1.

In operation S381, the non-volatile memory device 100 may generate a first bit flip flag and may store the first bit flip flag in the fifth data latch DL5. The FBP engine 161 may generate the first bit flip flag, based on the FBP data (or first sub FBP data FBP_SUB1). The first bit flip flag may indicate a bit which is to be flipped on the first page data PD1. That is, the first bit flip flag may indicate information about positions of bits which are to be flipped on the first page data PD1. For example, a first bit B1 may be a target bit and may correspond to a first portion S1, and thus, the non-volatile memory device 100 may flip data corresponding to the first page data PD1 in the first bit data BD1. Therefore, the non-volatile memory device 100 may generate the first bit flip flag (for example, [1,0,0,0,0,0]) so as to indicate the first bit B1 of the first page data PD1 is flipped.

In operation S382, the non-volatile memory device 100 may generate first encoded sub FBP data E_FBP_SUB1 and may store the first encoded sub FBP data E_FBP_SUB1 in the fifth data latch DL5. The ECC engine 162 may perform encoding for error correction on the first sub FBP data FBP_SUB1. In an example embodiment, the ECC engine 162 may generate parity bits corresponding to the first sub FBP data FBP_SUB1. The ECC engine 162 may add the parity bits to the first sub FBP data FBP_SUB1 to generate the first encoded sub FBP data E_FBP_SUB1. The ECC engine 162 may output the first encoded sub FBP data E_FBP_SUB1 to the page buffer circuit 130. The page buffer circuit 130 may store the first sub FBP data FBP_SUB1 (for example, [A1,A2,A3]) in the fifth data latch DL5.

The non-volatile memory device 100 may store the first bit flip flag in bits corresponding to a first area AREA1 and may store the first encoded sub FBP data E_FBP_SUB1 in bits corresponding to a second area AREA2. The non-volatile memory device 100 may add the first encoded sub FBP data E_FBP_SUB1 to the first bit flip flag to generate a fifth bitmap BM5 (for example, [1,0,0,0,0,0,A1,A2,A3]) and may store the fifth bitmap BM5 in the fifth data latch DL5.

In operation S383, the non-volatile memory device 100 may perform an XOR operation on the second data latch DL2 and the fifth data latch DL5 and may store a result of the performance in the second data latch DL2. The non-volatile memory device 100 may perform an XOR operation on the first page data PD1 (for example, [1,0,1,1,1,0,0,0]) and the fifth bitmap BM5 (for example, [1,0,0,0,0,0,A1,A2, A3]) to generate first encoded page data EPD1 (for example, [0,0,1,1,1,1,A1,A2,A3]). That is, the non-volatile memory device 100 may perform a logic operation on data stored in the second data latch DL2 and data stored in the fifth data latch DL5 to store the first encoded page data EPD1, including the first encoded sub FBP data E_FBP_SUB1 and flipped first page data, in the second data latch DL2. That is, the non-volatile memory device 100 may flip the first bit B1 of the first page data PD1 and may add flip bit position information (for example, the first encoded sub FBP data E_FBP_SUB1) about the first page data PD1 to generate the first encoded page data EPD1.

The non-volatile memory device 100 may perform operations S384 to S386 to generate second encoded page data EPD2. In operation S384, the non-volatile memory device 100 may generate a second bit flip flag and may store the second bit flip flag in the fifth data latch DL5. The FBP engine 161 may generate the second bit flip flag, based on the FBP data (or second sub FBP data FBP_SUB2). The second bit flip flag may indicate a bit which is to be flipped on the second page data PD2. For example, a fourth bit B4 may be a target bit and may correspond to a second portion S2, and thus, the non-volatile memory device 100 may flip data corresponding to the second page data PD2 in the fourth bit data BD4. Therefore, the non-volatile memory device 100 may generate the second bit flip flag (for example, [0,0,0,1,0,0]) so as to indicate the fourth bit B4 of the second page data PD2 is flipped.

In operation S385, the non-volatile memory device 100 may generate second encoded sub FBP data E_FBP_SUB2 and may store the second encoded sub FBP data E_FBP_SUB2 in the fifth data latch DL5. The ECC engine 162 may perform encoding on the second sub FBP data FBP_SUB2. In an example embodiment, the ECC engine 162 may generate parity bits corresponding to the second sub FBP data FBP_SUB2. The ECC engine 162 may add the parity bits to the second sub FBP data FBP_SUB2 to generate the second encoded sub FBP data E_FBP_SUB2. The ECC engine 162 may output the second encoded sub FBP data E_FBP_SUB2 to the page buffer circuit 130. The page buffer circuit 130 may store the second sub FBP data FBP_SUB2 (for example, [B1,B2,B3]) in the fifth data latch DL5.

The non-volatile memory device 100 may store the second bit flip flag in bits corresponding to the first area AREA1 and may store the second encoded sub FBP data E_FBP_SUB2 in bits corresponding to the second area AREA2. The non-volatile memory device 100 may add the second encoded sub FBP data E_FBP_SUB2 to the second bit flip flag to generate a sixth bitmap BM6 (for example, [0,0,0,1, 0,0,B1,B2,B3]) and may store the sixth bitmap BM6 in the fifth data latch DL5.

In operation S386, the non-volatile memory device 100 may perform an XOR operation on the third data latch DL3 and the fifth data latch DL5 and may store a result of the performance in the third data latch DL3. The non-volatile memory device 100 may perform an XOR operation on the second page data PD2 (for example, [1,1,0,1,1,1,0,0,0]) and the sixth bitmap BM6 (for example, [0,0,0,1,0,0,B1,B2,B3]) to generate second encoded page data EPD2 (for example, [1,1,0,0,1,1,B1,B2,B3]). That is, the non-volatile memory device 100 may perform a logic operation on data stored in the third data latch DL3 and the data stored in the fifth data latch DL5 to store the second encoded page data EPD2, including the second encoded sub FBP data E_FBP_SUB2 and flipped second page data, in the third data latch DL3. That is, the non-volatile memory device 100 may flip the fourth bit B4 of the second page data PD2 and may add flip bit position information (for example, the second encoded sub FBP data E_FBP_SUB2) about the second page data PD2 to convert the second page data PD2 into the second encoded page data EPD2.

The non-volatile memory device 100 may perform operations S387 to S389 to generate third encoded page data EPD3. In operation S384, the non-volatile memory device 100 may generate a third bit flip flag and may store the third bit flip flag in the fifth data latch DL5. The FBP engine 161 may generate the third bit flip flag, based on the FBP data (or third sub FBP data FBP_SUB3). The third bit flip flag may indicate a bit which is to be flipped on the third page data PD3. For example, a sixth bit B6 may be a target bit and may correspond to a third portion S3, and thus, the non-volatile memory device 100 may flip data corresponding to the third page data PD3 in the sixth bit data BD4. Therefore, the non-volatile memory device 100 may generate the third bit flip flag (for example, [0,0,0,0,0,1]) so as to indicate the sixth bit B6 of the third page data PD3 is flipped.

In operation S388, the non-volatile memory device 100 may generate third encoded sub FBP data E_FBP_SUB3 and may store the third encoded sub FBP data E_FBP_SUB3 in the fifth data latch DL5. The ECC engine 162 may perform encoding on the third sub FBP data FBP_SUB3. In an example embodiment, the ECC engine 162 may generate parity bits corresponding to the third sub FBP data FBP_SUB3. The ECC engine 162 may add the parity bits to the third sub FBP data FBP_SUB3 to generate the third encoded sub FBP data E_FBP_SUB3. The ECC engine 162 may output the third encoded sub FBP data E_FBP_SUB3 to the page buffer circuit 130. The page buffer circuit 130 may store the third sub FBP data FBP_SUB3 (for example, [C1,C2,C3]) in the fifth data latch DL5.

The non-volatile memory device 100 may store the third bit flip flag in bits corresponding to the first area AREA1 and may store the third encoded sub FBP data E_FBP_SUB3 in bits corresponding to the second area AREA2. The non-volatile memory device 100 may add the third encoded sub FBP data E_FBP_SUB3 to the third bit flip flag to generate a seventh bitmap BM7 (for example, [0,0,0,0,0,1,C1,C2,C3]) and may store the seventh bitmap BM7 in the fifth data latch DL5.

In operation S389, the non-volatile memory device 100 may perform an XOR operation on the fourth data latch DL4 and the fifth data latch DL5 and may store a result of the performance in the fourth data latch DL4. The non-volatile memory device 100 may perform an XOR operation on the third page data PD3 (for example, [1,1,0,1,1,1,0,0,0]) and the seventh bitmap BM7 (for example, [0,0,0,0,0,1,C1,C2,C3]) to generate third encoded page data EPD3 (for example, [1,1,0,1,1,0,C1,C2,C3]). That is, the non-volatile memory device 100 may perform a logic operation on data stored in the fourth data latch DL4 and the data stored in the fifth data latch DL5 to store the third encoded page data EPD3, including the third encoded sub FBP data E_FBP_SUB3 and flipped third page data, in the fourth data latch DL4. That is, the non-volatile memory device 100 may flip the sixth bit B6 of the third page data PD3 and may add flip bit position information (for example, the third encoded sub FBP data E_FBP_SUB3) about the third page data PD3 to convert the third page data PD3 into the third encoded page data EPD3.

In operation S390, the non-volatile memory device 100 may perform a program operation. The non-volatile memory device 100 may program the encoded data in the third word line WL3. The page buffer circuit 130 may output the second write data WD2 to the memory cell array 110. The second write data WD2 may include first to third encoded page data EPD1 to EPD3. The second write data WD2 may be programmed in the third word line WL3, the memory cell MC31 may have the first program state P1, the memory cell MC32 may have the first program state P1, the memory cell MC33 may have the sixth program state P6, the memory cell MC34 may have the seventh program state P7, the memory cell MC35 may have the erase state, and the memory cell MC36 may have the fifth program state P5. The non-volatile memory device 100 may store encoded FBP data, including the first to third encoded sub FBP data E_FBP_SUB1 to E_FBP_SUB3, in the memory cells MC27, MC28, and MC29.

As described above with reference to FIGS. 11A to 11D, target bits may include a plurality of sub target bits. The target bits may be first, fourth, and sixth bits B1, B4, and B6, first sub target bits STB1 may be the first bit B1, second sub target bits STB2 may be the fourth bit B4, and third sub target bits STB3 may be the sixth bit B6.

The non-volatile memory device 100 may program the encoded data and the FBP data in the third word line WL3. The non-volatile memory device 100 may program a memory cell corresponding to the first sub target bits STB1 so that the memory cell has the first program state P1. The non-volatile memory device 100 may program a memory cell corresponding to the second sub target bits STB2 so that the memory cell has the seventh program state P7. The non-volatile memory device 100 may program a memory cell corresponding to the third sub target bits STB3 so that the memory cell has the fifth program state P5.

That is, because the first sub target bits STB1 are the first bit B1, the non-volatile memory device 100 may program the memory cell MC31 corresponding to the first bit B1 so that the memory cell MC31 has the first program state P1 instead of the erase state E. Because the second sub target bits STB2 are the fourth bit B4, the non-volatile memory device 100 may program the memory cell MC34 corresponding to the fourth bit B4 so that the memory cell MC34 has the seventh program state P7 instead of the erase state E. Because the third sub target bits STB3 are the sixth bit B6, the non-volatile memory device 100 may program the memory cell MC36 corresponding to the sixth bit B6 so that the memory cell MC36 has the fifth program state P5 instead of the erase state E.

In an example embodiment, the first page data PD1 of the second write data WD2 may include first encoded sub FBP data E_FBP_SUB1, the second page data PD2 of the second write data WD2 may include second encoded sub FBP data E_FBP_SUB2, and the third page data PD3 of the second write data WD2 may include third encoded sub FBP data E_FBP_SUB3. That is, encoded FBP data may be stored in the second area AREA2 of the third word line WL3.

In an example embodiment, as described above with reference to FIG. 11C, the non-volatile memory device 100 may not perform encoding on the FBP data and may store the FBP data in the memory cell array 110. The first page data PD1 of the second write data WD2 which is to be stored in the memory cell array 110 may include first sub FBP data FBP_SUB1 instead of the first encoded sub FBP data E_FBP_SUB1. The second page data PD2 of the second write data WD2 may include second sub FBP data FBP_SUB2, and the third page data PD3 of the second write data WD2 may include third sub FBP data FBP_SUB3. That is, the FBP data may be stored in the second area AREA2 of the third word line WL3.

Referring to FIGS. 13A to 13G, it is illustrated that operations S310 to S330 are performed prior to operation S340, but example embodiments are not limited thereto and the operations may be simultaneously performed or may be performed in reverse order.

Figure 14:
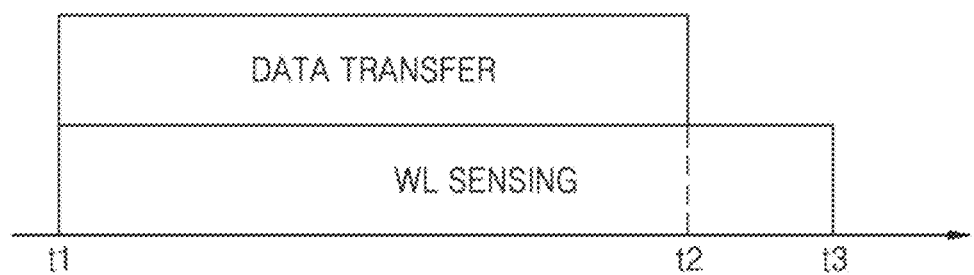
FIG. 14 is a diagram for describing a write operation of a non-volatile memory device according to an example embodiment.

FIG. 14 is a diagram for describing a write operation of a non-volatile memory device according to an example embodiment.

Referring to FIG. 14, the non-volatile memory device 100 may perform operations S310 to S320 up to a third time t3 from a first time t1. The non-volatile memory device 100 may perform operations S340 up to a second time t2 from the first time t1. That is, the non-volatile memory device 100 may receive first write data WD1 from the storage controller while sensing first and second word lines WL1 and WL2.

The non-volatile memory device 100 may simultaneously perform a data transfer operation, and thus, the latency of a weak pattern detection operation may be reduced.

Figure 15A:
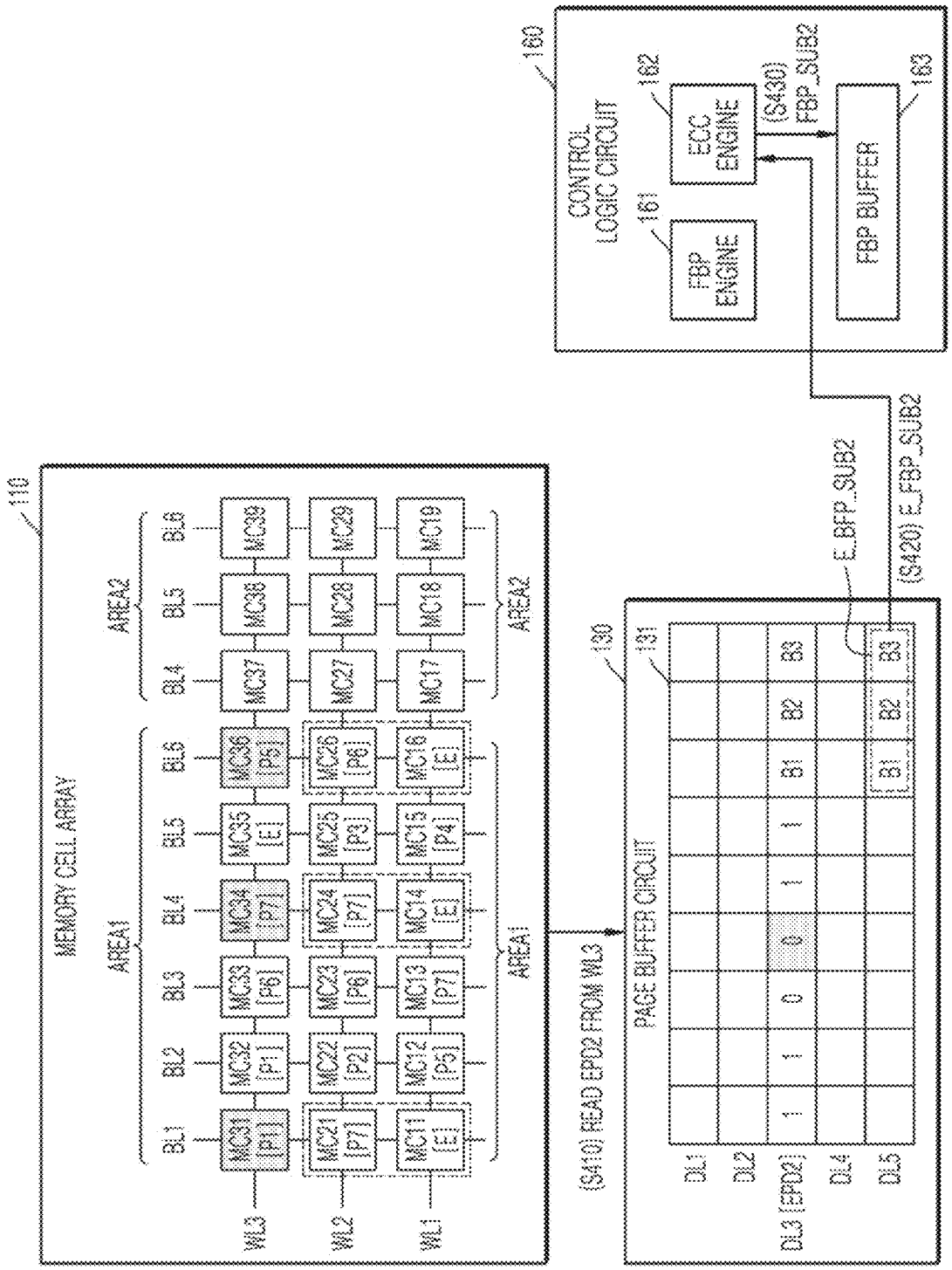
FIGS. 15A, 15B and 15C are diagrams for describing a read operation of a non-volatile memory device according to an example embodiment.
Figure 15B:
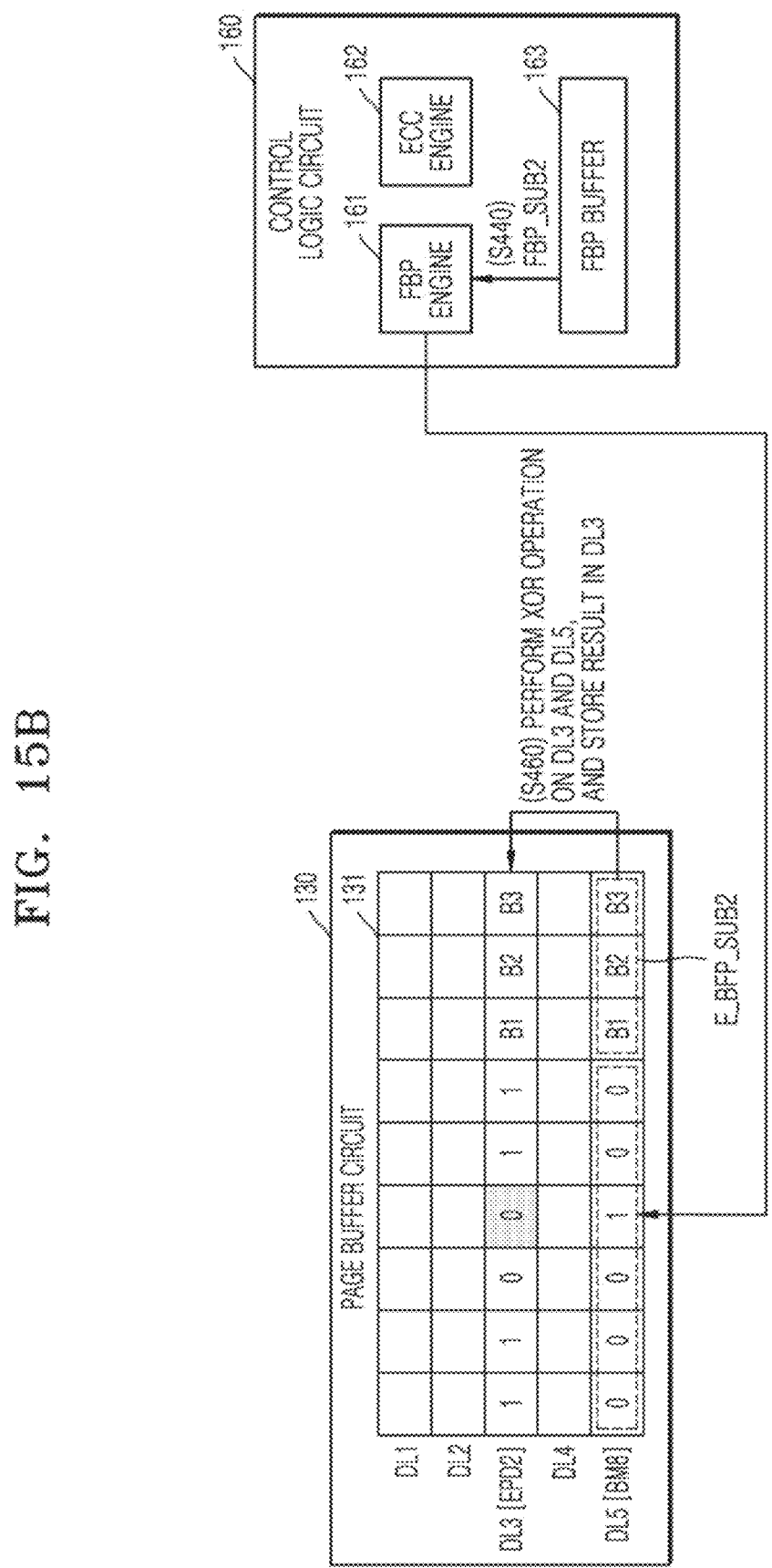
Figure 15C:
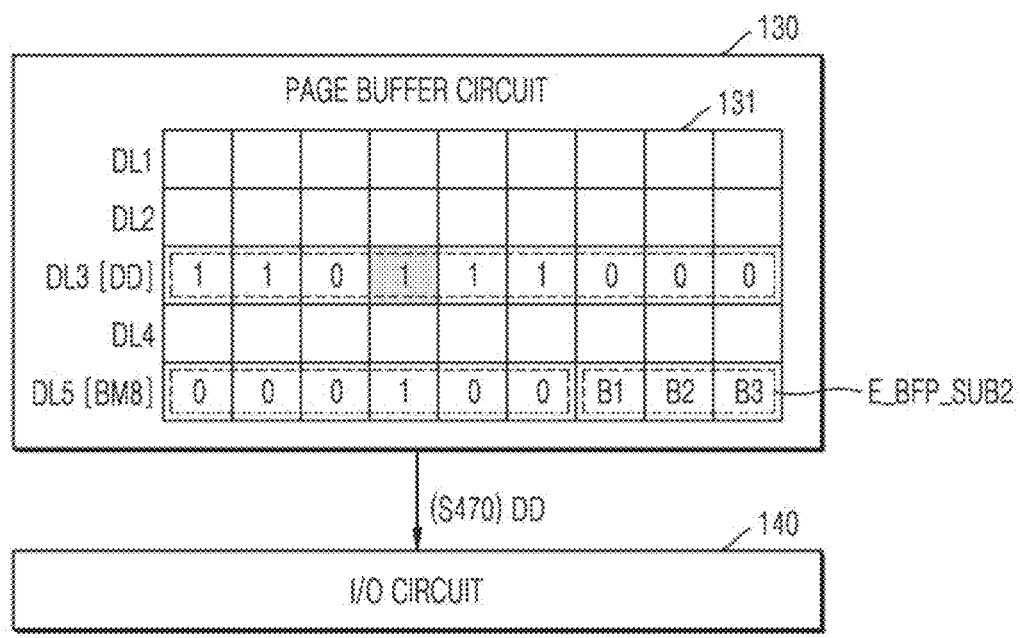

FIGS. 15A to 15C are diagrams for describing a read operation of a non-volatile memory device according to an example embodiment.

For conciseness of the drawings and convenience of description, a memory cell array 110 may be assumed as including a plurality of memory cells MC11 to MC39 connected with first to third word lines WL1 to WL3 and first to ninth bit lines BL1 to BL9. However, example embodiments are not limited thereto. Reference numerals or detailed descriptions of elements which are the same as or similar to the elements described above are omitted. Hereinafter, omitted elements may be implemented based on each or a combination of example embodiments described herein. A page buffer circuit 130 may include a data latch 131, and the data latch 131 may include first to fifth data latches DL1 to DL5.

In operation S410, in response to a read command, the non-volatile memory device 100 may read second encoded page data EPD2 in the third word line WL3. The non-volatile memory device 100 may sense a voltage variation of each of the bit lines BL, and thus, may read the second encoded page data EPD2 stored in the third word line WL3. The non-volatile memory device 100 may store the second encoded page data EPD2 (for example, [1,1,0,0,1,1,B1,B2,B3]) in the third data latch DL3.

In an example embodiment, the non-volatile memory device 100 may copy second encoded sub FBP data E_FBP_SUB2, stored in bits corresponding to a stored second area AREA2, from the third data latch DL3 to the fifth data latch DL5. That is, the non-volatile memory device 100 may store the second encoded sub FBP data E_FBP_SUB2 in the fifth data latch DL5.

The non-volatile memory device 100 may perform operations S420 to S460 to perform a decoding operation. The non-volatile memory device 100 may perform the decoding operation to convert encoded page data into page data (or decoded data). In operation S420, the non-volatile memory device 100 may transfer the second encoded sub FBP data E_FBP_SUB2 to the control logic circuit 160. The page buffer circuit 130 may output the second encoded sub FBP data E_FBP_SUB2 to the ECC engine 162.

In operation S430, the non-volatile memory device 100 may generate second sub FBP data FBP_SUB2 and may output the second sub FBP data FBP_SUB2 to the FBP buffer 163. The non-volatile memory device 100 may perform a decoding operation on the second encoded sub FBP data E_FBP_SUB2 to generate second sub FBP data FBP_SUB2. The ECC engine 162 may generate the second sub FBP data FBP_SUB2, based on the second encoded sub FBP data E_FBP_SUB2. The ECC engine 162 may correct an error of the second sub FBP data FBP_SUB2 by using the second encoded sub FBP data E_FBP_SUB2 and may output error-corrected second sub FBP data FBP_SUB2. The second sub FBP data FBP_SUB2 may be stored in the FBP buffer 163.

In operation S440, the FBP buffer 163 may output the second sub FBP data FBP_SUB2 to the FBP engine 161. In operation S450, the FBP engine 161 may generate a second flip bit flag and may output the second flip bit flag to the page buffer circuit 130. The FBP engine 161 may generate the second bit flip flag, based on the second sub FBP data FBP_SUB2. The second bit flip flag may indicate a bit which is to be flipped on the second page data PD2. For example, in the second encoded sub FBP data E_FBP_SUB2, a fourth bit B4 may be a flipped bit. Therefore, the non-volatile memory device 100 may generate the second bit flip flag (for example, [0,0,0,1,0,0]) so as to indicate the fourth bit B4 of the second page data PD2 is to be flipped. The page buffer circuit 130 may store the second bit flip flag in the fifth data latch DL5.

The non-volatile memory device 100 may store the second bit flip flag in bits corresponding to the first area AREA1 and may store the second encoded sub FBP data E_FBP_SUB2 in bits corresponding to the second area AREA2. The non-volatile memory device 100 may add the second encoded sub FBP data E_FBP_SUB2 to the second bit flip flag to generate an eighth bitmap BM8 (for example, [0,0,0,1,0,0,B1,B2,B3]) and may store the eighth bitmap BM8 in the fifth data latch DL5.

In operation S460, the non-volatile memory device 100 may perform an XOR operation on the third data latch DL3 and the fifth data latch DL5 and may store a result of the performance in the third data latch DL3. The non-volatile memory device 100 may perform an XOR operation on the second encoded page data EPD2 (for example, [1,1,0,0,1,1, B1,B2,B3]) and the sixth bitmap BM6 (for example, [0,0, 0,1,0,0,B1,B2,B3]) to generate decoded data DD (for example, [1,1,0,1,1,1,0,0,0]). That is, the non-volatile memory device 100 may perform a logic operation on data stored in the third data latch DL3 and data stored in the fifth data latch DL5 to store the decoded data DD in the third data latch DL3. That is, the non-volatile memory device 100 may flip the fourth bit B4 of the second encoded page data EPD2, remove the second encoded sub FBP data E_FBP_SUB2, and convert the second encoded page data EPD2 into the decoded data DD. In operation S470, the non-volatile memory device 100 may output the decoded data DD to the I/O circuit 140.

Figure 16:
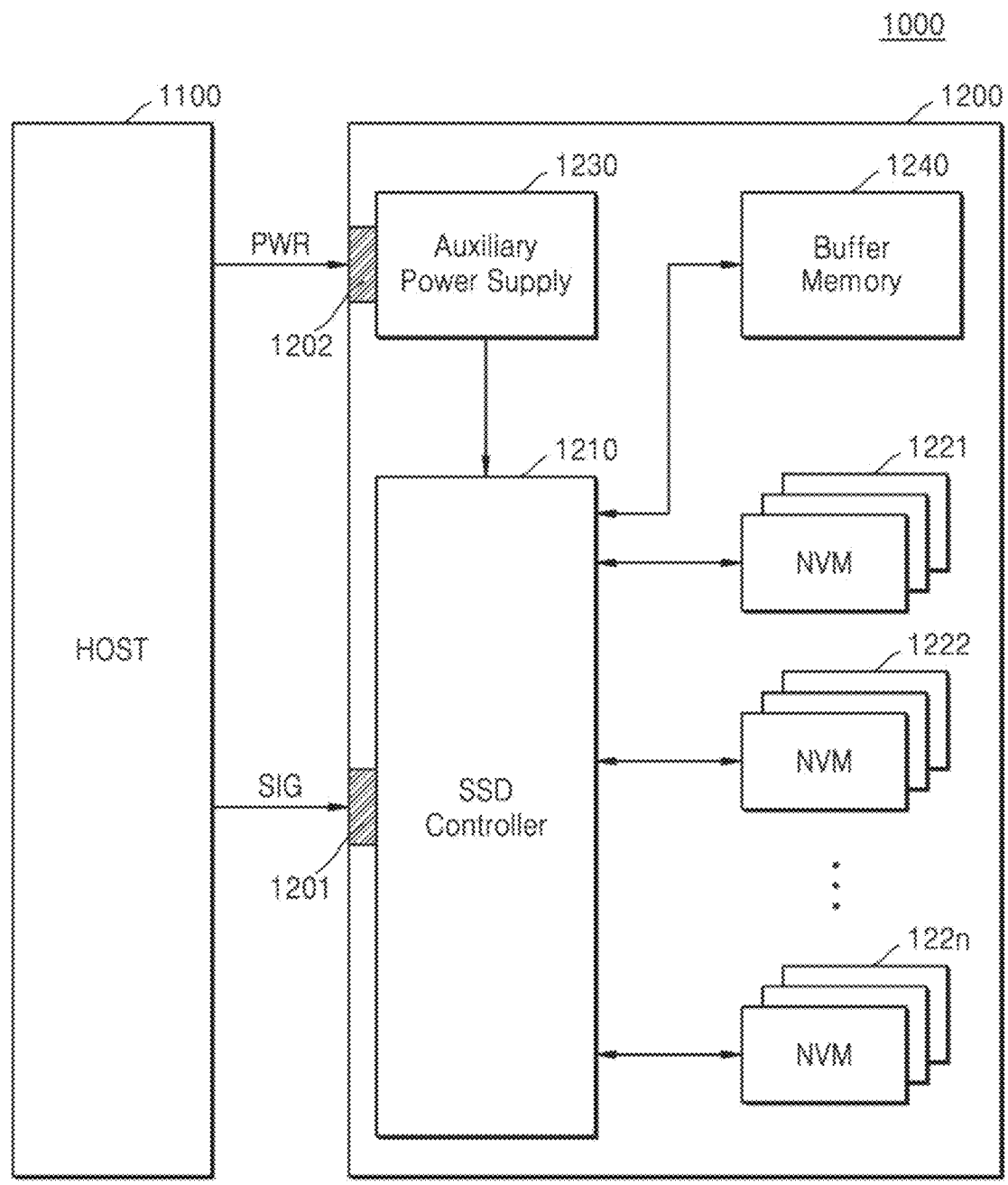
FIG. 16 is a block diagram illustrating a solid state drive (SSD) system to which a storage device according to an example embodiment is applied.

FIG. 16 is a block diagram illustrating a solid state drive (SSD) system 1000 to which a storage device according to an example embodiment is applied.

Referring to FIG. 16, the SSD system 1000 may include a host 1100 and an SSD 1200. The SSD 1200 may transmit and receive a signal SIG to and from the host 1100 through a signal connector 1201 and may be supplied with power PWR through a power connector 1202. The SSD 1200 may include an SSD controller 1210, a plurality of flash memories 1221 to 122n, an auxiliary power supply 1230, and a buffer memory 1240.

The SSD controller 1210 may control the plurality of flash memories 1221 to 122n in response to the signal SIG received from the host 1100. The plurality of flash memories 1221 to 122n may operate based on control by the SSD controller 1210. The auxiliary power supply 1230 may be connected with the host 1100 through a power connector 1002. The auxiliary power supply 1230 may be supplied and charged with the power PWR from the host 1100. When the supply of power from the host 1100 is not smooth, the auxiliary power supply 1230 may supply power of the SSD 1200. The buffer memory 1240 may operate as a buffer memory of the SSD 1200.

The SSD controller 1210 may receive a debugging data request from the host 1100 and may transfer the debugging data request to the plurality of flash memories 1221 to 122*n*. A debugging circuit may generate debugging data of a non-volatile memory and may output the generated debugging data to the SSD controller 1210. The host 1100 may receive the debugging data from the SSD controller 1210 to determine whether a problem between the SSD controller 1210 and the plurality of flash memories 1221 to 122*n* occurs or not.

Each of the plurality of flash memories 1221 to 122*n* according to an example embodiment may perform a weak pattern detection operation and an encoding operation to remove (or avoid) a weak pattern. Accordingly, a non-volatile memory and a storage device may be enhanced in reliability and lifetime.

Figure 17:
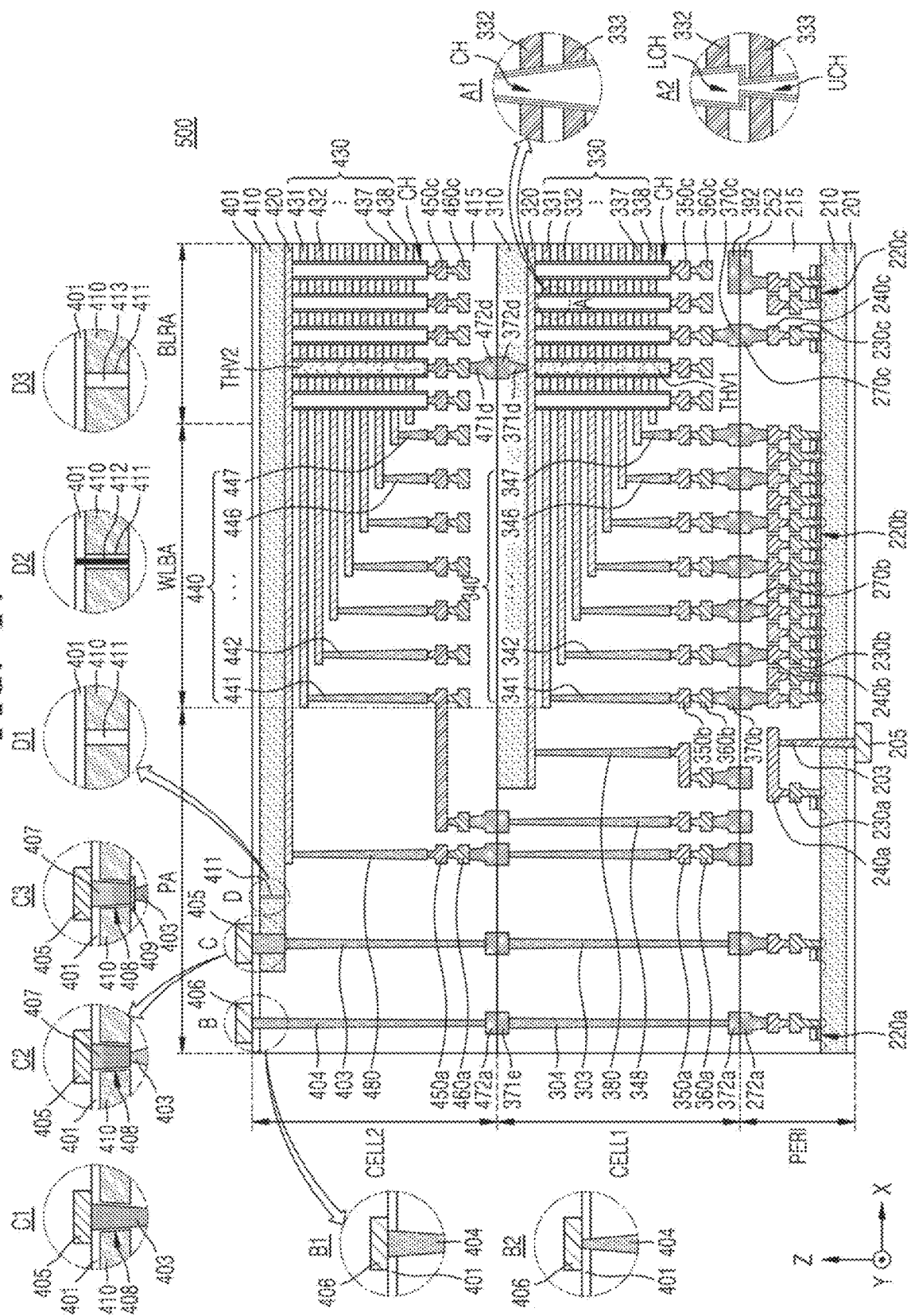
FIG. 17 is a diagram for describing a memory device according to an example embodiment.

FIG. 17 is a diagram for describing a memory device 500 according to an example embodiment.

Referring to FIG. 17, the memory device 500 may have a chip to chip (C2C) structure. Here, the C2C structure may denote that each of at least one upper chip including a cell area CELL and a lower chip including a peripheral circuit area PERI is manufactured, and then, the at least one chip and the lower chip are connected with each other through bonding. For example, the bonding may denote a process which electrically or physically connects a bonding metal pattern, formed in an uppermost metal layer of the upper chip, with a bonding metal pattern formed in an uppermost metal layer of the lower chip. For example, when the bonding metal patterns include copper (Cu), the bonding process may be a Cu—Cu bonding process. As another example, the bonding metal patterns may include aluminum (A1) or tungsten (W).

The memory device 500 may include one or more upper chips including a cell area. For example, as illustrated in FIG. 17, the memory device 500 may be implemented to include two upper chips. However, example embodiments are not limited thereto, and the number of upper chips is not limited thereto. When the memory device 500 is implemented to include two upper chips, each of a first upper chip including a first cell area CELL1, a second upper chip including a second cell area CELL2, and a lower chip including a peripheral circuit area PERI may be manufactured, and then, the memory device 500 may be manufactured by connecting the first upper chip, the second upper chip, and the lower chip with one another through a bonding process. The first upper chip may be inverted and connected with the lower chip by a bonding process, and the second upper chip may be inverted and connected with the first upper chip by a bonding process. In the following description, upper portions and lower portions of the first and second upper chips may be defined based on a criterion before the first upper chip and the second upper chip are inverted. That is, in FIG. 17, an upper portion of the lower chip may denote an upper portion defined with respect to a +Z-axis direction, and an upper portion of each of the first and second upper chips may denote an upper portion defined with respect to a -Z-axis direction. However, this may be an example embodiment, and the first upper chip and the second upper chip may be connected with each other by a bonding process in a state where only one of the first upper chip and the second upper chip is inverted.

Each of the peripheral circuit area PERI and the first and second cell areas CELL1 and CELL2 of the memory device 500 may include an external pad bonding area PA, a word line bonding area WLBA, and a bit line bonding area BLBA.

The peripheral circuit area PERI may include a first substrate 210 and a plurality of circuit devices 220*a* to 220*c* formed in the first substrate 210. An interlayer insulation layer 215 including one or more insulation layers may be provided on the plurality of circuit devices 220*a* to 220*c*, and a plurality of metal wirings connecting the plurality of circuit devices 220*a* to 220*c* with one another may be provided in the interlayer insulation layer 215. For example, the plurality of metal wirings may include first metal wirings 230*a* to 230*c* respectively connected with the plurality of circuit devices 220*a* to 220*c* and second metal wirings 240*a* to 240*c* formed on the first metal wirings 230*a* to 230*c*. The plurality of metal wirings may include at least one of various conductive materials. For example, the first metal wirings 230*a* to 230*c* may include tungsten which is relatively high in electrical resistivity, and the second metal wirings 240*a* to 240*c* may include copper which is relatively low in electrical resistivity.

Herein, only the first metal wirings 230*a* to 230*c* and the second metal wirings 240*a* to 240*c* are illustrated and described, but are not limited thereto and one or more additional metal wirings may be further formed on the second metal wirings 240*a* to 240*c*. In this case, the second metal wirings 240*a* to 240*c* may include aluminum. Also, at least a portion of the additional metal wiring formed on the second metal wirings 240*a* to 240*c* may include copper which is lower in electrical resistivity than aluminum of the second metal wirings 240*a* to 240*c*.

The interlayer insulation layer 215 may be disposed on the first substrate 210 and may include an insulating material such as silicon oxide or silicon nitride.

Each of the first and second cell areas CELL1 and CELL2 may include at least one memory block. The first cell area CELL1 may include a second substrate 310 and a common source line 320. A plurality of word lines 331 to 338 (330) may be stacked on the second substrate 310 in a direction (a Z-axis direction) perpendicular to an upper surface of the second substrate 310. String selection lines and a ground selection line may be disposed on and under the word lines 330, and the plurality of word lines 330 may be disposed between the string selection lines and the ground selection line. Likewise, the second cell area CELL2 may include a third substrate 410 and a common source line 420, and a plurality of word lines 431 to 438 (430) may be stacked in a direction (a Z-axis direction) perpendicular to an upper surface of the third substrate 410. The second substrate 310 and the third substrate 410 may include various materials, and for example, may be a substrate including a crystalline epitaxial layer which is grown on a silicon substrate, a silicon-germanium substrate, a germanium substrate, or a monocrystalline silicon substrate. A plurality of channel structures CH may be formed in each of the first and second cell areas CELL1 and CELL2.

In an example embodiment, as illustrated in A1, the channel structure CH may be provided in the bit line bonding area BLBA, and moreover, may extend in a direction perpendicular to an upper surface of the second substrate 310 and may pass through the word lines 330, the string selection lines, and the ground selection line. The channel structure CH may include a data storage layer, a channel layer, and a buried insulation layer. The channel layer may be electrically connected with a first metal wiring 350*c* and a second metal wiring 360*c* in the bit line bonding area BLBA. For example, the second metal wiring 360*c* may be a bit line and may be connected with the channel structure CH through the first metal wiring 350c. The bit line 360c may extend in a first direction (a Y-axis direction) parallel to the upper surface of the second substrate 310.

In an example embodiment, as illustrated in A2, the channel structure CH may include a lower channel LCH and an upper channel UCH, which are connected with each other. For example, the channel structure CH may be formed through a process on the lower channel LCH and a process on the upper channel UCH. The lower channel LCH may extend in a direction perpendicular to the upper surface of the second substrate 310 and may pass through the common source line 320 and the lower word lines 331 and 332. The lower channel LCH may include a data storage layer, a channel layer, and a buried insulation layer and may be connected with the upper channel UCH. The upper channel UCH may pass through upper word lines 333 to 338. The upper channel UCH may include a data storage layer, a channel layer, and a buried insulation layer, and the channel layer of the upper channel UCH may be electrically connected with the first metal wiring 350c and the second metal wiring 360c. As a length of a channel increases, it may be difficult to form a channel having a certain width for process reasons. The memory device 500 according to an example embodiment may include a channel having width uniformity which is improved through the lower channel LCH and the upper channel UCH each formed through a sequential process.

When the channel structure CH is formed to include the lower channel LCH and the upper channel UCH as illustrated in A2, a word line disposed at a periphery of a boundary between the lower channel LCH and the upper channel UCH may be a dummy word line. For example, the word line 332 and the word line 333 each configuring the boundary between the lower channel LCH and the upper channel UCH may each be a dummy word line. In this case, data may not be stored in memory cells connected with the dummy word line. Alternatively, the number of pages corresponding to memory cells connected with the dummy word line may be less than the number of pages corresponding to memory cells connected with a general word line. A voltage level applied to the dummy word line may differ from a voltage level applied to the general word line, and thus, an adverse effect of a non-uniform channel width between the lower channel LCH and the upper channel UCH may decrease on an operation of the memory device 500.

Furthermore, in A2, it is illustrated that the number of lower word lines 331 and 332 through which the lower channel LCH passes is less than the number of upper word lines 333 to 338 through which the upper channel UCH passes. However, this may be an example embodiment, and example embodiments are not limited thereto. As another example, the number of lower word lines passing through the lower channel LCH may be formed to be more than or equal to the number of upper word lines through which the upper channel UCH passes. Also, a connection relationship and a structure of the channel structure CH disposed in the first cell area CELL1 described above may be identically applied to the channel structure CH disposed in the second cell area CELL2.

In the bit line bonding area BLBA, a first through via THV1 may be provided in the first cell area CELL1, and a second through via THV2 may be provided in the second cell area CELL2. As illustrated in FIG. 17, the first through via THV1 may pass through the common source line 320 and the plurality of word lines 330. However, this may be an example embodiment, and the first through via THV1 may further pass through the second substrate 310. The first through via THV1 may include a conductive material. Alternatively, the first through via THV1 may include a conductive material which is surrounded by an insulating material. The second through via THV2 may be provided in the same shape and structure as those of the first through via THV1.

In an example embodiment, the first through via THV1 and the second through via THV2 may be electrically connected with a first through metal pattern 372d and a second through metal pattern 472d. The first through metal pattern 372d may be formed at a lower end of the first upper chip including the first cell area CELL1, and the second through metal pattern 472d may be formed at an upper end of the second upper chip including the second cell area CELL2. The first through via THV1 may be electrically connected with the first metal wiring 350c and the second metal wiring 360c. A lower via 371d may be formed between the first through via THV1 and the first through metal pattern 372d, and an upper via 471d may be formed between the second through via THV2 and the second through metal pattern 472d. The first through metal pattern 372d may be connected with the second through metal pattern 472d by a bonding process.

Also, in the bit line bonding area BLBA, an upper metal pattern 252 may be formed in an uppermost metal layer of the peripheral circuit area PERI, and an upper metal pattern 392 having the same shape as that of the upper metal pattern 252 may be formed in an uppermost metal layer of the first cell area CELL1. The upper metal pattern 392 of the first cell area CELL1 may be electrically connected with the upper metal pattern 252 of the peripheral circuit area PERI by a bonding process. In the bit line bonding area BLBA, the bit line 360c may be electrically connected with a page buffer included in the peripheral circuit area PERI. For example, some of the circuit devices 220c of the peripheral circuit area PERI may provide a page buffer, and the bit line 360c may be electrically connected with the circuit devices 220c, providing the page buffer, through an upper bonding metal 370c of the first cell area CELL1 and an upper bonding metal 270c of the peripheral circuit area PERI.

Continuously, referring to FIG. 17, in the word line bonding area WLBA, the word lines 330 of the first cell area CELL1 may extend in a second direction (an X-axis direction) parallel to the upper surface of the second substrate 310 and may be connected with a plurality of cell contact plugs 341 to 347 (340). The first metal wiring 350b and the second metal wiring 360b may be sequentially connected with upper portions of the cell contact plugs 340 connected with the word lines 330. The cell contact plugs 340 may be connected with the peripheral circuit area PERI through an upper bonding metal 370b of the first cell area CELL1 and an upper bonding metal 270b of the peripheral circuit area PERI in the word line bonding area WLBA.

The cell contact plugs 340 may be electrically connected with a row decoder included in the peripheral circuit area PERI. For example, some of the circuit devices 220b of the peripheral circuit area PERI may provide a row decoder, and the cell contact plugs 340 may be electrically connected with the circuit devices 220b, providing the row decoder, through the upper bonding metal 370b of the first cell area CELL1 and the upper bonding metal 270b of the peripheral circuit area PERI. In an example embodiment, an operation voltage of each of the circuit devices 220b providing the row decoder may differ from an operation voltage of each of the circuit devices 220c providing the page buffer. For example, the operation voltage of each of the circuit devices 220c providing the page buffer may be greater than the operation voltage of each of the circuit devices 220b providing the row decoder.

Likewise, in the word line bonding area WLBA, the word lines 430 of the second cell area CELL2 may extend in a second direction (an X-axis direction) parallel to an upper surface of the third substrate 410 and may be connected with a plurality of cell contact plugs 441 to 447 (440). The cell contact plugs 440 may be connected with the peripheral circuit area PERI through an upper metal pattern of the second area CELL2, a lower metal pattern and an upper metal pattern of the first cell area CELL1, and the cell contact plug 348.

In the word line bonding area WLBA, an upper bonding metal 370b may be formed in the first cell area CELL1, and an upper bonding metal 270b may be formed in the peripheral circuit area PERI. The upper bonding metal 370b of the first cell area CELL1 may be electrically connected with the upper bonding metal 270b of the peripheral circuit area PERI by a bonding process. The upper bonding metal 370b and the upper bonding metal 270b may include aluminum, copper, or tungsten.

In the external pad bonding area PA, a lower metal pattern 371e may be formed in a lower portion of the first cell area CELL1, and an upper metal pattern 472a may be formed in an upper portion of the second cell area CELL2. The lower metal pattern 371e of the first cell area CELL1 and the upper metal pattern 472a of the second cell area CELL2 may be connected with each other by a bonding process in the external pad bonding area PA. Likewise, an upper metal pattern 372a may be formed in an upper portion of the first cell area CELL1, and an upper metal pattern 272a may be formed in an upper portion of the peripheral circuit area PERI. The upper metal pattern 372a of the first cell area CELL1 may be electrically connected with the upper metal pattern 272a of the peripheral circuit area PERI by a bonding process.

Common source line contact plugs 380 and 480 may be disposed in the external pad bonding area PA. The common source line contact plugs 380 and 480 may include a conductive material such as metal, a metal compound, or doped polysilicon. The common source line contact plug 380 of the first cell area CELL1 may be electrically connected with the common source line 320, and the common source line contact plug 480 of the second cell area CELL2 may be electrically connected with the common source line 420. A first metal wiring 350a and a second metal wiring 360a may be sequentially stacked on the common source line contact plug 380 of the first cell area CELL1, and a first metal wiring 450a and a second metal wiring 460a may be sequentially stacked on the common source line contact plug 480 of the second cell area CELL2.

Input/output (I/O) pads (for example, first to third I/O pads) 205, 405, and 406 may be disposed in the external pad bonding area PA. Referring to FIG. 17, a lower insulation layer 201 may cover a lower surface of the first substrate 210, and a first I/O pad 205 may be formed on the lower insulation layer 201. The first I/O pad 205 may be connected with at least one of a plurality of circuit devices 220a, disposed in the peripheral circuit area PERI, through a first I/O contact plug 203 and may be detached from the first substrate 210 by the lower insulation layer 201. Also, a side insulation layer may be disposed between the first I/O contact plug 203 and the first substrate 210 and may electrically disconnect the first I/O contact plug 203 from the first substrate 210.

An upper insulation layer 401 covering an upper surface of the third substrate 410 may be formed on the third substrate 410. The I/O pad 405 and/or the I/O pad 406 may be disposed on the upper insulation layer 401. The second I/O pad 405 may be connected with at least one of the plurality of circuit devices 220a, disposed in the peripheral circuit area PERI, through the second I/O contact plugs 403 and 303, and the third I/O pad 406 may be connected with at least one of the plurality of circuit devices 220a, disposed in the peripheral circuit area PERI, through the third I/O contact plugs 404 and 304.

In an example embodiment, the third substrate 410 may not be disposed in a region where an I/O contact plug is disposed. For example, as illustrated in B, the third I/O contact plug 404 may be detached from the third substrate 410 in a direction parallel to the upper surface of the third substrate 410, and moreover, may pass through the interlayer insulation layer 415 of the second cell area CELL2 and may be connected with the third I/O pad 406. In this case, the third I/O contact plug 404 may be formed by various processes.

For example, as illustrated in B1, the third I/O contact plug 404 may extend in a third direction (a Z-axis direction) and may be formed so that a diameter thereof increases progressively toward the upper insulation layer 401. That is, a diameter of the channel structure CH described in A1 may be formed to decrease progressively toward the upper insulation layer 401, but a diameter of the third I/O contact plug 404 may be formed to increase progressively toward the upper insulation layer 401. For example, the third I/O contact plug 404 may be formed after the first cell area CELL1 is bonded to the second cell area CELL2 through bonding.

Also, for example, as illustrated in B2, the third I/O contact plug 404 may extend in the third direction (the Z-axis direction) and may be formed so that a diameter thereof decreases progressively toward the upper insulation layer 401. That is, like the channel structure CH, a diameter of the third I/O contact plug 404 may be formed to decrease progressively toward the upper insulation layer 401. For example, the third I/O contact plug 404 may be formed along with the cell contact plugs 440 before the first cell area CELL1 is bonded to the second cell area CELL2.

In another example embodiment, an I/O contact plug may be disposed to overlap the third substrate 410. For example, as illustrated in C, the second I/O contact plug 403 may be formed to pass through the interlayer insulation layer 415 of the second cell area CELL2 in the third direction (the Z-axis direction) and may be electrically connected with the second I/O pad 405 through the third substrate 410. In this case, a connection structure between the second I/O contact plug 403 and the second I/O pad 405 may be implemented as various types.

For example, as illustrated in C1, an opening portion 408 passing through the third substrate 410 may be formed, and the second I/O contact plug 403 may be directly connected with the second I/O pad 405 through the opening portion 408 formed in the third substrate 410. In this case, as illustrated in C1, a diameter of the second I/O contact plug 403 may be formed to increase progressively toward the second I/O pad 405. However, this may be an example embodiment, and a diameter of the second I/O contact plug 403 may be formed to decrease progressively toward the second I/O pad 405.

For example, as illustrated in C2, the opening portion 408 passing through the third substrate 410 may be formed, and a contact 407 maybe formed in the opening portion 408. One end portion of the contact 407 may be connected with the second I/O pad 405, and the other end portion may be connected with the second I/O contact plug 403. Therefore, the second I/O contact plug 403 may be electrically connected with the second I/O pad 405 through the contact 407 of the opening portion 408. In this case, as illustrated in C2, a diameter of the contact 407 may be formed to increase progressively toward the second I/O pad 405, and a diameter of the second I/O contact plug 403 may be formed to decrease progressively toward the second I/O pad 405. For example, the third I/O contact plug 404 may be formed along with the cell contact plugs 440 before the first cell area CELL1 is bonded to the second cell area CELL2, and the contact 407 may be formed after the first cell area CELL1 is bonded to the second cell area CELL2.

Also, for example, as illustrated in C3, a stopper 409 may be further formed in an upper surface of the opening portion 408 of the third substrate 410, unlike C2. The stopper 409 may be a metal wiring which is formed in the same layer as the common source line 420. However, this may be an example embodiment, and the stopper 409 may be a metal wiring which is formed in the same layer as at least one of the word lines 430. The second I/O contact plug 403 may be electrically connected with the second I/O pad 405 through the contact 407 and the stopper 409.

Similarly to the second and third I/O contact plugs 403 and 404 of the second cell area CELL2, a diameter of each of the second and third I/O contact plugs 303 and 304 of the first cell area CELL1 may be formed to decrease progressively toward the lower metal pattern 371e, or may be formed to increase progressively toward the lower metal pattern 371e.

According to example embodiments, a slit 411 may be formed in the third substrate 410. For example, the slit 411 may be formed at an arbitrary position of the external pad bonding area PA. For example, as illustrated in D, when seen in a plane, the slit 411 may be disposed between the second I/O pad 405 and the cell contact plugs 440. However, this may be an example embodiment, and when seen in a plane, the slit 411 may be formed so that the second I/O pad 405 is disposed between the slit 411 and the cell contact plugs 440.

For example, as illustrated in D, the slit 411 may be formed to pass through the third substrate 410. The slit 411, for example, may be used to prevent the third substrate 410 from being cracked in forming the opening portion 408. However, this may be an example embodiment, and the slit 411 may be formed to have a depth equal to about 60% to about 70% of a thickness of the third substrate 410.

Also, for example, as illustrated in D2, a conductive material 412 may be formed in the slit 411. The conductive material 412, for example, may be used to discharge, to the outside, a leakage current occurring in driving of circuit devices of the external pad bonding area PA. In this case, the conductive material 412 may be connected with an external ground line.

Also, for example, as illustrated in D3, an insulating material 413 may be formed in the slit 411. The insulating material 413, for example, may be formed to electrically disconnect the word line bonding area WLBA from the second I/O pad 405 and the second I/O contact plug 403 each disposed in the external pad bonding area PA. The insulating material 413 may be formed in the slit 411, and thus, may prevent a voltage supplied through the second I/O pad 405 from affecting a metal layer disposed on the third substrate 410 in the word line bonding area WLBA.

According to example embodiments, the first to third I/O pads 205, 405, and 406 may be optionally formed. For example, the memory device 500 may be implemented to include only the first I/O pad 205 disposed at an upper portion of the first substrate 201, or include only the second I/O pad 405 disposed at an upper portion of the third substrate 410, or include only the third I/O pad 406 disposed on the upper insulation layer 401.

According to example embodiments, at least one of the second substrate 310 of the first cell area CELL1 and the third substrate 410 of the second cell area CELL2 may be used as a sacrificial substrate, and all or only a portion thereof may be removed before or after a bonding process. An additional layer may be stacked after a substrate is removed. For example, the second substrate 310 of the first cell area CELL1 may be removed before or after the peripheral circuit area PERI is bonded to the first cell area CELL1, and an insulation layer covering an upper surface of the common source line 320 or a conductive layer for a connection may be formed. Similarly, the third substrate 410 of the second cell area CELL2 may be removed before or after the second cell area CELL2 is bonded to the first cell area CELL1, and the upper insulation layer 401 covering an upper surface of the common source line 420 or a conductive layer for a connection may be formed.

The memory device 500 may perform a weak pattern detection operation and an encoding operation each described above with reference to FIGS. 1 to 16. The memory device 500 may remove a weak pattern, thereby enhancing reliability.

When one or more embodiments are capable of being differently implemented, a certain process or the order of operations may be performed unlike a described order. For example, two processes continuously described may be substantially simultaneously performed, or may be performed in a reverse order of a described order.

Hereinabove, example embodiments have been described in the drawings and the specification. Example embodiments have been described by using the terms described herein, but this has been merely used for describing the inventive concept and has not been used for limiting a meaning or limiting the scope of the inventive concept defined in the following claims. Therefore, it may be understood by those of ordinary skill in the art that various modifications and other equivalent embodiments may be implemented from the inventive concept. Accordingly, the spirit and scope of the inventive concept may be defined based on the spirit and scope of the following claims.

While aspects of example embodiments have been particularly shown and described, it will be understood that various changes in form and details may be made therein without departing from the spirit and scope of the following claims.

What is claimed is:

1. An operating method of a non-volatile memory device including a plurality of memory blocks, each of the plurality of memory blocks including a plurality of strings formed in a direction perpendicular to a substrate and connected between bit lines and a common source line, each of the plurality of strings comprising a plurality of memory cells, and each of the plurality of memory cells being programmed to have one of an erase state and first to seventh program states, the operating method comprising:

detecting first memory cells having the erase state among the plurality of memory cells connected with a first word line;

detecting second memory cells having the sixth program state or the seventh program state among the plurality of memory cells connected with a second word line adjacent to the first word line;

detecting target bit lines comprising at least one of the first memory cells and at least one of the second memory cells;

detecting target bits, corresponding to a target bit line and the erase state, in write data which is to be programmed in third memory cells among the plurality of memory cells connected with a third word line adjacent to the second word line;

generating flip bit position data based on the target bits;

flipping the target bits of the write data to generate flipped data; and programming the flipped data and the flip bit position data in the third word line, wherein the plurality of memory cells are divided into a first area and a second area, the first area is divided into first to third portions, and the write data comprises first to third page data, and wherein first sub target bits of the target bits correspond to the first portion, second sub target bits of the target bits correspond to the second portion, and third sub target bits of the target bits correspond to the third portion, data corresponding to the first sub target bits of the first page data is flipped, data corresponding to the second sub target bits of the second page data is flipped, and data corresponding to the third sub target bits of the third page data is flipped.

2. The operating method of claim 1, further comprising:

reading the flipped data and the flip bit position data in the third word line according to a read command; and flipping flipped bits of the flipped data to generate decoded data, based on the flip bit position data.

3. The operating method of claim 1, wherein the programming of the flipped data and the flip bit position data comprises:

programming a memory cell among the plurality of memory cells corresponding to the first sub target bits to have the first program state;

programming a memory cell among the plurality of memory cells corresponding to the second sub target bits to have the seventh program state; and programming a memory cell among the plurality of memory cells corresponding to the third sub target bits to have the fifth program state.

4. The operating method of claim 1, wherein the programming of the flipped data and the flip bit position data comprises programming the flipped data in the third memory cells corresponding to the first area of the third word line and programming the flip bit position data in the third memory cells corresponding to the second area of the third word line.

5. The operating method of claim 1, wherein the generating of the flip bit position data comprises:

generating first sub flip bit position data corresponding to the first page data;

generating second sub flip bit position data corresponding to the second page data; and generating third sub flip bit position data corresponding to the third page data.

6. The operating method of claim 5, wherein encoded data comprises the flipped data and the flip bit position data, and the encoded data comprises first to third encoded page data, and wherein the operating method further comprises:

flipping the first page data to generate first flipped page data and adding the first sub flip bit position data to the first flipped page data to generate the first encoded page data;

flipping the second page data to generate second flipped page data and adding the second sub flip bit position data to the second flipped page data to generate the second encoded page data; and flipping the third page data to generate third flipped page data and adding the third sub flip bit position data to the third flipped page data to generate the third encoded page data.

7. The operating method of claim 1, wherein the write data comprises a plurality of chunks, wherein the flipping of the target bits of the write data to generate the flipped data comprises:

detecting bits, included in a same chunk as the target bits, as target neighboring bits;

flipping data corresponding to the target bits; and flipping data corresponding to the target neighboring bits.

8. The operating method of claim 7, wherein first sub neighboring bits of the target neighboring bits correspond to the first portion, second sub neighboring bits of the target neighboring bits correspond to the second portion, and third sub neighboring bits of the target neighboring bits correspond to the third portion, and wherein data corresponding to the first sub neighboring bits of the first page data is flipped, data corresponding to the second sub neighboring bits of the second page data is flipped, and data corresponding to the third sub neighboring bits of the third page data is flipped.

9. The operating method of claim 1, wherein the detecting of the first memory cells having the erase state comprises performing a first sensing operation on the first word line by using a first read voltage, and wherein the detecting of the second memory cells having the sixth program state or the seventh program state comprises performing a second sensing operation on the second word line by using a sixth read voltage.

10. The operating method of claim 9, further comprising:

storing a first bitmap, generated based on the first sensing operation, in a first data latch;

storing a second bitmap, generated based on the second sensing operation, in a second data latch;

performing an AND operation on the first bitmap stored in the first data latch and the second bitmap stored in the second data latch to generate a third bitmap; and storing the third bitmap in the first data latch.

11. The operating method of claim 10, further comprising:

receiving the write data from an external device;

storing the first page data in the second data latch;

storing the second page data in a third data latch; and storing the third page data in a fourth data latch.

12. The operating method of claim 11, further comprising:

performing an AND operation on data stored in each of the first to fourth data latches to generate a fourth bitmap;

storing the fourth bitmap in a fifth data latch;

providing the fourth bitmap to a control logic circuit; and generating the flip bit position data based on the fourth bitmap, wherein the fourth bitmap indicates information about a weak pattern.

13. The operating method of claim 12, further comprising:
generating a first bit flip flag indicating a bit, which is to be flipped, of the first page data, based on the flip bit position data;
performing encoding for error correction on a first sub flip bit position data, corresponding to the first page data, of the flip bit position data to generate encoded first sub flip bit position data;
adding the first sub flip bit position data to the first bit flip flag to generate a fifth bitmap; and
storing the fifth bitmap in the fifth data latch.

14. The operating method of claim 13, further comprising:
performing an XOR operation on the first page data stored in the second data latch and the fifth bitmap stored in the fifth data latch to generate first encoded page data; and
storing the first encoded page data in the second data latch.

15. An operating method of a non-volatile memory device including a plurality of memory blocks, each of the plurality of memory blocks including a plurality of strings which are formed in a direction perpendicular to a substrate, and each of the plurality of strings including a plurality of memory cells, the plurality of strings being connected between bit lines and a common source line, and the plurality of memory cells being programmed to have one of an erase state and first to seventh program states, the operating method comprising:
performing a first sensing operation on a first word line by using a first read voltage to generate a first bitmap indicating first memory cells corresponding to the erase state among the plurality of memory cells connected with the first word line;
performing a second sensing operation on a second word line adjacent to the first word line by using a sixth read voltage to generate a second bitmap indicating second memory cells corresponding to the sixth program state or the seventh program state among the plurality of memory cells connected with the second word line;
performing an AND operation on the first bitmap and the second bitmap to generate a third bitmap indicating target bit lines;
receiving write data, which is to be programmed in memory cells connected with a third word line adjacent to the second word line, from an external device;
performing an AND operation on the third bitmap and the write data to generate a fourth bitmap indicating target bits corresponding to a weak pattern;
generating flip bit position data based on the fourth bitmap;
performing a flip operation to generate encoded data, based on the write data and the flip bit position data; and
programming the encoded data in the memory cells connected with the third word line.

16. The operating method of claim 15, wherein the first sensing operation, the second sensing operation and the receiving the write data are performed simultaneously.

17. The operating method of claim 15, wherein the plurality of memory cells are divided into a first area and a second area, the first area is divided into first to third portions, first sub target bits of the target bits correspond to a first portion, second sub target bits of the target bits correspond to a second portion, third sub target bits of the target bits correspond to a third portion, and the write data comprises first to third page data, and
wherein the performing of the flip operation to generate the encoded data comprises:
flipping data corresponding to the first sub target bits of the first page data;
flipping data corresponding to the second sub target bits of the second page data; and
flipping data corresponding to the third sub target bits of the third page data.

18. The operating method of claim 17, further comprising:
reading the encoded data stored in the memory cells connected with the third word line according to a read command;
performing decoding on the encoded data to generate decoded data, based on the flip bit position data; and
providing the decoded data to an external storage controller.

19. An operating method of a non-volatile memory device including a plurality of memory blocks, each of the plurality of memory blocks including a plurality of strings formed in a direction perpendicular to a substrate, the plurality of strings being connected between bit lines and a common source line, each of the plurality of strings comprising a plurality of memory cells, and the plurality of memory cells being programmed to have one of an erase state and first to seventh program states, the operating method comprising:
detecting first memory cells having the erase state among the plurality of memory cells connected with a first word line;
detecting second memory cells having a sixth program state or a seventh program state among the plurality of memory cells connected with a second word line adjacent to the first word line;
detecting target bit lines comprising at least one of the first memory cells and at least one of the second memory cells;
detecting target bits, corresponding to a target bit line and the erase state, in write data which is to be programmed in memory cells connected with a third word line adjacent to the second word line;
generating flip bit position data based on the target bits;
flipping the target bits of the write data and flipping target neighboring bits included in a same chunk as the target bits to generate flipped data; and
programming the flipped data and the flip bit position data in the third word line,
wherein the write data comprises a plurality of chunks.

20. The operating method of claim 19, further comprising:
reading the flipped data and the flip bit position data in the memory cells connected with the third word line according to a read command; and
flipping flip bits of the flipped data to generate decoded data, based on the flip bit position data.

* * * * *